(12) United States Patent
Brunet et al.

(10) Patent No.: US 9,967,524 B2
(45) Date of Patent: May 8, 2018

(54) SECURITY SYSTEM AND METHOD WITH SCROLLING FEEDS WATCHLIST

(71) Applicant: Tyco Safety Products Canada Ltd., Concord (CA)

(72) Inventors: Yanik Brunet, Surrey (CA); Scott McNulty, Chateauguay (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 265 days.

(21) Appl. No.: 14/098,986

(22) Filed: Dec. 6, 2013

(65) Prior Publication Data
US 2014/0195965 A1 Jul. 10, 2014

Related U.S. Application Data

(60) Provisional application No. 61/751,115, filed on Jan. 10, 2013.

(51) Int. Cl.
| | | |
|---|---|---|
| *G08B 13/196* | (2006.01) | |
| *G06F 9/44* | (2018.01) | |
| *H04N 7/18* | (2006.01) | |
| *G06F 3/0481* | (2013.01) | |
| *G06F 3/0484* | (2013.01) | |
| *G06F 3/0482* | (2013.01) | |

(Continued)

(52) U.S. Cl.
CPC .......... *H04N 7/181* (2013.01); *G06F 3/0481* (2013.01); *G06F 3/0482* (2013.01); *G06F 3/0485* (2013.01); *G06F 3/0486* (2013.01); *G06F 3/04817* (2013.01); *G06F 3/04847* (2013.01); *G08B 13/1968* (2013.01); *G08B 29/16* (2013.01); *G06F 9/4443* (2013.01); *G08B 13/19682* (2013.01); *G08B 25/14* (2013.01)

(58) Field of Classification Search
CPC .............. G08B 25/14; G08B 13/19682; G08B 13/1968; G06K 9/00771; H04N 21/41407; H04N 7/181; G06F 9/4443
See application file for complete search history.

(56) References Cited

U.S. PATENT DOCUMENTS

| | | |
|---|---|---|
| 5,555,370 A | 9/1996 | Li et al. |
| 6,271,805 B1 | 8/2001 | Yonezawa |

(Continued)

OTHER PUBLICATIONS

"Dockview" Google Search, Apr. 28, 2017. Two pages.

*Primary Examiner* — Andrew Tank
(74) *Attorney, Agent, or Firm* — HoustonHogle LLP

(57) ABSTRACT

A user-centric management application system and method for a security system that conceptualizes the security devices and the tasks to perform on the security devices as separate objects with common properties and behavior. Operators of the system create abstract containers, called dockviews, which the operator adds objects to in order to perform specific tasks. Because the operator assigns user access to dockviews and objects, the system tailors system access for both application users and tenants of the security system based on policy objectives. Dockviews have the ability to open in separate application windows to support priority display and isolation of critical management tasks. The system provides integrated user administration, event management and reports capability, a consistent "look and feel," and system-wide automated event notification via a watchlist window.

19 Claims, 45 Drawing Sheets

(51) Int. Cl.
*G06F 3/0485* (2013.01)
*G08B 29/16* (2006.01)
*G06F 3/0486* (2013.01)
*G08B 25/14* (2006.01)

(56) References Cited

U.S. PATENT DOCUMENTS

| | | | |
|---|---|---|---|
| 6,529,137 B1* | 3/2003 | Roe | 340/691.1 |
| 6,577,330 B1 | 6/2003 | Tsuda et al. | |
| 6,628,313 B1 | 9/2003 | Minakuchi et al. | |
| 6,948,126 B2 | 9/2005 | Malamud et al. | |
| 6,983,419 B1 | 1/2006 | Yonezawa et al. | |
| 7,304,662 B1* | 12/2007 | Sullivan et al. | 348/150 |
| 7,552,401 B2 | 6/2009 | Guido et al. | |
| 8,229,116 B2 | 7/2012 | Ogata | |
| 8,340,654 B2* | 12/2012 | Bratton et al. | 455/420 |
| 2002/0171546 A1 | 11/2002 | Evans et al. | |
| 2003/0071715 A1 | 4/2003 | Lavelle et al. | |
| 2004/0196369 A1* | 10/2004 | Fukasawa | H04N 7/18 348/155 |
| 2004/0237049 A1 | 11/2004 | Pletcher et al. | |
| 2005/0060661 A1 | 3/2005 | Kawahara et al. | |
| 2005/0140695 A1 | 6/2005 | Dunton et al. | |
| 2005/0181765 A1 | 8/2005 | Mark | |
| 2005/0204306 A1 | 9/2005 | Kawahara et al. | |
| 2006/0221184 A1 | 10/2006 | Vallone et al. | |
| 2006/0236115 A1 | 10/2006 | Haneda | |
| 2006/0279628 A1* | 12/2006 | Fleming | G11B 27/034 348/143 |
| 2006/0288288 A1* | 12/2006 | Girgensohn | G06F 17/3079 715/716 |
| 2007/0124699 A1 | 5/2007 | Michaels | |
| 2007/0174783 A1 | 7/2007 | Clark et al. | |
| 2007/0283004 A1 | 12/2007 | Buehler | |
| 2008/0109883 A1 | 5/2008 | Hernoud et al. | |
| 2008/0122796 A1 | 5/2008 | Jobs et al. | |
| 2008/0155576 A1 | 6/2008 | Horvitz et al. | |
| 2008/0235763 A1* | 9/2008 | Krantz | G11B 27/34 726/2 |
| 2008/0263592 A1* | 10/2008 | Kimber | G06F 3/0486 725/38 |
| 2009/0019078 A1 | 1/2009 | Chisholm et al. | |
| 2009/0099988 A1 | 4/2009 | Stokes et al. | |
| 2009/0199133 A1 | 8/2009 | Deutsch et al. | |
| 2009/0288011 A1 | 11/2009 | Piran et al. | |
| 2009/0300511 A1 | 12/2009 | Behar et al. | |
| 2009/0307255 A1 | 12/2009 | Park | |
| 2009/0327294 A1 | 12/2009 | Bailor et al. | |
| 2010/0023865 A1 | 1/2010 | Fulker et al. | |
| 2010/0045791 A1 | 2/2010 | Drive et al. | |
| 2010/0077456 A1 | 3/2010 | Drive et al. | |
| 2010/0111377 A1* | 5/2010 | Monroe | 382/118 |
| 2011/0010624 A1* | 1/2011 | Vanslette | G06F 3/0485 715/704 |
| 2011/0055696 A1 | 3/2011 | Dollar et al. | |
| 2011/0087984 A1 | 4/2011 | Jitkoff et al. | |
| 2011/0249123 A1 | 10/2011 | Subbian et al. | |
| 2011/0276489 A1* | 11/2011 | Larkin | G06Q 20/20 705/44 |
| 2012/0078665 A1* | 3/2012 | Johnson | G06Q 50/24 705/3 |
| 2012/0096397 A1 | 4/2012 | Ording et al. | |
| 2013/0091432 A1* | 4/2013 | Shet | G08B 13/19645 715/719 |
| 2013/0124997 A1* | 5/2013 | Speir | H04N 5/76 715/721 |
| 2013/0191746 A1* | 7/2013 | Huang | G06F 3/0484 715/716 |
| 2013/0257770 A1* | 10/2013 | Tsaregorodtsev | G06F 3/0488 345/173 |
| 2013/0268837 A1 | 10/2013 | Braithewaite et al. | |
| 2014/0006951 A1* | 1/2014 | Hunter | H04H 60/31 715/719 |
| 2014/0013212 A1 | 1/2014 | Von Haden et al. | |

\* cited by examiner

SECURITY SYSTEM AND METHOD WITH SCROLLING FEEDS WATCHLIST

RELATED APPLICATIONS

This application claims the benefit under 35 U.S.C. § 119(e) of U.S. Provisional Application No. 61/751,115, filed on Jan. 10, 2013, and is related to U.S. patent application Ser. No. 14/098,935, U.S. Patent Application Publication No. US 2014-0223301 A1, entitled "Security system and method with help and login for customization" by Inventors Stephan Frenette et al., Ser. No. 14/098,947, U.S. Patent Application Publication No. US 2014-0223348 A, entitled "Security system and method with information display in flip window" by Inventors Luc Champagne et al., and Ser. No. 14/098,962, U.S. Patent Application Publication No. US 2014-0195952 A1, entitled "Security system and method with modular display of information" by Inventors Luc Champagne et al. The related applications are filed on an even date herewith, all of which are incorporated herein by reference in their entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Security systems protect people, property, and reduce crime for homeowners and businesses alike and have become an increasingly cost-effective tool to reduce risk. These systems have multiple components, such as server systems, display devices, and security devices that communicate over a security network. These security devices include monitoring points, video cameras for capturing live video of an area of interest, physical access control devices such as key pads and card readers, and a variety of sensor devices installed within and at entry and exit points for premises.

Operators of the security systems typically view and manage the security devices and their information using applications installed on workstations connected to the security network. The applications have graphical user interfaces for management and display of the security network and the security devices.

Security devices send information periodically and in response to changes in status of the devices. One piece of information that is of critical importance to operators of security systems is event data information. These events include changes in the environment the devices were designed to detect, such as a when a window sensor detects that the window has been opened, or when a motion sensor detects motion in a monitored area.

A major challenge for security system operators is the ability to manage and display the event data from the security devices in security system installations. Networks allow access and management of security devices installed in different buildings and locations to appear as a single logical security network. While this improves control and access to the security devices, it also increases the volume of event data traffic.

Current systems typically display event data from all security devices in the security network in a dedicated event viewing window. The event viewing window typically presents the event data in tabular form. The operator selects specific events from the event viewing window to reveal the event data details.

Event data often includes such information as the name of the event, the time the event was received, its severity, and the name of the device that sent the event. The operator filters the events within the event viewing window to narrow the events displayed.

SUMMARY OF THE INVENTION

The inventive management application (the "Application") is a management application for a security system that uses graphical user interface ("GUI") elements to represent the objects of the security system, and present object information for the objects. The GUI elements include windows, panels, dialogs, icons, and other graphical indicators that represent windows and devices, such as thumbnails. Objects of the security system include security devices such as door controllers, access control systems, motion sensors, fire/smoke detectors, other input devices, other detector devices, relays, and security cameras, to list a few examples.

The object information includes access cards associated with door controllers for gaining access to a building, user access control lists, virtual maps of monitored areas within buildings, and video streams from security cameras, in examples. The Application enables the operator to create associations between these objects and the object information for performing user-centric configuration and management tasks upon the security system.

The Application includes graphical user interfaces. The graphical user interfaces include graphics elements or widgets such as windows, pull-down menus, panels, icons, and dialogs, in a current example. The terms "window" and "application window" are generic names for a resizable graphics container that accepts and displays other graphics elements onto a working area of the windows.

Windows include panels that typically provide a layout or structure for arranging and grouping the graphical elements presented in the working area of the windows. For this reason, panels are often referred to as the "faces" of a window. Example panels include grids, lists, and tables.

A dialog box is typically a child window of the current window. Dialog boxes are displayed in front of their parent windows and can be moved around without the parent moving with it. The Application utilizes dialog boxes, in examples, for prompting operators to enter information for configuring the objects of the security system.

Many existing GUI-based security system applications create multiple windows for performing tasks upon the objects of the security system. These applications typically open a separate window associated with each security object. This creates clutter on the display device of the user device displaying the application, which can distract operators and cause delays in responding to security events. In contrast, the Application normally presents the panels and dialogs that include the object information for the objects of the security system within a single window of a browser. This single window is also known as the main window.

The contents of the main window are also referred to as a "screen" of information. To distinguish between the different screens or windows of information in the Application, each screen is named according to the features and/or object information provided in each screen. In one example, at initial login, the Application presents a "login screen" that provides the ability for users to enter a user picture and change their credentials. In another example, the Application provides the ability for users to manage the objects and the object information to include within dockviews via a "configuration screen".

Windows include graphics elements and information for displaying and managing different aspects of the security system, and for performing specific operations upon the objects of the security system and their object information. To identify and distinguish between the windows and the information that each window provides, users of applications typically prefix a context-specific modifier to the generic word "window". Examples include a "watchlist window" which includes lists of objects of the security system, for monitoring event data from the objects included in the lists, and the aforementioned "configuration screen" and "login screen".

For selecting among the specific screens or windows that enable the management and display of the objects of the security system and their object information, the main window includes a main menu toolbar with main menu items. In response to selection of each main menu item, the Application presents the screen specific to each main menu item in the main window. In examples, the main menu items include a "Dockviews" item for displaying and managing user-defined collections of security system objects in custom windows referred to as dockview windows, or simply as dockviews; an "Operation" item for displaying and managing objects such as doors and relays; and, a "Configuration" item for performing scheduling operations upon the objects and managing user access control lists of the objects.

Each object of the security system has an object type, or class, that supports one or more objects or instances of each type. For example, a separate User object represents each user in the system, where each instance of the User object is of type User. Each instance of an object type is also referred to as an object entry. There is a one-to-many relationship between object types and their object entries.

The object type/entry classification provides a common "look and feel" mechanism for organizing and displaying information throughout the Application, while also providing context-specific display and management capabilities.

Events associated with a security device, such as an intrusion detected by a motion sensor, are critical to operators of security systems. The potentially large number of security devices in a security system, combined with the number and frequency of events associated with these devices, makes the task of managing events challenging. Moreover, operators typically focus most of their attention on a small set of critical security devices, such as door controllers for main entry and exit doors to a building.

Current systems also require operators to take their gaze away from critical monitoring tasks in order to manage and display event data in the event viewing window. This creates delay and overhead for the operator, who must frequently switch between the separate contexts of event data management in the event viewing window or panel, and security device and systems management in the other panels and windows.

The watchlist window, also known as the watchlist, provides the ability to "watch" or flag events from a user-specified list of objects such as security devices. Current security systems typically maintain event information only in a dedicated application window, or require the use of a separate event management application. In contrast, the Application provides the display and management of events from nearly any Application window. The Application provides the event data within real-time scrolling feeds included in the windows.

Event data indicators in the scrolling feeds also enable the display of the event data. The event data indicators are associated with the event data, and are indexed by time intervals in the scrolling feeds. The operator uses time interval scale selectors in the scrolling feeds to shrink and grow the displayed time scale. The operator displays the event data by indicating the event data indicators, using a pointing device such as a mouse. In response to the indication, the Application displays the event data in a pop-up window overlaid upon the current window. This saves the operator from having to search through the event timeline for the details of each event, and delivers potentially system-critical information "at-a-glance" and in real time for security system managers and first responders. Because the scrolling feeds display event data from security devices in real-time, the scrolling feeds are also known as real-time scrolling feeds.

The watchlist window also takes advantage of the Application object type/entry abstraction. The watchlist window displays each object added to the watchlist window in a fashion similar to the way file system contents are displayed on GUIs for typical computer operating systems. These systems display files underneath their parent directories, and indent filename entries so users can easily determine the directory/file relationships. In a likewise fashion, the watchlist window organizes and displays object types similar to the display of directories, and displays object entries similar to the display of files. This provides the operator with an intuitive display of all object types and objects in the security system currently selected for displaying their event data.

Another concept that is central to the Application is the dockview window, or dockview. A dockview is a facility for a user, such as an administrator, to organize the object information for objects of the security system, such as security devices, into logical and/or physical groups. Dockviews accept icons associated with objects of the security system and their object information. Once the operator associates the icons for the objects in the dockview, the operator can configure, manage, and display the objects and their object information within the dockview. Each icon represents a different object type for each object. Using a drag-and-drop interface on a configuration screen, users select icons for each object type, and add the selected icons to a drop region of a configuration screen of the dockview for defining the contents of the dockview.

Each dockview window also accepts icons associated with the configuration and management of non-device object information related to the objects of the security system. Examples include user credentials associated with access cards, and reports that include event data from the objects of the security system.

The Application provides a summary listing of all dockviews in a Dockview List window or screen of the main window. To provide the summary listing of the dockviews, the Dockview List window displays a graphical indicator associated with each dockview. The graphical indicators are preferably dockview thumbnails.

However, unlike thumbnails in most graphical user interfaces, which typically display a single bitmap image that represents a single object in an application, such as a GUI window or a security device, each dockview thumbnail presents multiple graphical elements associated with each dockview and their contents. In examples, dockview thumbnails present graphical elements that identify each dockview, enable the management of the dockviews, and display icons associated with each object included in each dockview. This provides "at-a-glance" information about the contents of each dockview at a high-level in the Dockview List window, including the type of objects and the number of objects associated with each dockview, without requiring the operator to "drill down" into each dockview to examine their contents.

A typical dockview example is a dockview that includes security system objects and their object information for a specific location, such as the security cameras and their video streams for a monitored room. For this example, the operator creates a dockview with the name of the room, and associates security camera objects with the dockview. Additionally, the operator can include the door object for the door controller that controls access to the monitored room, and can include access card objects for controlling user access to the door object.

Another example of a dockview is to support user-oriented task objectives, such as creating a dockview for a security guard who is monitoring only the foyer area of a building. For this example, the operator might create a dockview with name "FoyerGuard," and associate only those object types to the dockview which the foyer guard requires access. In this case, the operator would provide the foyer guard with access to the object associated with the specific door controller for the door outside the foyer, but not provide access to other door controllers, consistent with policy objectives.

As the dockview name implies, a dockview can be "docked," also known as embedded. By default, all dockviews are non-embedded in the Application, meaning that the Application displays and enables the managing of dockviews within the main window in a browser.

However, when the operator "docks" or "embeds" a dockview, the Application opens a new Application window on the user device that is separate from the main window displayed in the browser. The new window includes the embedded dockview contents. The Application provides the ability to dock or embed each dockview in its own application window via an embedded dockview selector, available on each dockview thumbnail in the Dockviews list window.

Once opened, the new window for an embedded dockview remains open until the operator closes it, and the operator can move the window freely about the windows space of the display device. A typical usage of embedded dockviews is to enable communications between objects of the dockviews, and other applications of the user devices. Embedding dockviews also allows operators to move the separate application windows that include the embedded dockviews to different regions of a desktop display of the user devices for improved visibility and isolation.

The terms "dockview," and "dockview window" are synonymous. An operator of the system is also a user of the system, but the concept of an operator is similar to a person with "super-user" or Administrator access privileges on typical computer systems with access control privileges. Operators grant and revoke user access to security system objects based on company policy guidelines.

An operator highlights or indicates a GUI element, such as a dockview thumbnail in the Dockview List window, or a "Relay" object type thumbnail in the Operation Window, by indicating the GUI element or object with a pointing device. One example of a pointing device is a mouse. Indication occurs when the operator moves the pointing device over the object, which is also known as a hover operation. Highlighting outlines the indicated object with a color, such as blue, to make the object stand out as compared to other objects.

When an object is highlighted, the Application reveals context-specific help or summary text for operations available on that object. Moreover, the process of selecting an object to reveal more details about that object is preceded by a highlighting of that object, which aids the user in object selection. Selection of an object typically opens a popup window overlaid upon the current Application panel that reveals more detail about the object.

In general, according to one aspect, the invention features a security system that comprises a server system for a security network that aggregates object information from objects on the security network, and graphical user interfaces displayed on user devices that present the object information received from the server as scrolling feeds.

In one example, the object information is event data from the objects. The event data are typically transmitted in response to changes in status of the objects, the event data comprising a date and time, a name, a description, a picture, and/or a video.

Preferably, the graphical user interfaces comprise windows that include the scrolling feeds within the windows, and watchlist windows that control inclusion of the event data in the scrolling feeds. The watchlist windows include lists of the objects, the objects in the lists presenting their event data within the scrolling feeds.

In another aspect, the windows further include graphical objects associated with the objects, arranged in panes; time interval scale selectors for selecting the scale of time intervals within the scrolling feeds; and watchlist window selectors for enabling the display of the watchlist windows. Typically, the scale of the time intervals of the scrolling feeds change in response to selection of the time interval scale selectors.

In yet another aspect, the scrolling feeds include event data indicators indexed by the time intervals, the event data indicators displaying the event data in event data windows in response to indication of the event data indicators.

The graphical user interfaces can overlay the watchlist windows upon the windows in response to selection of the watchlist window selectors, and the graphical user interfaces close the watchlist windows in response to deselection of the watchlist window selectors. Preferably, the graphical objects associated with the objects include a watchlist add/delete selector for adding and deleting the objects from the list of objects in the watchlist window.

The graphical objects associated with the objects further preferably include an object type for each type of the objects. The object type comprises an icon, a name, and an object entry for each of the objects, wherein each object entry is associated with one of the object types, each object entry comprising an icon, and a name. Preferably, the watchlist windows display the object type names and the object entry names for the objects in separate TOWS.

In general, according to one aspect, the invention features a method for displaying object information for objects in a security system, comprising a server system, a security network for connecting the server system to the objects, user devices for displaying graphical user interfaces. The method comprises the server system aggregating the object information from the objects on the security network, and the user devices receiving the object information from the server system, and displaying the object information in graphical user interfaces that present the object information as scrolling feeds.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 16B shows the edit user dialog, displayed in response to selection of a specific user from the users window in FIG. 16A, wherein the edit user dialog is presented within a flip window;

FIG. 16C displays additional object information of the edit user dialog, displayed in response to operator selection of the flip button of the edit user dialog in FIG. 16B;

FIG. 21 shows the schedule window for the schedule object type, with the edit schedule dialog displayed in response to selection of a specific schedule;

FIG. 25 shows the Doors window for the doors object type, with the edit door dialog displayed in response to selection of a specific door;

DETAILED DESCRIPTION OF THE PREFERRED EMBODIMENTS

Figure 1:
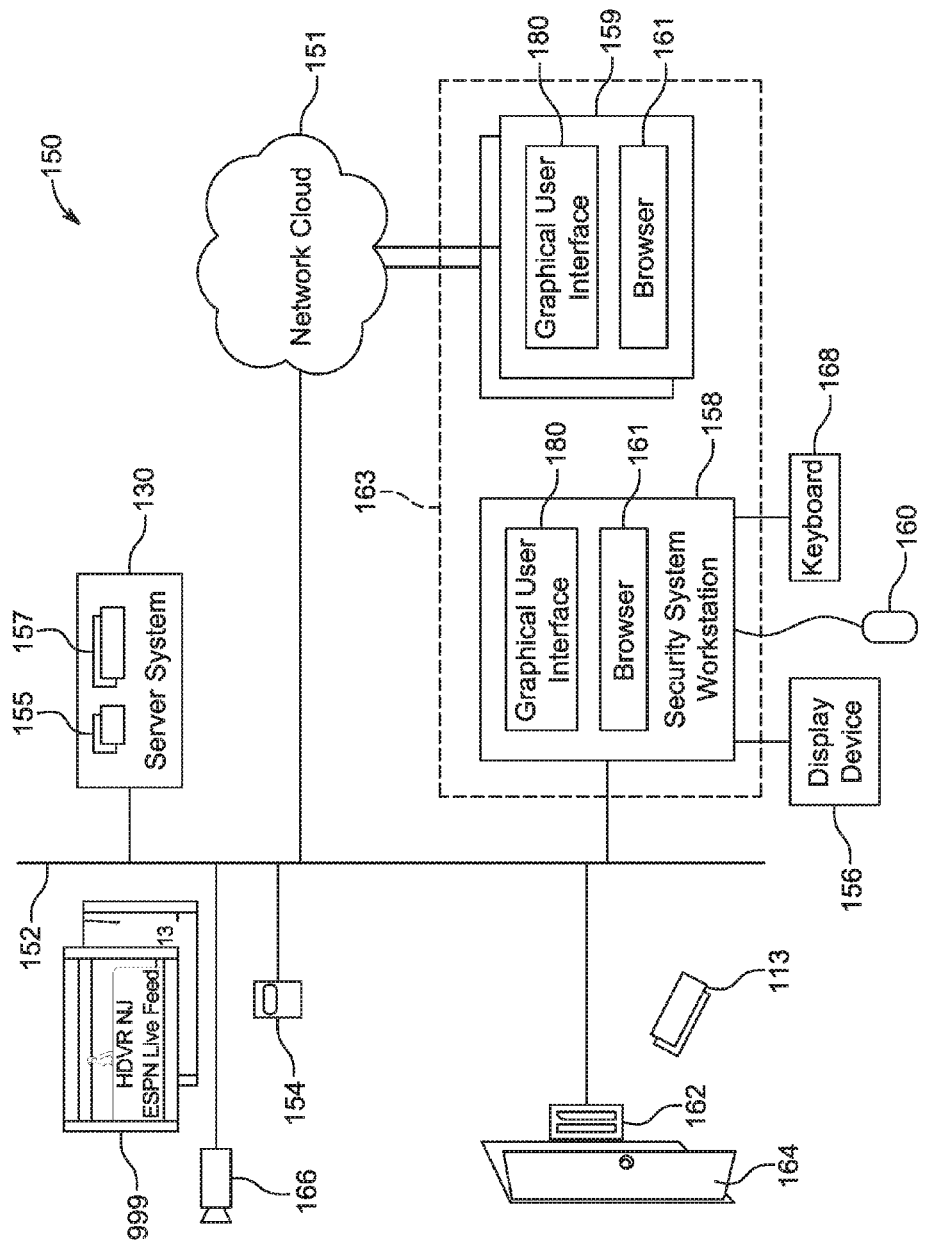
FIG. 1 is a schematic diagram of a security system managed by the Application.

FIG. 1 is a schematic diagram of a security system 150, with security devices such as one or more input devices 154, one or more door controllers 162 for a door 164, and one or more security cameras 166. The user devices 163 include one or more mobile computing devices 159 and one or more security system workstations 158. A display device 156, a pointing device 160, and a keyboard 168 are connected to the security system workstation 158. The door controller 162, the input device 154, the security camera 166, the mobile devices 159 and the security system workstation 158 communicate over a security network 152.

The security system workstation 158 includes graphical user interfaces 180 for presenting the object information from the objects of the security system, such as security devices, and includes a browser 161. The security system workstation 158 is typically located within the security network 152.

An operator placed at the security system workstation 158 manages the objects of the security system 150, and their object information, using the graphical user interfaces 180 of the Application. The graphical user interfaces 180 are installed and running on the security system workstation 158. The graphical user interfaces 180 of the Application display on the display device 156, and the operator interacts with the Application using the pointing device and/or touch screen 160 and the keyboard 168.

An operator also manages the security devices and other objects of the security system via user devices 163 such as mobile devices 159, which communicate over the security network 152 via a network cloud 151. The mobile devices 159 also includes graphical user interfaces 180 for presenting information from the security devices, and a browser 161.

The security system 150 also includes a server system 130 connected to the security network 152 that aggregates the object information from the objects of the security system. Examples of object information include user account settings 155 for access cards 113, video streams 999 from security cameras 166 and login sessions 157 initiated by users. The mobile devices 159 and the security system workstation 158 receive the object information from the server system 130. The server system 130 stores user account settings 155 for the users, and authenticates the users when the users request access to the server system 130 from the graphical user interfaces 180 on the user devices 163. Upon authentication of the users, the server system 130 creates login sessions 157 on the server system 130 for the users.

During the login sessions 157, users can change their user account settings 155. The graphical user interfaces 180 of the user devices 163 enable the users to make changes to their user account settings 155.

Figure 2:
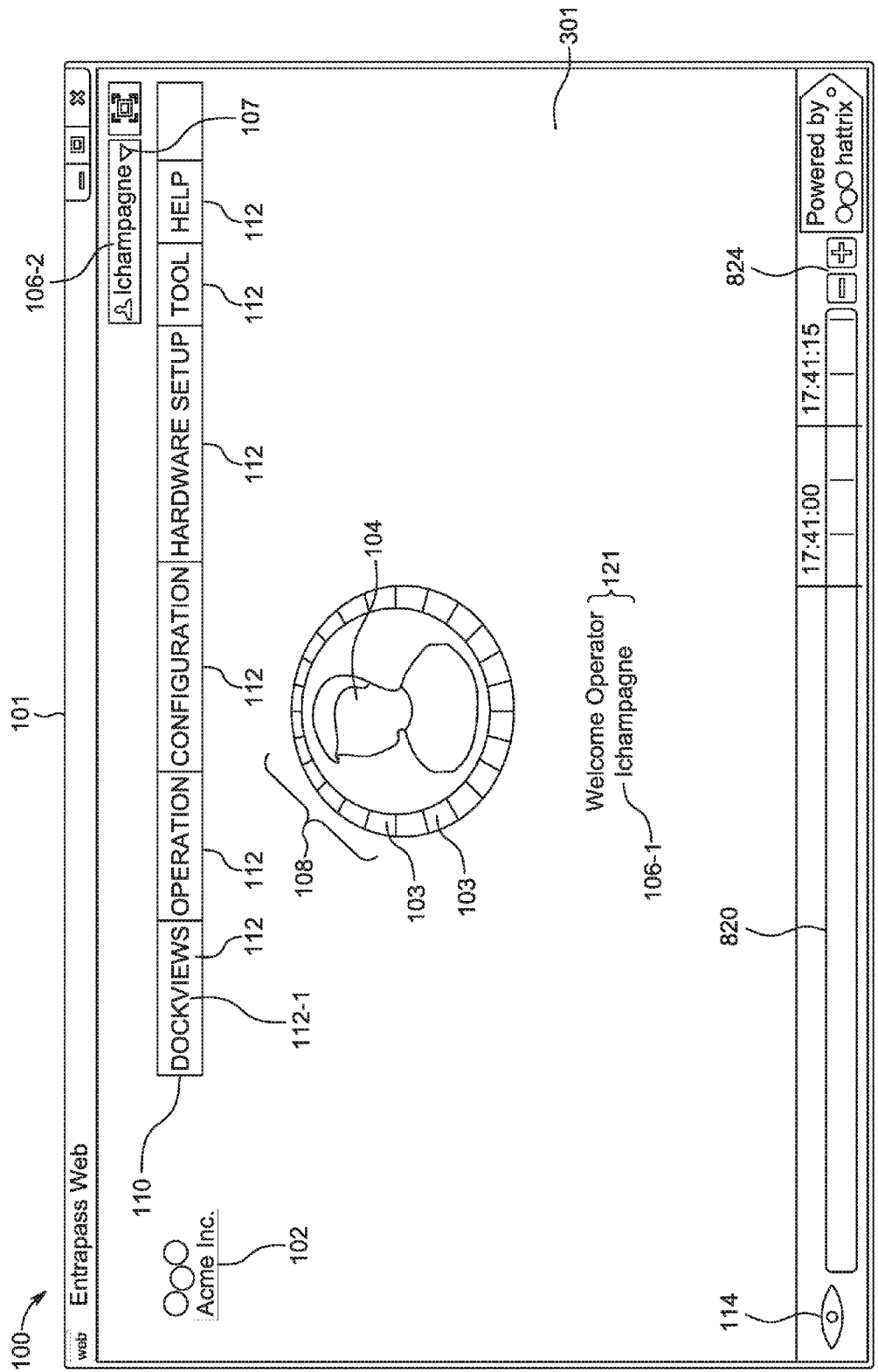
FIG. 2 shows the login screen of the Application, along with user login customization features.

FIG. 2 shows the Application login screen 100 that the Application presents to the user or operator upon initial login to the Application. The login screen 100 is presented within the main window 101 of the Application. The login screen 100 includes graphical elements within the working area 301 of the main window 101. The login screen includes a company logo 102 and a user login graphic 108. The login screen 100 displays an operator username 106 in multiple places within the login screen 100, such as username 106-1 in the middle of the login screen 100 as part of a welcome message 121, and within a user account pull-down menu 107 as username 106-2. The login screen 100 allows the operator to select a user picture 104, and the user-customizable logo, or company logo 102.

The user login graphic 108, which surrounds the user picture 104, in one implementation, presents a visual indication of time remaining in the operator's login session. The user login graphic 108 has time blocks 103, the color of which changes in response to user inactivity during the user's login session. As user inactivity continues, successive time blocks 103 change their color in response to the inactivity. Preferably, contiguous time blocks 103 change their color in a counter-clockwise fashion in response to the user's inactivity, suggesting that the operator's login session is approaching a timeout limit.

As with nearly all windows or screens in the Application, the login screen 100 includes a main menu toolbar 100 for navigation among the Application windows, a watchlist window selector 114, scrolling feeds 820 that displays real-time event data 892 from the objects of the security system, and a time interval scale selector 824. The watchlist window selector 114 has an eye icon. The operator selects and deselects the watchlist window selector 114 to alternatively enable and disable the display of the watchlist window 802 on the application windows. Example illustrations of the watchlist window 802 are provided in FIGS. 27A and 27B.

The operator selects among the different Application windows by selecting Main menu tabs 112 associated with the window name. For example, the Dockviews Main menu tab 112-1 is associated with the initialization, creation, and display of dockview windows, also known as dockviews 203.

Figure 3:
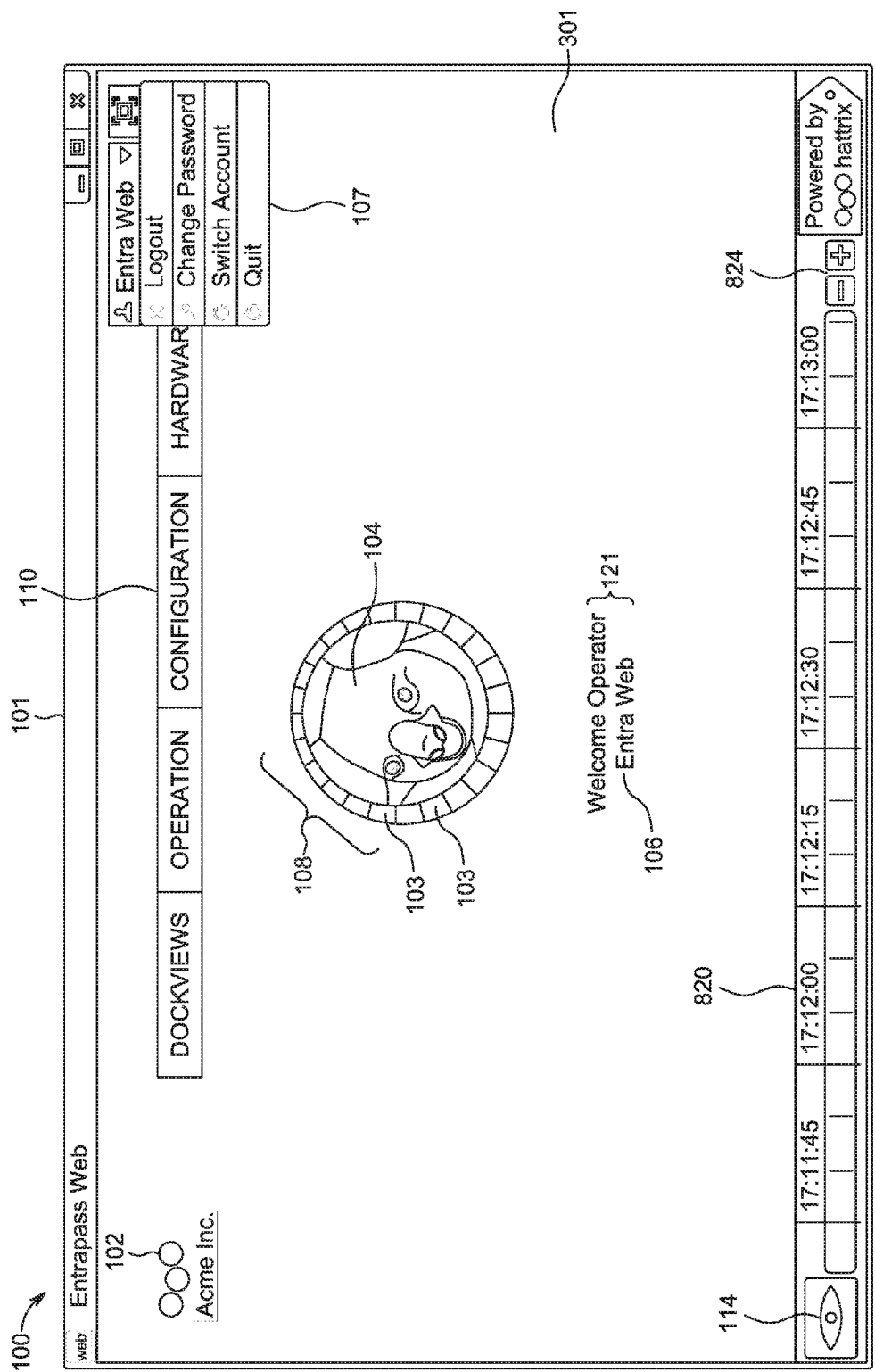
FIG. 3 shows the login screen during configuration of user-related information.

FIG. 3 displays the login screen 100 that the Application displays during customization of user-related parameters by a user. In the example login screen 100, the user has selected a non-default user picture 104, and has selected the user account pull-down menu 107 for editing information such as their user credentials for logging onto the server system 130.

Figure 4:
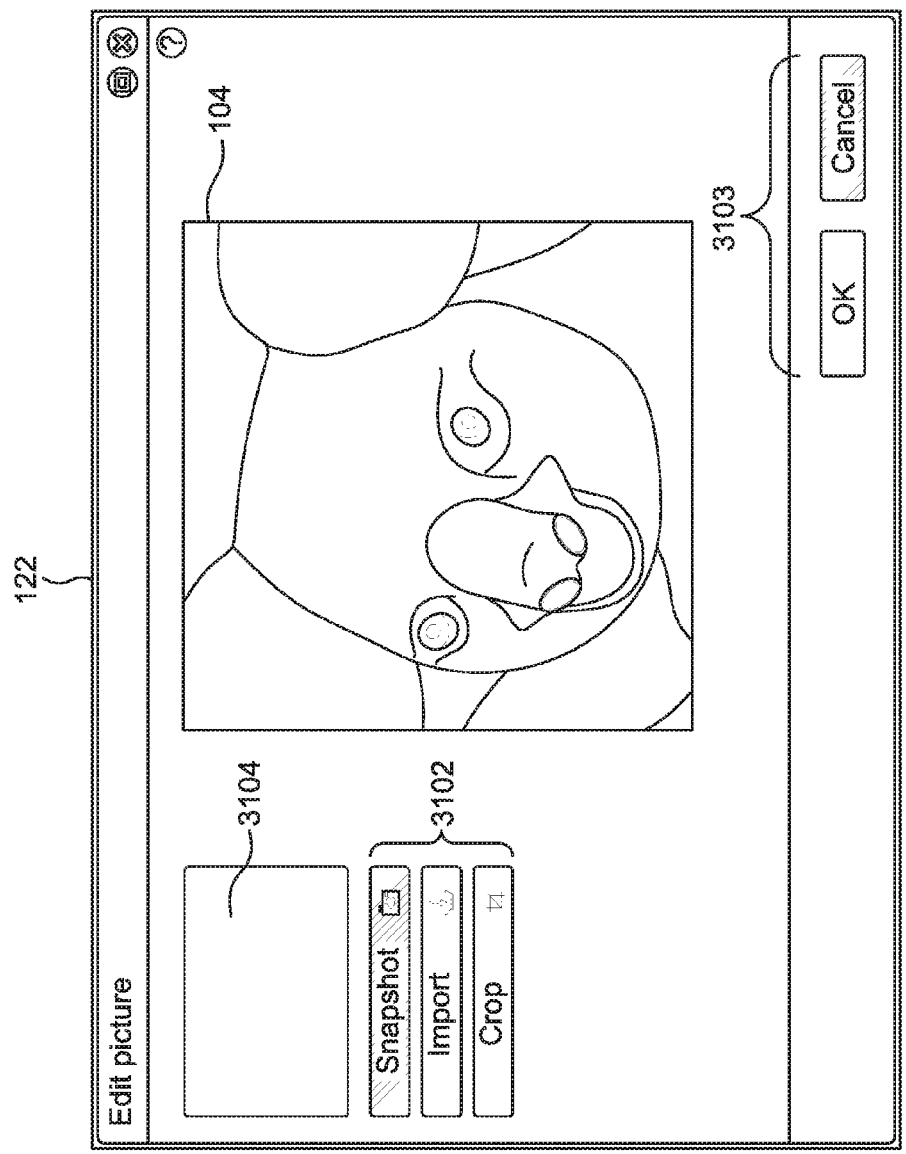
FIG. 4 shows the Edit Picture dialog displayed in response to selection of a user picture in the login screen.

FIG. 4 shows the edit picture dialog 122 that the Application displays in response to operator selection of the user picture 104 in FIG. 3. Image buttons 3102 allow the user to select and perform manipulation of the user picture 104, and commit buttons 3103 allow the user to accept or cancel the user operations from the image buttons 3102. A preview window 3104 displays the resulting user picture 104 prior to the user accepting the user picture 104 via the commit buttons 3103.

Figure 5:
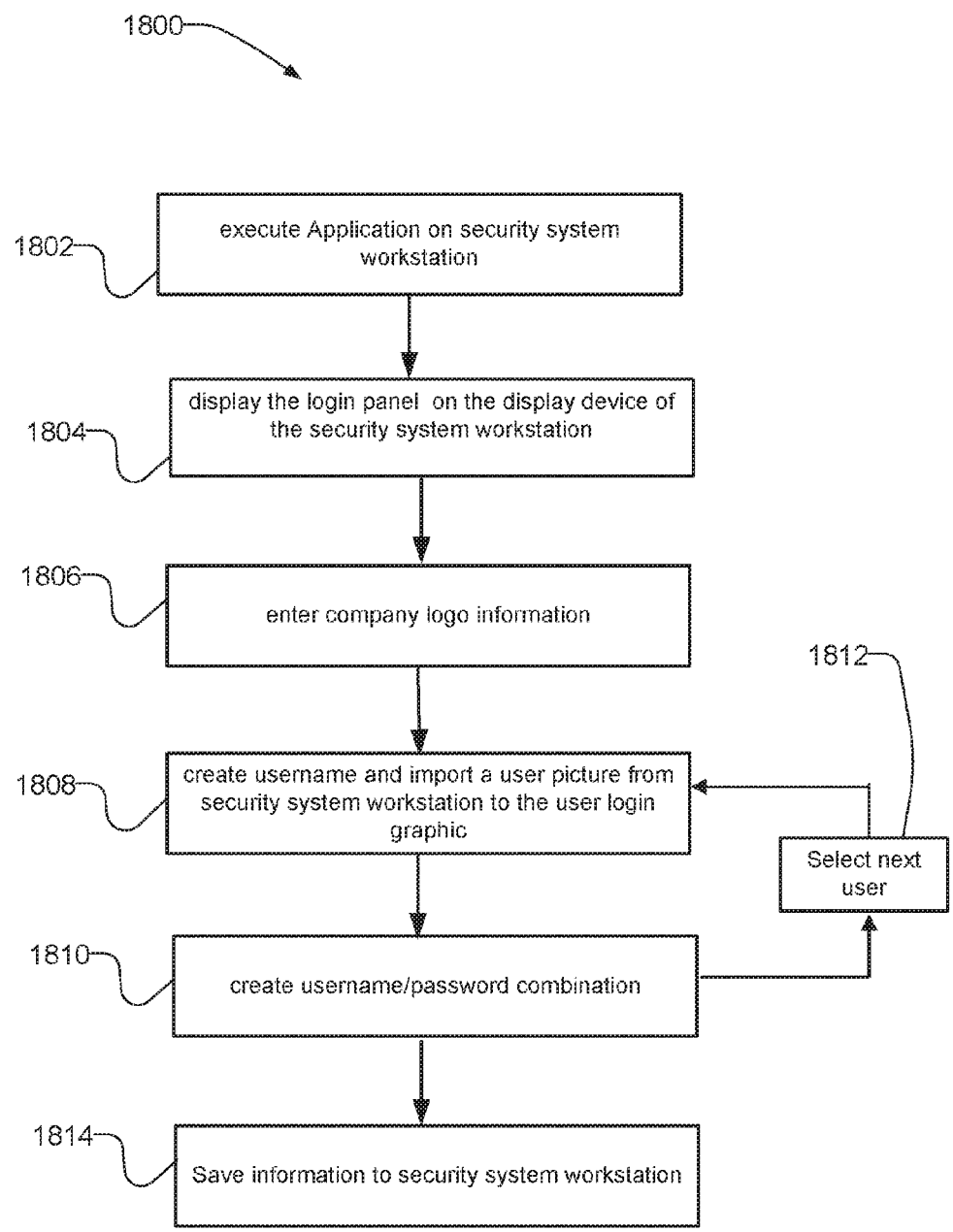
FIG. 5 is a flow chart illustrating a method for configuring user settings on the security system workstation.

FIG. 5 displays a method 1800 for customizing the Application login screen 100. In step 1802, the security system workstation 158 executes the Application. In step 1804, the login screen 100 displays on the user devices 163 and the display device 156 of the security system workstation 158. In step 1806, the operator enters company logo 102 information. In step 1808, the operator creates a username for the user, and imports a user picture 104 from the security system workstation 158 to the user login graphic 108. In step 1810, the operator enters a username/password combination and either proceeds to step 1814 to save the information to the security system workstation 158, or selects the next user according to step 1812. If the operator selects the next user in step 1812, the operator returns to step 1808.

Figure 6A:
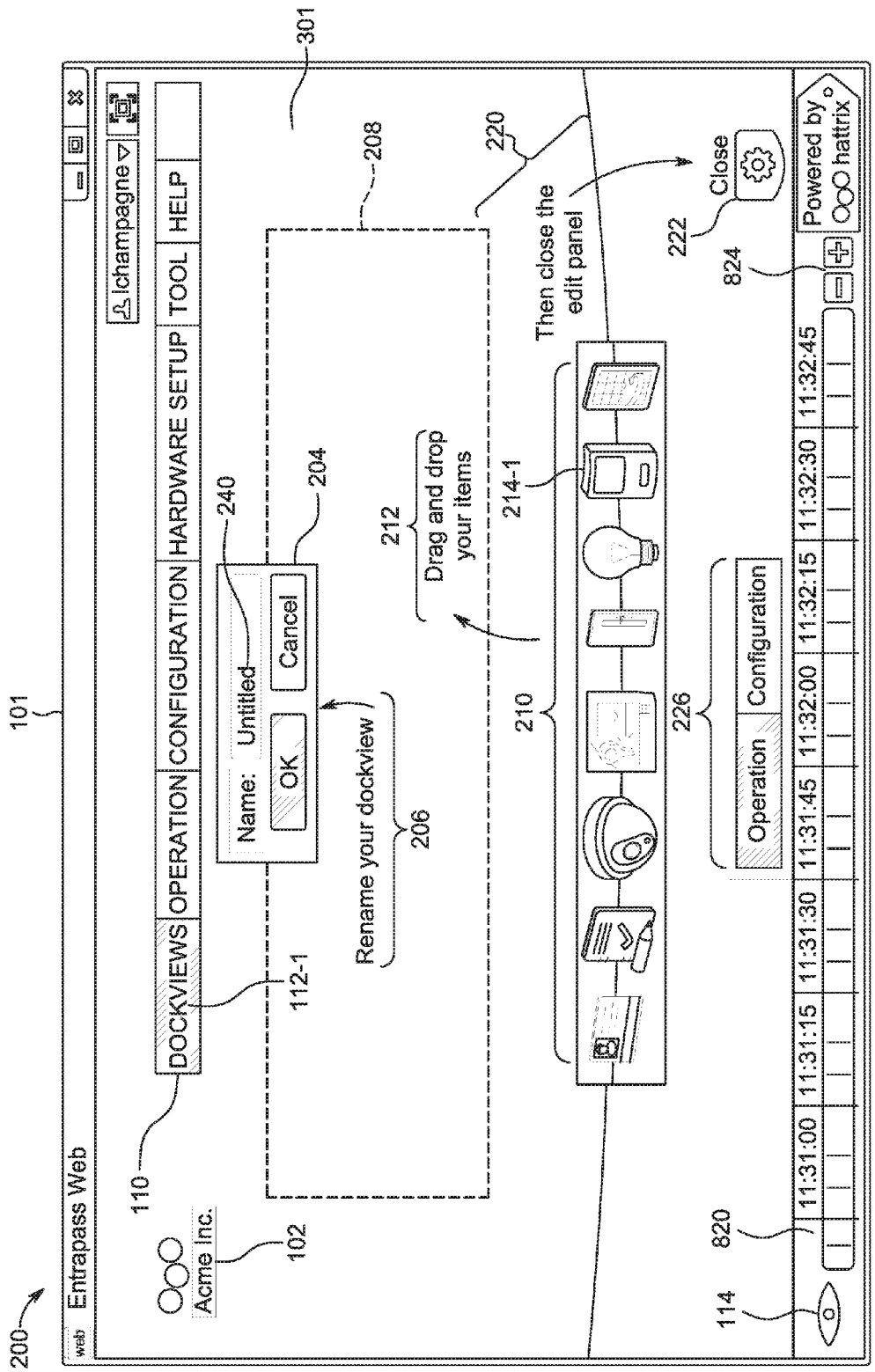
FIGS. 6A-6C show the configuration screen for configuring dockviews, showing the user task flow and tooltips that guide the user through configuration tasks.
Figure 6B:
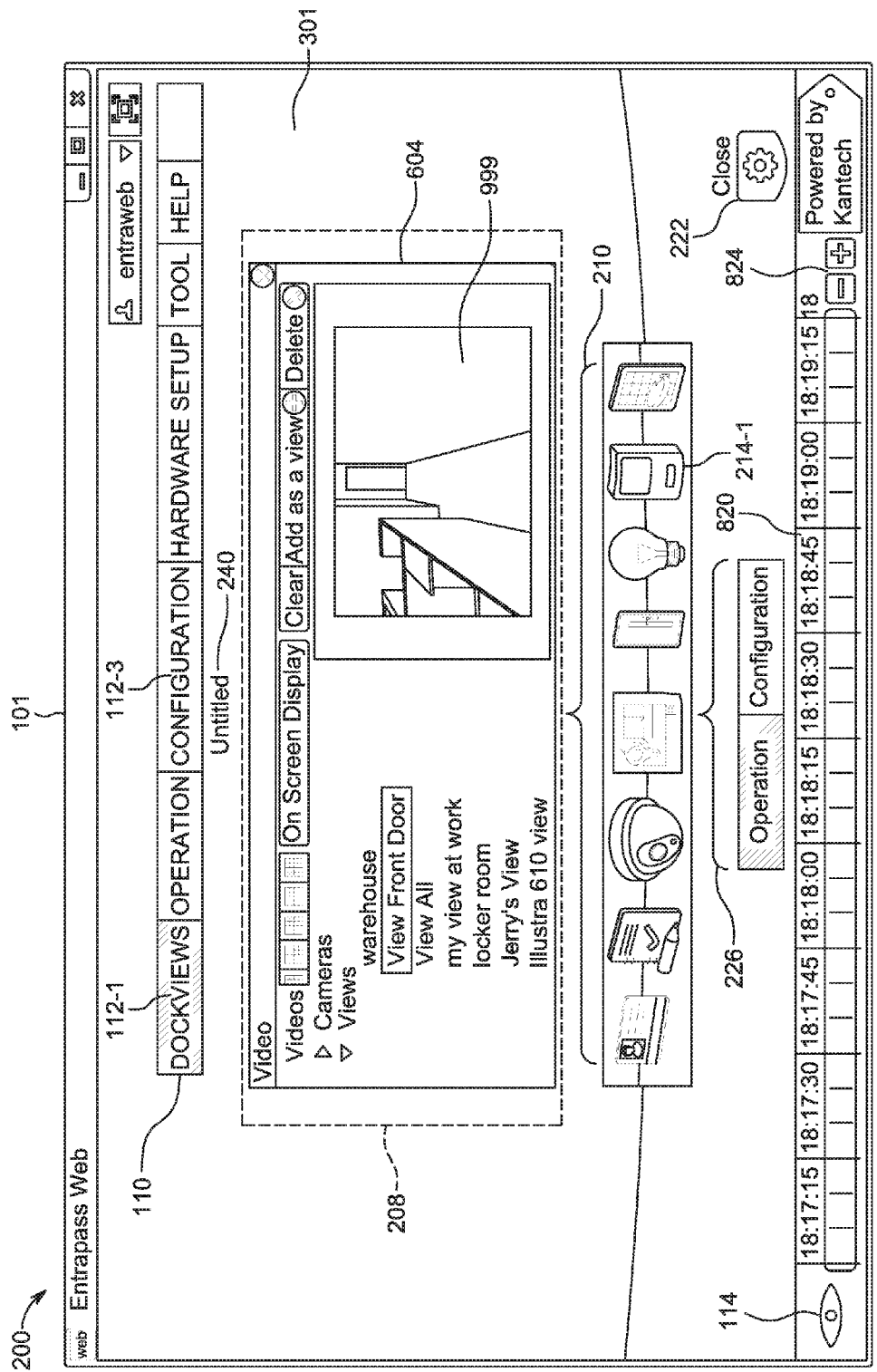
Figure 6C:
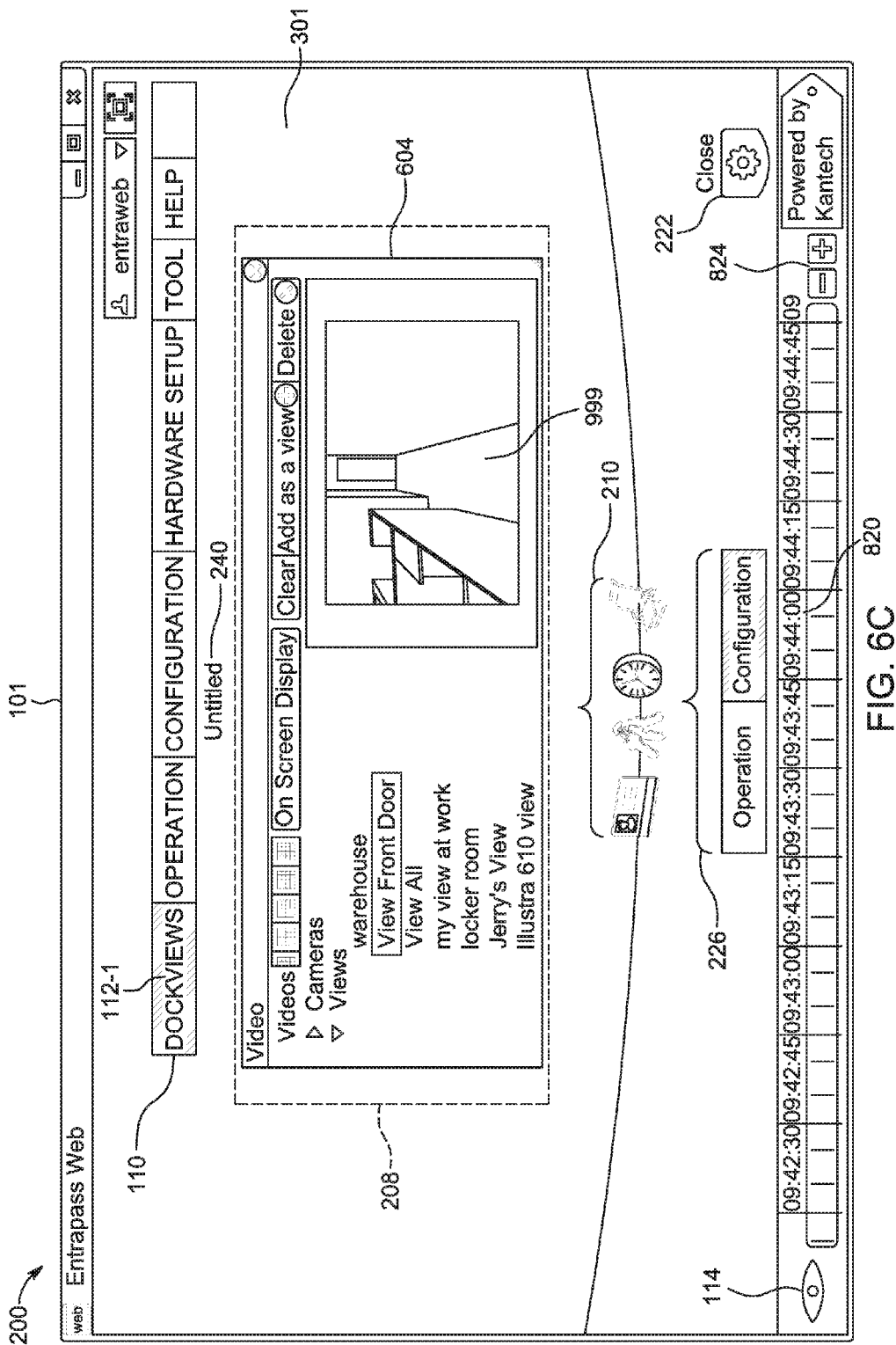

FIG. 6A-6C shows the configuration screen 200 that the Application displays in response to operator creation of a new dockview 203. Dockviews 203 are operator-created collections of objects of the security system and their object information. Typically, operators utilize dockviews 203 for managing and displaying the security system objects and their object information associated with physical premises. Examples include creating dockviews 203 that include the security system objects for an entire office building, or creating dockviews 203 for individual rooms within a building. In addition, operators can create dockviews 203 associated with logical grouping, such as a "user-specific" dockview 203 that includes the objects and their object information to which a specific user has access.

Each dockview 203 accepts object type icons 214 associated with the objects of the security system 150 and their object information. Each object type icon 214 represents a different object type for each object. In the configuration screen 200, operators include the object type icons 214 within the dockviews 203 using a drag-and-drop interface.

Using the drag-and-drop interface, operators select the object type icons 214 from one or more object type lists 210, and add the selected object type icons 214 icons to a drop region 208 of the configuration screen 200. This defines the contents of the dockview 203. The description that accompanies FIG. 7 describes the contents of an example dockview 203 in more detail, including how each drag and drop of the object type icons 214 in the configuration screen 200 creates a separate object within an object window 604 of the dockview 203.

The operator has multiple ways to create dockviews 203. One way to create a dockview is by selecting the Dockviews main menu tab 112-1 from the main menu toolbar 110, which opens the FIG. 8 Dockview list window 300. Within the Dockview list window 300, the operator selects the FIG. 8 "New" pinned dockview thumbnail 317 from the FIG. 8 featured dockview window 316. In response to operator selection of the "New" pinned dockview thumbnail 317, the Application opens the configuration screen 200 for a new dockview with "Untitled" dockview name 240 displayed in FIG. 6A-6C.

Another way to create a dockview 203 is when there are no dockviews 203 currently defined in the Application, and the operator selects the Dockviews main menu tab 112-1 from the main menu toolbar 110. This opens the configuration screen 200 with default dockview name 240, "Untitled," as illustrated in FIG. 6C. Yet another way to create a dockview 203 is to select the FIG. 8 dockview graphical indicator 302, which in this example is a thumbnail, associated with the "New" dockview name 240 from the Dockview list window 300. In response to operator selection of the "New" dockview thumbnail 302, the Application opens the configuration screen 200 for a new dockview with "Untitled" dockview name 240 displayed in FIG. 6A-6C.

During dockview 203 creation, the configuration screen 200 in FIG. 6A displays the dockview name dialog 204, which prompts the user to enter a dockview name 240, with the aid of the dockview name tooltip 206. The add item tooltip 212 prompts the user to add object type icons 214 from the object type list 210 for adding objects to the dockview 203.

The object type icons 214 represent the different types of objects of the security system 150. The Application supports multiple object types, each identified by an object type name 508. The object type names 508 for the supported object types include:

Relay 508-1;
User 508-2;
Event 508-3;
Door 508-4;
Report 508-5;
Video 508-6;
Map 508-7;
Input 508-8;
Access Level 508-9
Schedule 508-10;
Holiday 508-11;

-continued

Tenant List 508-12;
Connection 508-13; and
Controller 508-14.

In one example, object type icon 214-1 is associated with the "Input" object type name 508-8, for input devices 154. Each drag-and-drop operation of an object type icon 214-1 upon the drop region 208 creates a separate input device 154 object within the dockview 203.

The object type selector 226, in one example, offers two options for object type selection, either "Configuration" or "Operation." The Application displays different object type icons 214 in the object type list 210 for the two options.

The object type icons 214 that appear in the object type list 210 for the "Operation" object type selector 226 are displayed in FIGS. 6A and 6B. The object type icons 214 that appear in the object type list 210 for the "Configuration" object type selector 226 are displayed in FIG. 6C.

The "Operation" object type icons 214 include icons for the following object type names 508: Relay 508-1, User 508-2, Event 508-3, Door 508-4, Report 508-5, Video 508-6, Map 508-7, and Input 508-8.

The "Configuration" object type icons 214 include icons for the following object type names 508: User 508-2, Access Level 508-9, Schedule 508-10, Holiday 508-11, and Tenant List 508-12.

The Connection object type, object type name 508-13, and the Controller object type, object type name 508-14, are associated with the configuration of Door objects. More information on these object type names 508 accompanies the descriptions for the FIG. 23 Connections window 1500 and the FIG. 22 Hardware Setup window 1400, appearing later in this section.

The add item tooltip 212 prompts the user to drag and drop object type icons 214 from the object type list 210. Operators add objects to their dockviews 203 by dragging and dropping the object type icons 214 associated with objects onto the drop region 208 of the configuration screen 200. The add item tooltip 212 directs the operator to perform the drag and drop of the object type icons 214.

The open/close button 222 displays action "close" to indicate that dockview 203 editing or initialization is still in progress, and the operator must "close" the configuration screen 200 to end the dockview 203 creation or editing process and save their changes. When operators complete changes to their dockview 203 in the configuration screen 200, they select the open/close button 222 with the aid of the close button tooltip 220.

FIGS. 6B and 6C display the configuration screen 200 for the newly created dockview 203 of FIG. 6A after the operator has dragged and dropped an object type icon 214 associated with a security camera 166, or "video" object, from the object type list 210 onto the drop region 208. In response to the operator drag and drop operation, the Application creates an object window 604 in the drop region 208 that includes one or more objects of the same object type. In FIGS. 6A and 6B, a specific security camera 166 object is displayed in object window 604, which also includes video stream 999 object information from the security cameras 166.

FIG. 6C also displays the "Configuration" option of the object type selector 226. Selection of the "Configuration" object type selector 226 displays object type icons 214 associated with configuring object information that are typically not associated with security device objects. Instead, "Configuration" objects apply to lists of object information that often apply to more than one object type. For example, the object type icons 214 in the object type list 210 include icons for assigning users to access cards 113, assigning users to access control lists, and defining schedules of operation for all security devices.

In FIGS. 6B and 6C, the operator can drag and drop additional object type icons 214 from the object type list 220 onto the drop region 208 of the configuration screen 200 in order to add more objects to the dockview 203. The open/close button 222 displays action "close" to indicate that dockview editing or initialization is still in progress, and the operator must "close" the window to end the dockview editing process and save their changes.

Figure 7:
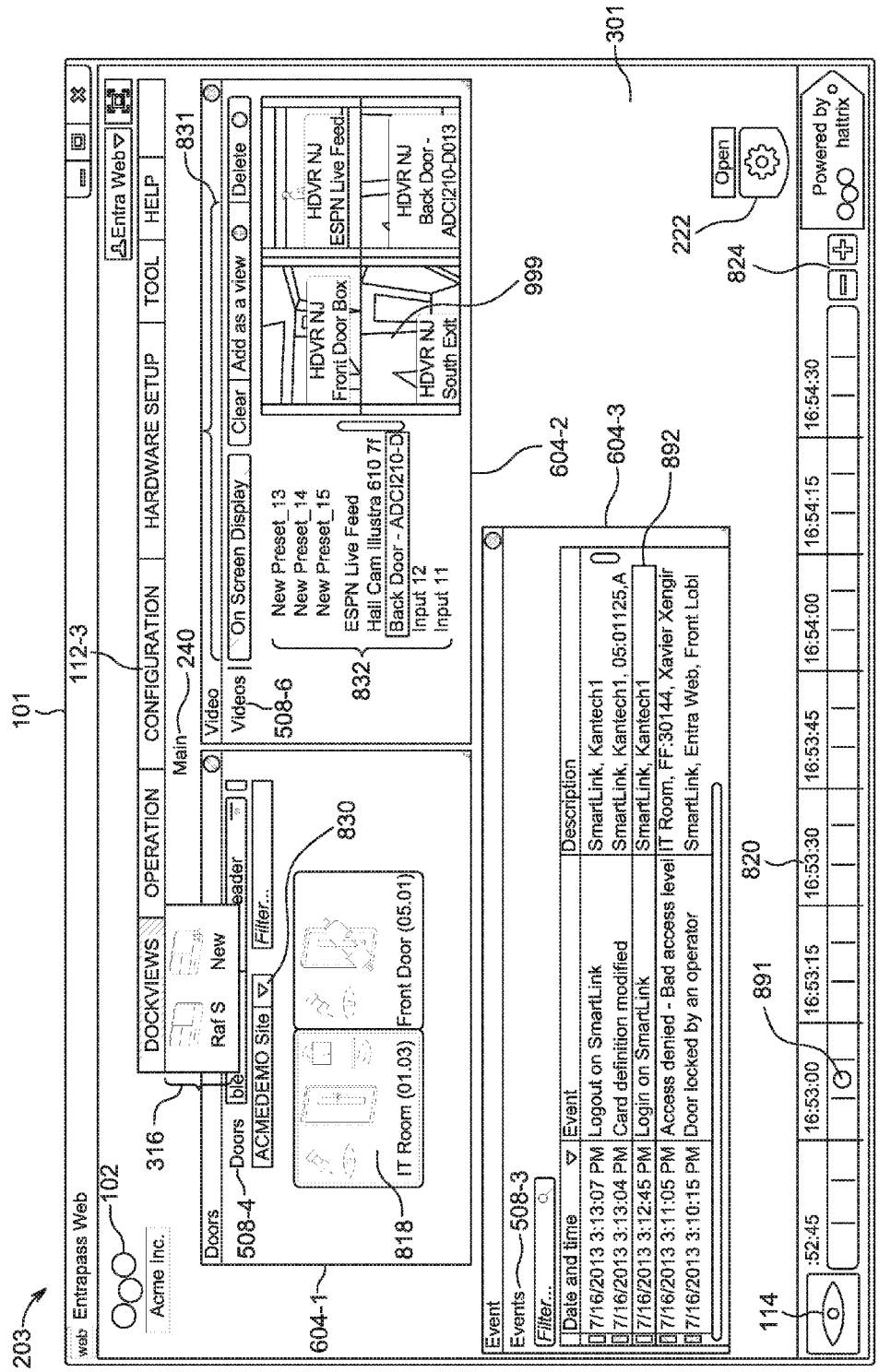
FIG. 7 shows the contents of an exemplary dockview named "Main" that includes a door object, an event data object, and a security camera object displaying live video streams in separate object windows within the dockview.

FIG. 7 shows the contents of an exemplary dockview 203 with dockview name "Main." The dockview 203 includes object windows 604 that include objects and object information associated with different object types. Each object window 604 typically presents the object information for its objects in a manner that befits intuitive display and management. For example, object window 604-3 includes objects of the "Event" type. Each instance of the Event type is a string of text associated with event data 892 sent from security device objects. As a result, object window 604-3 presents the event data 892 in a list.

In another example, object window 604-1 includes Door objects. Unlike the Event type objects, which display their object information in text strings, Door objects for individual doors 164 are associated with door controllers 162, which have multiple configuration parameters. In addition, because the security system 150 can support objects located in different geographical locations or buildings over a security network 152, security systems 150 often include hundreds or even thousands of doors 164 to manage and display. As a result, the Application supports the display and management of Door objects in the "Door" type object window 604-3 differently than the display and management of Event objects in the "Event" object window 604-1.

Specifically, in response to the operator dragging and dropping each object type icon 214 of the "Door" object type during dockview creation/modification illustrated in FIG. 6A-6C, the Application creates a separate object entry icon 818 for each Door object in the "Door" type object window 604-3. The Door object that each object entry icon 818 represents is "blank" or uninitialized. The operator then selects the object entry icon 818 for each uninitialized Door object, and associates the object entry icon 818 with an actual Door object. The operator utilizes a site selector 830 for selecting an actual Door object from a list of Door objects for each site or physical installation.

Object window 604-2 includes objects and object information from "Video" type objects associated with security cameras 166. The object information from the security cameras 166 include video streams 999. As with the "Doors" object window 604-1 and selection of its Door objects, Object window 604-2 utilizes graphical elements that befit the unique configuration and display needs of security cameras 166 and their video streams 999. For example, the Video object window 604-2 includes video action buttons 831, which enable selection and display of video streams 999 from a video stream list 832.

The operator can also modify the contents of an existing dockview 203 via the open/close button 222. Note that the open/close button 222 of existing dockview 203 of FIG. 7 displays state "open." In response to operator selection of the open/close button 222, the Application "opens" the dockview 203 for editing, and displays the contents of the existing dockview 203 in the configuration screen 200 as illustrated in FIGS. 6B and 6C.

Figure 8:
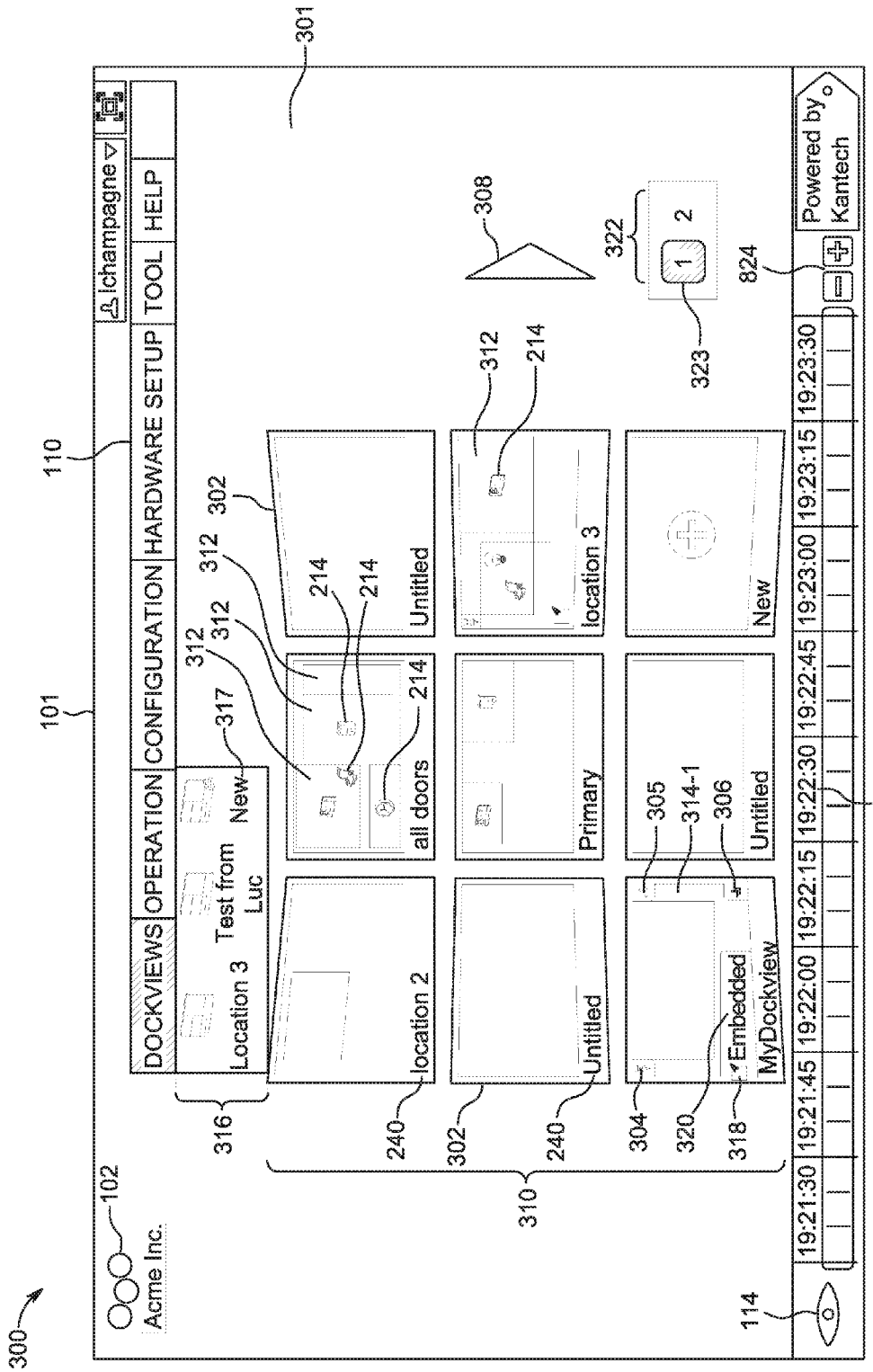
FIG. 8 shows a dockview list window for selection and management of dockviews.

FIG. 8 shows the Dockview list window 300 for displaying and managing dockviews 203. When one or more dockviews 203 exist in the Application, selection of the Dockviews main menu tab 112-1 from the Main menu toolbar 110 brings up the dockview list window 300. The dockview list window 300 allows the operator to select an existing dockview 203 for editing and displaying its contents. The Dockview list window 300 displays dockview thumbnails 302 that represent each dockview 203 in a dockview matrix 310.

Figure 11:
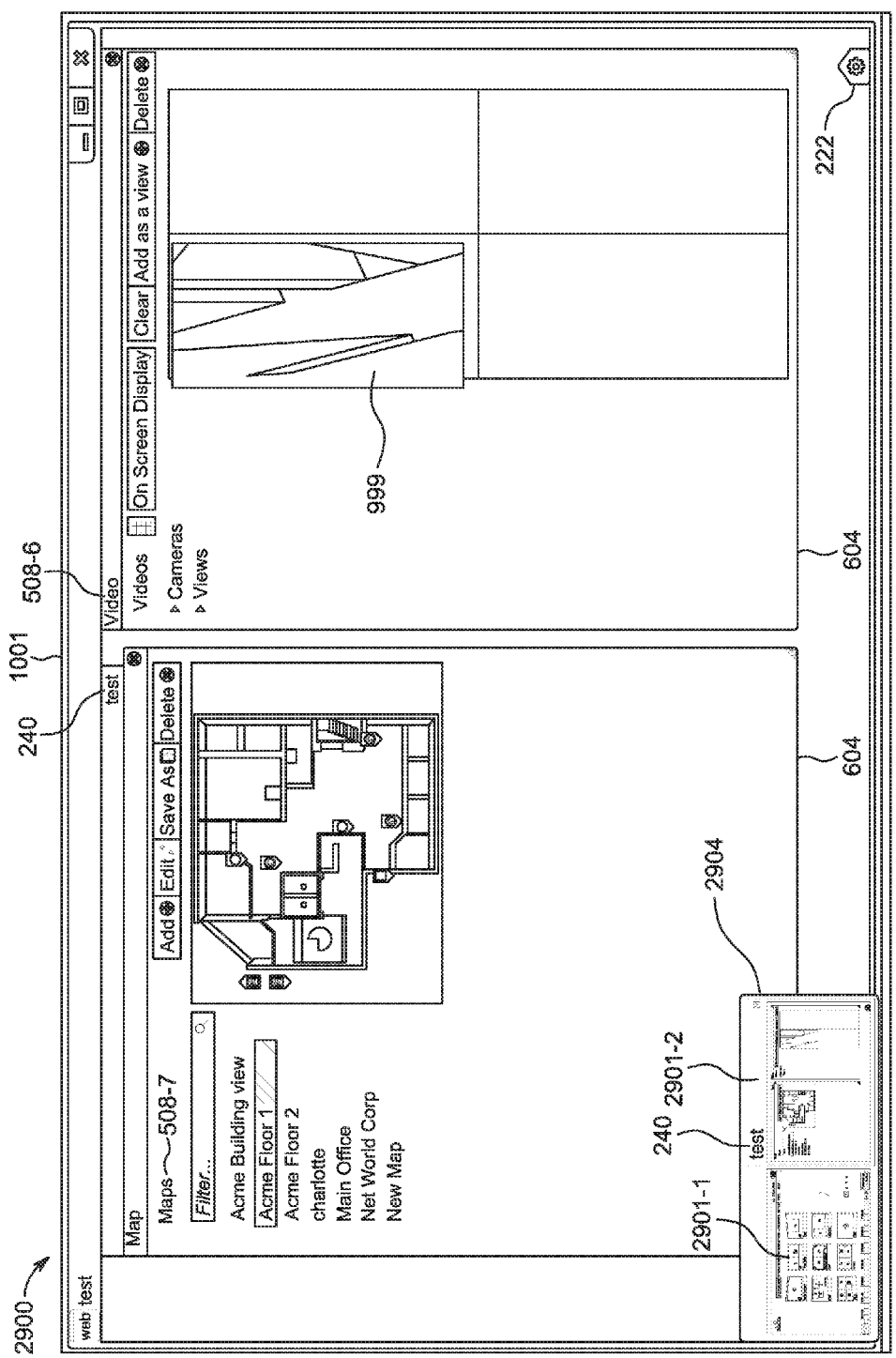
FIG. 11 shows an embedded dockview, displayed in a new application window.

When the operator selects the dockview thumbnail 302 for a dockview 203, the Application opens its associated dockview 203 in either the main window 101 in browser 161, as shown in FIG. 7, or in a new application window 1001 as shown in FIG. 11. This display choice depends on whether the dockview is "not embedded," or "embedded," respectively.

Embedding a dockview 203 provides the operator with the ability to include the contents of the dockview 203 in a new application window 1001, separate from the main window 101 displayed inside the browser 161. The operator can then move the new application window 1001 including the embedded dockview 2900 across the display device 156 of the security system workstation 158, or across the display of the mobile devices 159.

The operator embeds a dockview 203 by indicating the embedded dockview selector 318 of its dockview thumbnail 302 in the Dockview list window 300. In response to the indication, an embedded dockview indicator 320 of each dockview thumbnail 302 reflects the current state of the dockview with respect to embedding. The possible states are "embedded," as shown within indicated dockview thumbnail 314-1 in FIG. 8, and within indicated dockview thumbnail 314-3 in FIG. 10B, and "not embedded," as shown within indicated dockview thumbnail 314-2 in FIG. 10A.

The new application windows 1001 also enable interactions between the objects of embedded dockviews 203, and other applications of the user devices. An embedded dockview 203 that includes Map objects can communicate with an interactive map application for location services, in one example. In another example, a video stream 999 of an embedded dockview 2900 can be selected/"dragged and dropped" onto the interface of a call center application in the same application window 1001, for associating the video stream 999 to an emergency event tracked by the call center application.

The dockview thumbnail 302 displays the value of the embedded dockview indicator 320 when the operator indicates the embedded dockview selector 318 of an indicated dockview thumbnail 314, such as via a pointing device 160 hover operation.

Operators navigate to additional dockview thumbnails 302 within the dockview matrix 310 via the window navigation control 308 and the window number selector 322. The additional dockview thumbnails 302 exist when the number of existing dockviews 203 exceeds the ability of the Application to display their associated dockview thumbnails 302 within the working area 301 of the main window 101. The window number selector 322 indicates the total number of screens of dockview thumbnails 302 in the Application, highlights the current screen number 323 being displayed, and moves to the selected screen in response to operator selection of a screen number 323 in the window number selector 322.

The window navigation control 308 also moves the display of dockviews 203 to the next screen of dockviews 203, and the window number selector 322 reflects the current screen display selection. Each dockview thumbnail 302 displays the dockview name 240, object type overlays 312 that correspond to object types currently assigned to the dockview 203, and a set of selection tools to perform operations upon the dockview 203. Each object type overlay 312 includes an object type icon 214 that allows operators to "at a glance" ascertain the object types included within the dockviews 203 for each dockview thumbnail 302, without requiring the operator to open the dockview 203. The selection tools include a pinning selector 304 for adding the dockview 203 to the featured dockviews window 316, a delete selector 305 for deleting the dockview 203, a user assignment selector 306 for assigning users to a dockview 203, and an embedded dockview selector 318.

Pinning of a dockview thumbnail 302 for a dockview 203 allows an operator to feature the display of pinned dockview thumbnails 302 similar to a "favorites" list. To pin a dockview thumbnail 302, the operator selects the pinning selector 304 within the dockview thumbnail 302. In response to the selection, the pinning selector 304 moves to an upright position, and changes its color to indicate the selection.

When the operator pins a dockview thumbnail 302, the Application adds a pinned dockview thumbnail 317 for the dockview 203 to the featured dockview window 316. The featured dockview window 316 is not displayed by default. The Application displays the featured dockview window 316 when the user indicates the Dockviews main menu tab 112-1 in the main window 101 via a pointing device 160 hover operation. Deselecting the pinning selector 304 for a pinned dockview 203 removes its pinned dockview thumbnail 317 from the featured dockview window 316. The pinning selector 304 moves to a down position and changes its color in response to the deselection.

The featured dockview window 316 displays pinned dockview thumbnails 317 associated with pinned dockviews 203. The featured dockviews window 316 also displays a default pinned dockview thumbnail 317, for creation of a "New" dockview 203.

The Application displays a separate object type overlay 312 for each object type the operator has added to their dockview 203. Each object type overlay 312 displays the object type icon 214 for the object type that the overlay represents. The object type overlays 312 display with different transparency so the operator can determine the number of object type overlays 312, and therefore the number of object types assigned to the dockview 203. This is another visual reference for the operator to see "at a glance" the high-level information associated with each dockview 203 from the dockview list window 300.

The operator selects the user assignment selector 306 for a dockview thumbnail 302 to assign one or more users to a dockview 203.

Figure 9:
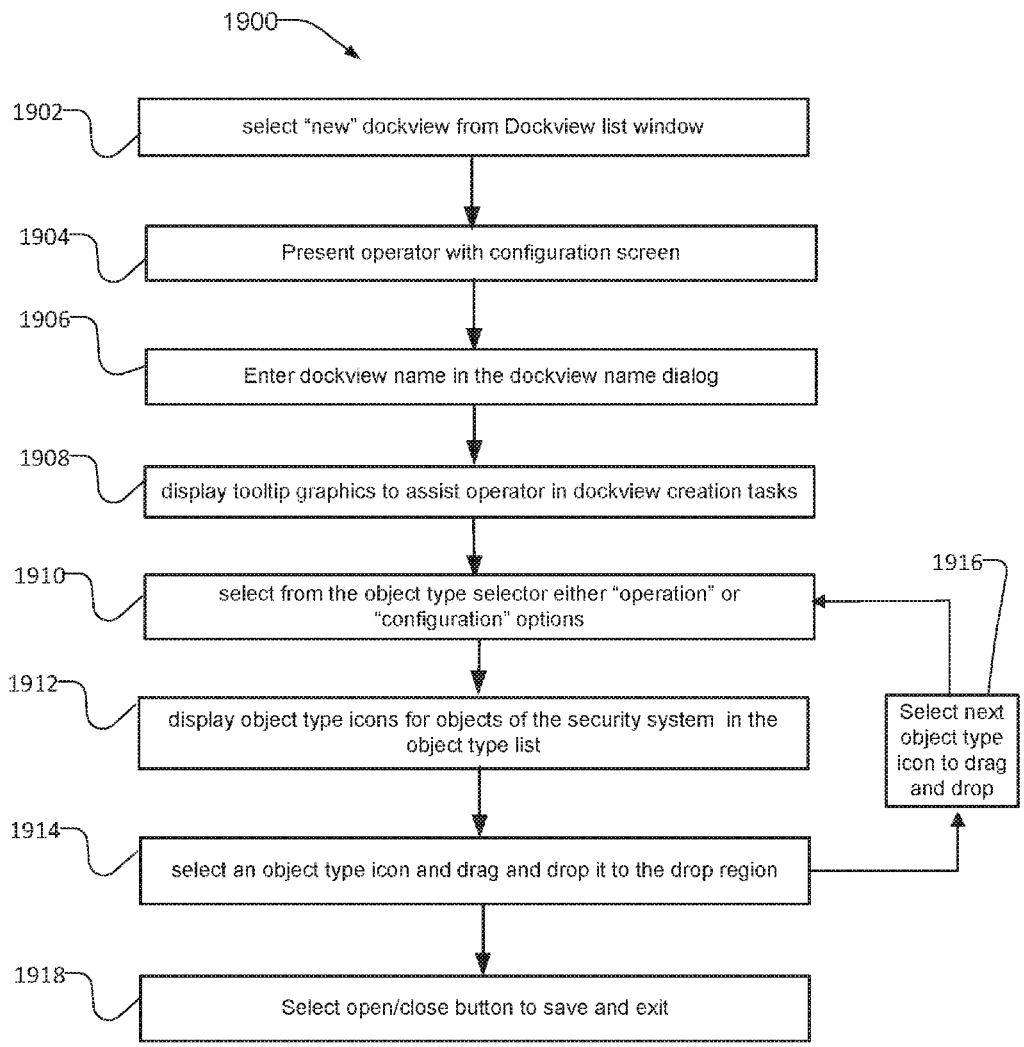
FIG. 9 is a flow chart illustrating a method for creating and defining a dockview for presenting object information from objects in the security system.

FIG. 9 displays a method 1900 for initializing a dockview. According to step 1902, the operator selects a "New" dockview from the Dockview list window 300 menu, and in response, the Application displays the configuration screen 200 for editing the dockview 203 in step 1904. In step 1906, the operator enters the dockview name 240 in the dockview name dialog 204. In step 1908, the Application displays tooltip graphics to assist the operator in dockview 203 creation tasks. According to step 1910, the operator selects from the object type selector 226 either Configuration or Operation options.

In step 1912, the Application displays object type icons 214 for objects of the security system in the object type list 210. According to step 1914, the operator selects an object type icon 214 from the object type list 210, and drags and drops it to the drop region 208. The operator then either selects the next object type icon 214 to drag and drop to the drop region 208 in step 1916, which returns to step 1910, or continues to step 1918 to select the open/close button 222 to save and exit.

Figure 10A:
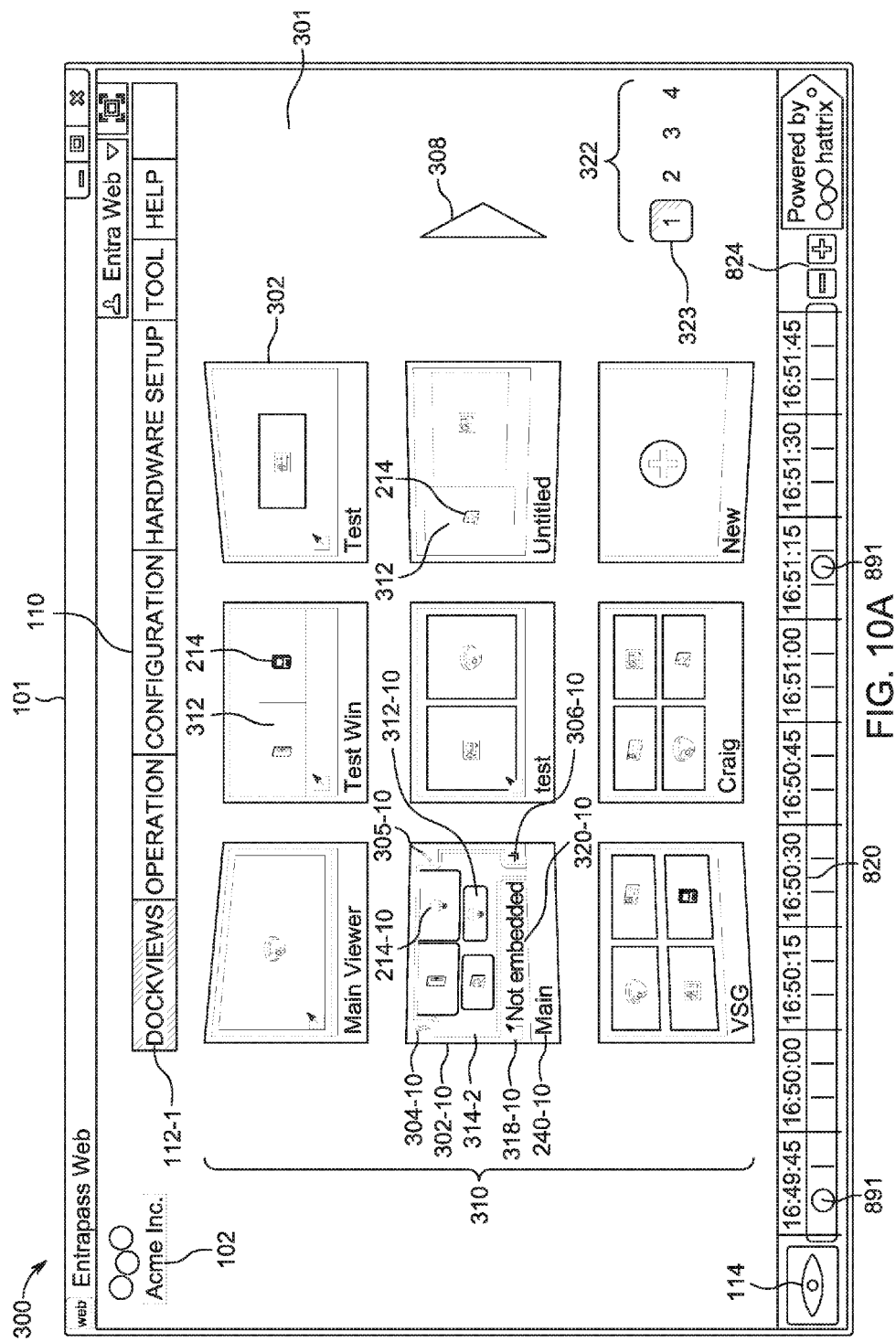
FIG. 10A-10B show highlighted dockview thumbnails representing dockviews in the dockview list window, the highlighted thumbnails associated with the selection of the embedded dockview feature.
Figure 10B:
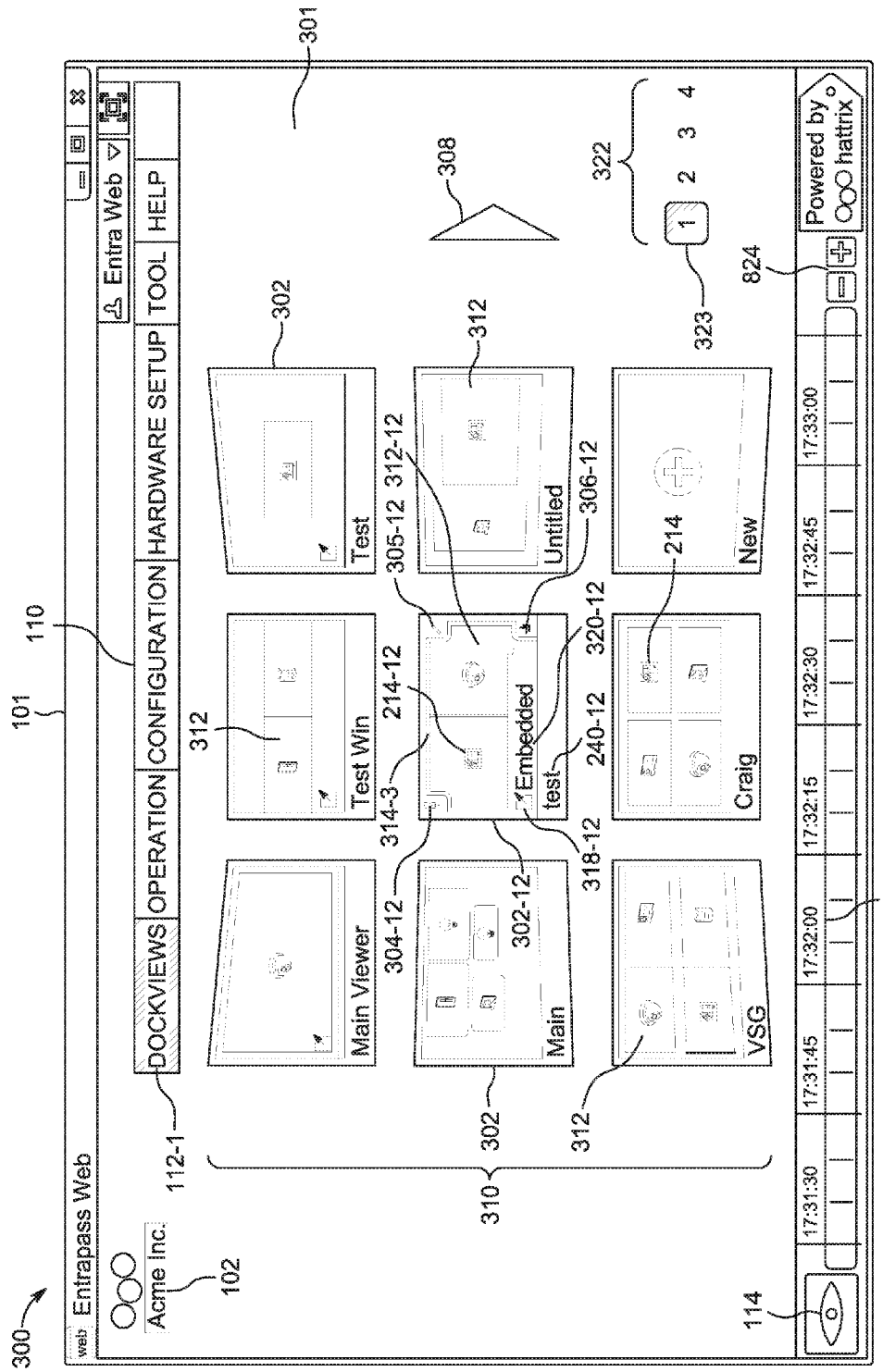

FIGS. 10A and 10B also display the Dockview list window 300, which is illustrated and described in detail in the description for FIG. 8. Operators can indicate only one dockview thumbnail 302 at a time within the dockview matrix 310 of the Dockview list window 300. As a result, FIG. 10A illustrates indicated dockview thumbnail 314-2, the embedded dockview indicator 320-10 of which indicates the "not embedded" state, and FIG. 10B illustrates indicated dockview thumbnail 314-3, the embedded dockview indicator 302-12 of which indicates the "embedded" state.

The indicated dockview thumbnail 314-2 highlights dockview thumbnail 302-10 in FIG. 10A. Dockview thumbnail 302-10 includes embedded dockview selector 318-10, embedded dockview indicator 320-10, and object type overlays 312-10 with object type icons 214-10. Dockview thumbnail 302-10 also includes user assignment selector 306-10, delete selector 305-10, pinning selector 304-10, and dockview name 240, "Main".

The indicated dockview thumbnail 314-3 highlights dockview thumbnail 302-12 in FIG. 10B. Dockview thumbnail 302-12 includes embedded dockview selector 318-12, embedded dockview indicator 320-12, and object type overlays 312-12 with object type icons 214-12. Dockview thumbnail 302-12 also includes user assignment selector 306-12, delete selector 305-12, pinning selector 304-12, and dockview name 240, "test".

FIG. 11 shows an embedded dockview 2900 within a new application window 1001. Specifically, the Application displays embedded dockview 2900 with dockview name 240, "test," in response to operator selection of dockview thumbnail 302-12 in FIG. 10B. An embedded dockview 2900 presents graphical elements associated with creation and initialization of dockviews 203, such as the dockview name 240, the object windows 604, and the open/close button 222. Otherwise, the new application window 1001 does not include the graphical elements and panels found in "non-embedded" dockviews 203, such as the main menu toolbar 110 and the scrolling feeds 820. However, unlike dockviews 203 displayed in the main window 101 of browser 161, each new application window 1001 provides the ability for the objects of their embedded dockviews 2900 to communicate with other applications of the user devices presented in the application windows 1001.

In FIG. 11, the graphical user interfaces 180 presented by the Application also include an inset thumbnail 2901-1 of the main window 101 of the Application, and an inset thumbnail 2901-2 of the new application window 1001 that includes the contents of the embedded dockview 2900. The inset thumbnails 2901 are included within an inset window 2904 of the Application.

Figure 12:
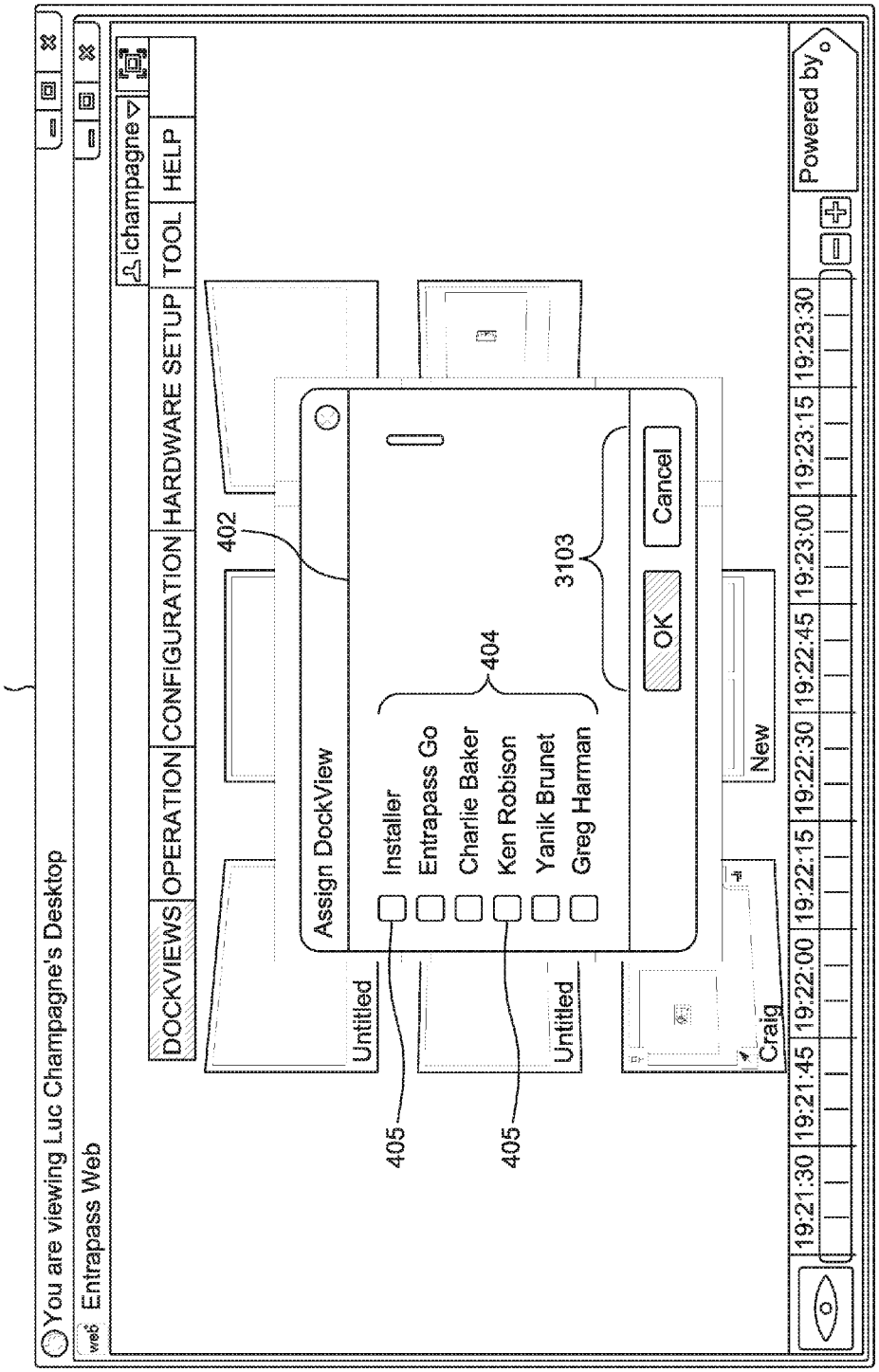
FIG. 12 shows the assign dockview dialog, displayed in response to an "assign user" operation performed upon a dockview thumbnail in the Dockview List window.

FIG. 12 shows the Assign Dockview dialog 402 displayed by the Application in the main window 101, in response to selection of the user assignment selector 306 for a dockview thumbnail 302 in the Dockview List window 300. The operator selects users 405 from a user list 404, and only selected users will have access to that dockview 203. The operator accepts or cancels the selection via the commit buttons 3103.

Figure 13:
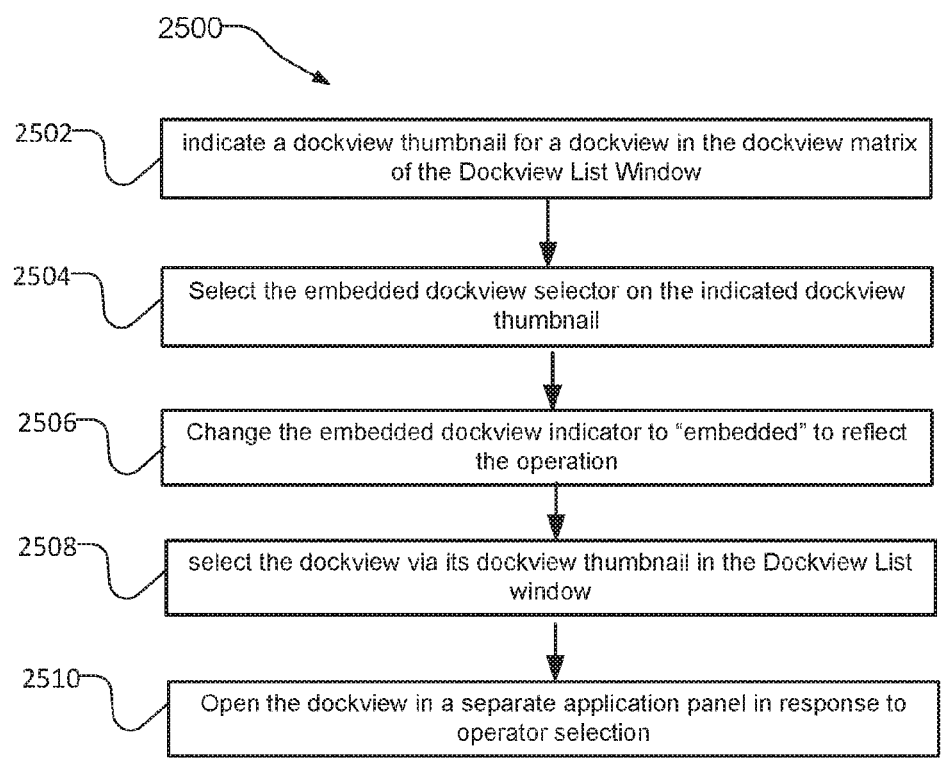
FIG. 13 is a flow chart illustrating a method for embedding dockviews in a new application window.

FIG. 13 displays method 2500 for defining an embedded dockview 2900, which includes the contents of that dockview 203 in a new application window 1001 specific to each embedded dockview 2900. In step 2502, in the Dockviews List window 300, the operator indicates a dockview thumbnail 302 for a dockview 203 in the dockview matrix 310. Indication is a hover operation of the dockview thumbnail 302 via a pointing device 160. In step 2504, the operator selects the embedded dockview selector 318 on the indicated dockview thumbnail 314. In step 2506, the embedded dockview indicator 320 changes to "embedded" to reflect the operation.

In step 2508, the operator selects the dockview 203 via its dockview thumbnail 302 in the dockview list window 300. In step 2510, in response to the selection, the Application opens the embedded dockview 2900 in a separate application window 1001.

Figure 14A:
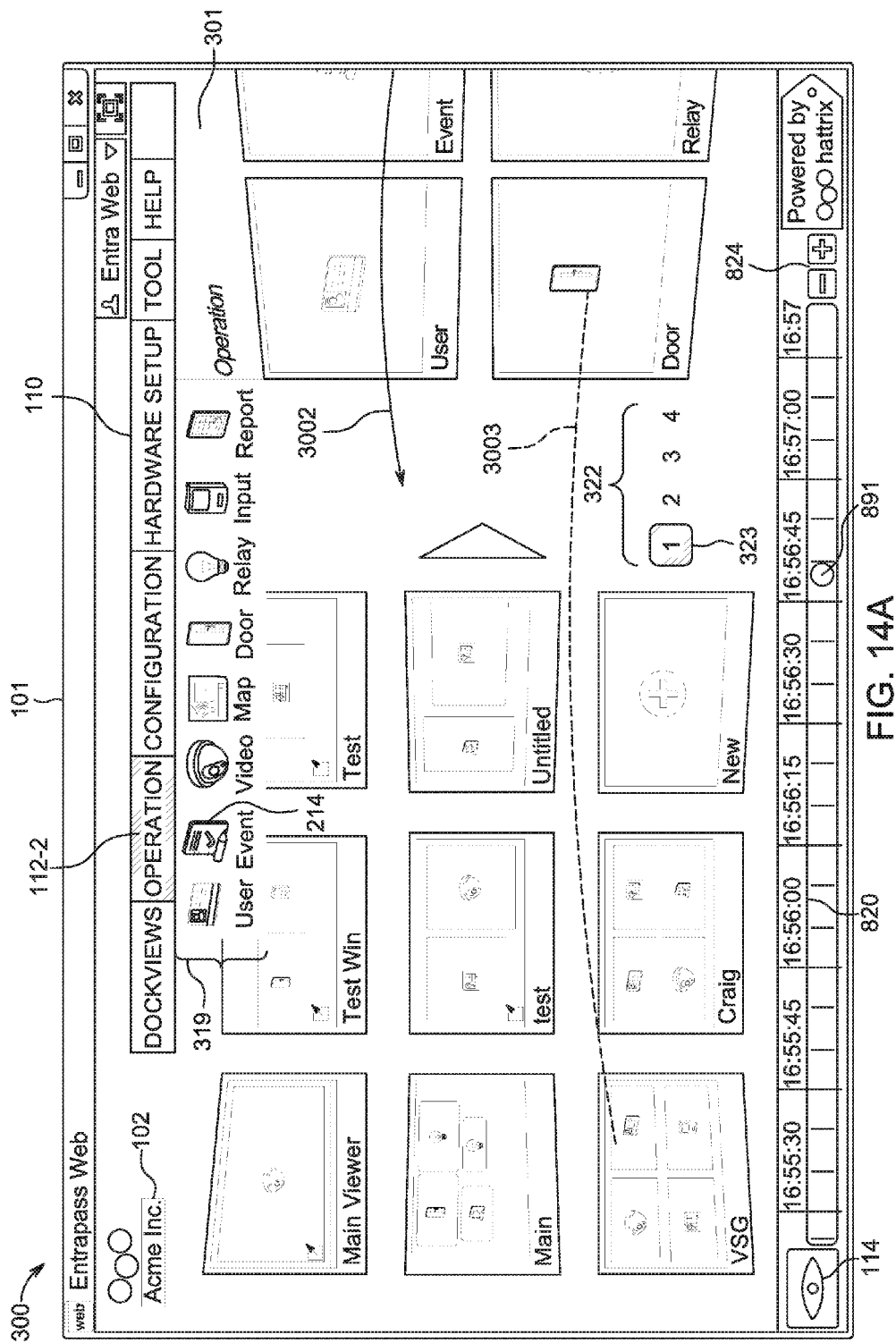
FIG. 14A-14B show how the Application updates the display of information in the main window in response to screen transitions, by presenting the information in a presentation direction within the working area, having a cylindrical graphical surface, of the main window.
Figure 14B:
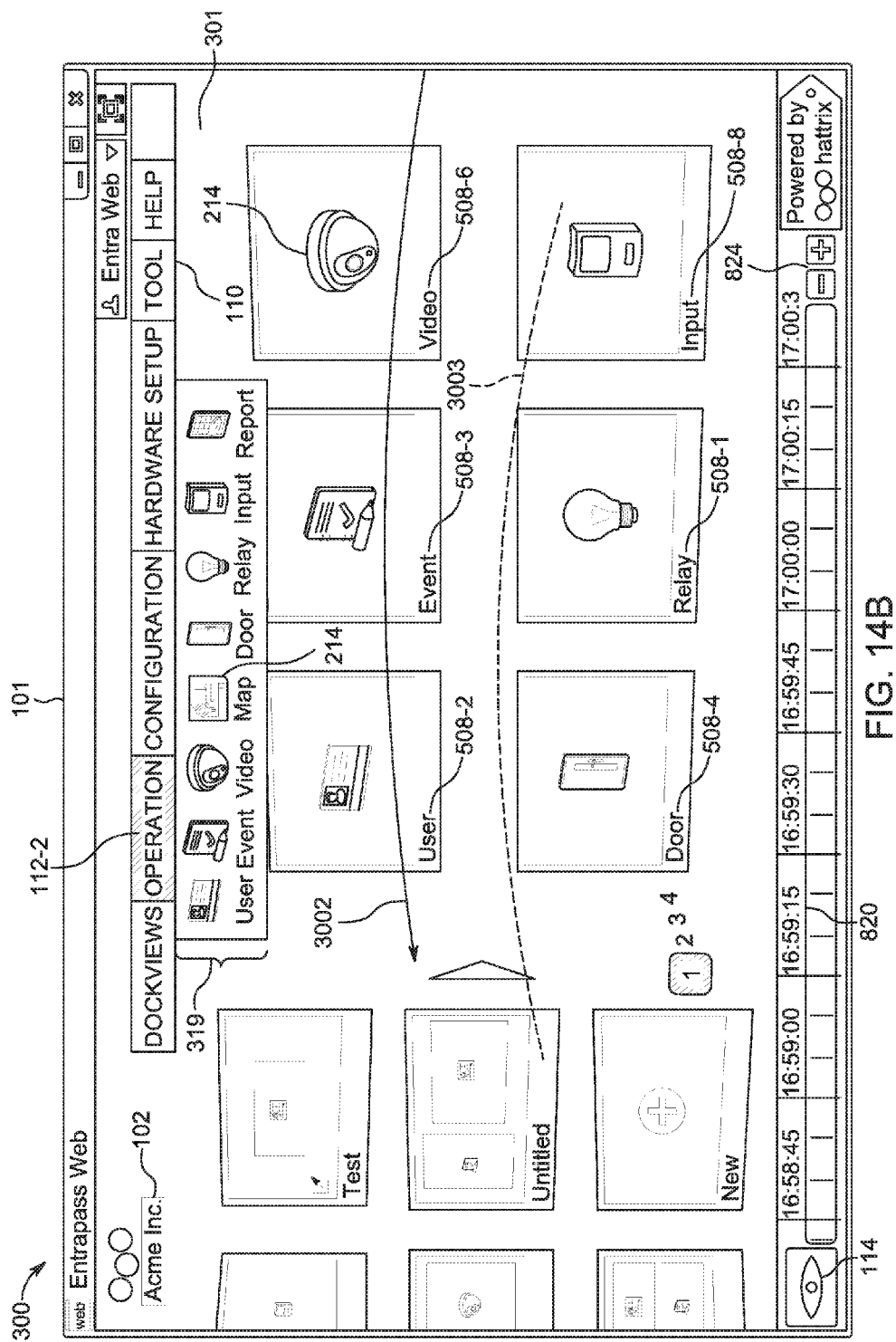

FIGS. 14A and 14B illustrate the display of information within the main window 101 during transitions and screen updates. Navigation in the Application has a common look and feel when displaying information. When the Application updates currently displayed window content with new content, the Application displays the update in a novel way. The Application renders the content on a graphics plane that suggests the information is displayed within a curved image surface 3003 or virtual cylinder. The currently displayed content "turns away" from the operator along the curved image surface 3003 according to a presentation direction 3002.

Figure 15:
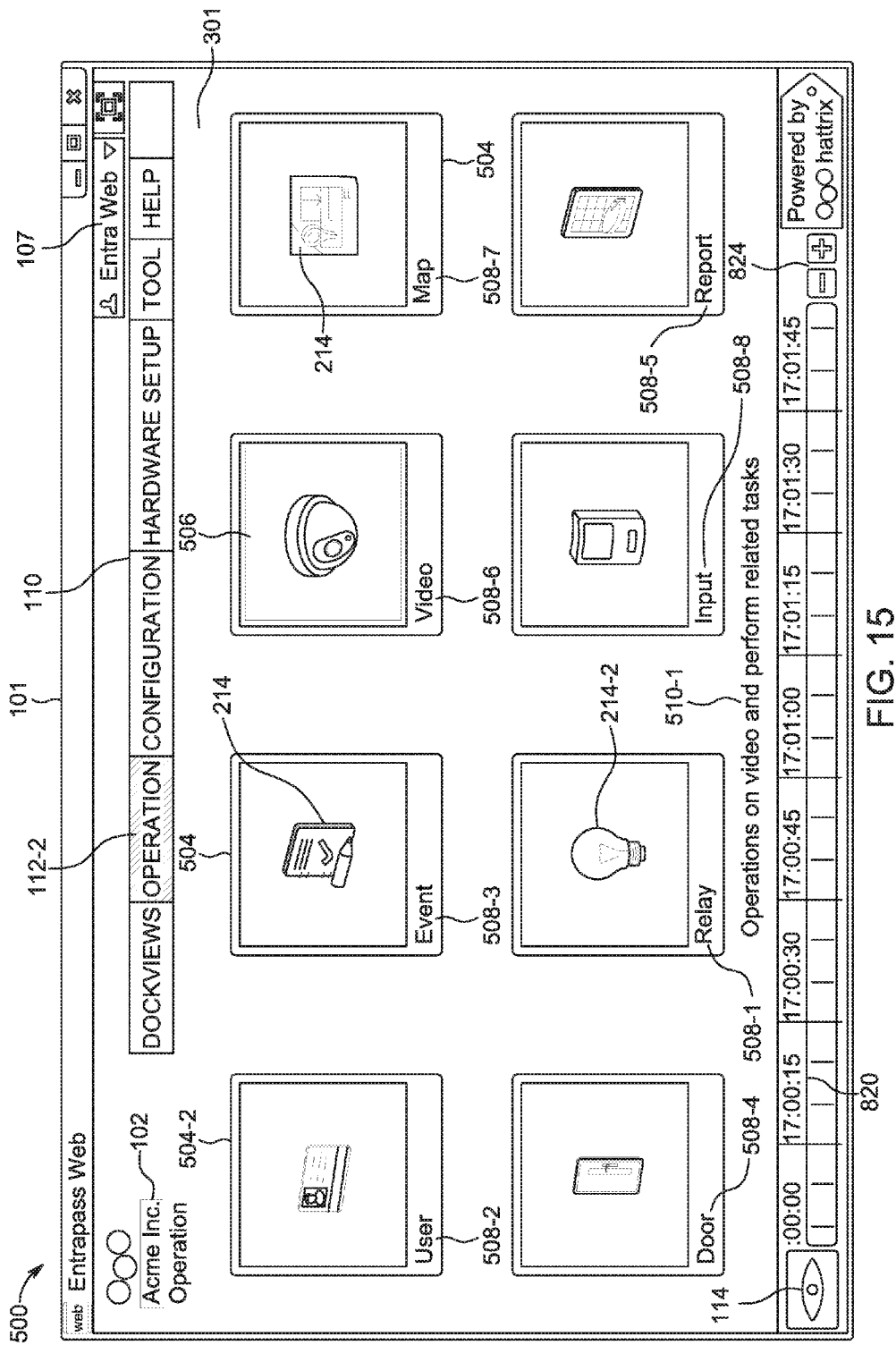
FIG. 15 displays the Operation window, and its associated object types.

In addition, FIGS. 14A and 14B illustrate the action pop-up windows 319 that display in response to indication of the main menu tabs 112. In the figures, main menu tab 112-2, "Operation," is indicated by the operator via a pointing device 160 such as a mouse. In response to the indication, the Application presents object type icons 214 in the action pop-up window 319, for the actions associated with each main menu tab 112. FIG. 15 shows the Operation window 500. The Application displays the Operation window 500 when the user selects the Operation main menu tab 112-2 of the main menu toolbar 110. The Operation window 500 displays object type thumbnails 504 associated with each Operation object type. Each object type thumbnail 504 has an object type name 508, also known as an object type 508, and an object type icon 214. For example, object type name 508-1, "Relay," and object type icon 214-2 are associated with the Relay object type.

Object types associated with the Operation window 500 include User, Event, Video, Map, Door, Relay, Input, and Report object types. As with indication of dockview thumbnails 302 associated with dockviews 203 in FIGS. 8, 10A, and 10B, operators indicate, or highlight, object type thumbnails 504 associated with Operation objects. The Application displays a highlighted object type overlay 506, here for the "Event" object type, in response to an indication of an object type thumbnail 504. The highlighted object type summary text 510 displays context-specific summary and help information associated with the highlighted object type thumbnail 504.

To select and manage operations and parameters associated with an Operations object type, the operator selects the corresponding object type thumbnail 504 from the Operations window 500. A standard user typically does not have access to the Operations window 500. A standard user typically has access only to dockviews 203 assigned to the user by an administrator, and by extension, the user has access to only those objects included within the object windows 604 of their dockviews 203.

As with the Dockview List Window 300 indication of dockviews thumbnails 302, which displays an indicated dockview thumbnail 314 in response to the indication, the indication of an object type thumbnail 504 in the Operation window 500 displays a highlighted object type overlay 506. The highlighted object type summary text 510 displays context-specific summary and help information associated with the highlighted object type thumbnail 504.

Figure 16A:
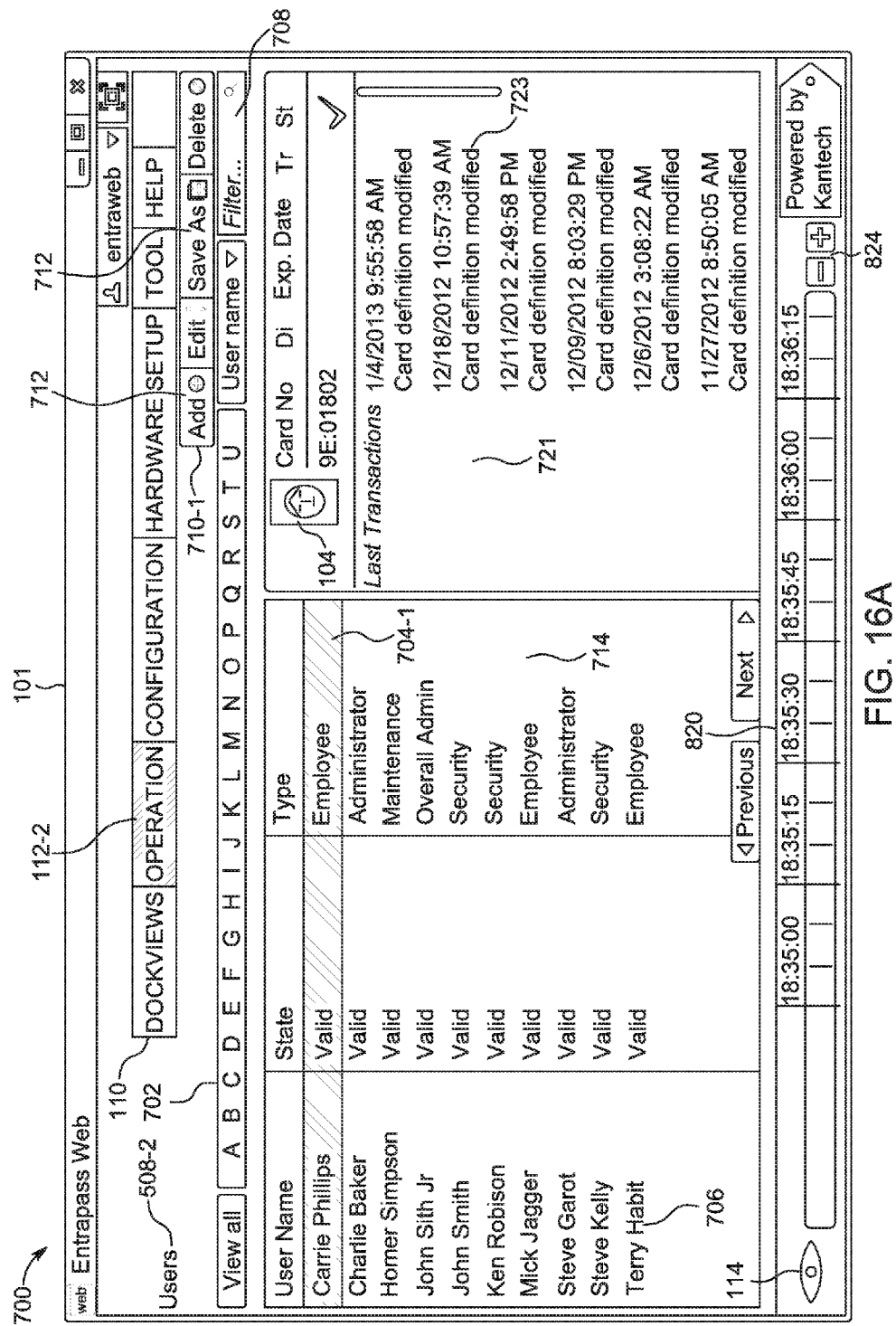
FIG. 16A displays the users window for the users object type, for displaying and managing users of the security system.

FIG. 16A shows the users window 700. The Application displays the users' window 700 when the operator selects object type thumbnail 504-2 for the User object type name 508-2 from the FIG. 15 Operations window 500.

The users' window 700 displays individual users, or object entries 704 associated with the User object type name 508-2. The object entries 704 appear in an object entries pane 714. Information associated with a selected user object entry 704-1 is displayed to the right of the object entries pane 714, in an object detail pane 721. A user has an object name 706, also known as an object entry name 706, a user picture 104, and user access card status information 723.

The User type supports an object entry search tool 708 to search for users, and an object entry toolbar 710 with object entry toolbar buttons 712 for managing the object entry names 706. The User object type also supports a filter by last name tool 702 that is specific to the User type, for narrowing the list of users based on the selection.

Figure 16B:
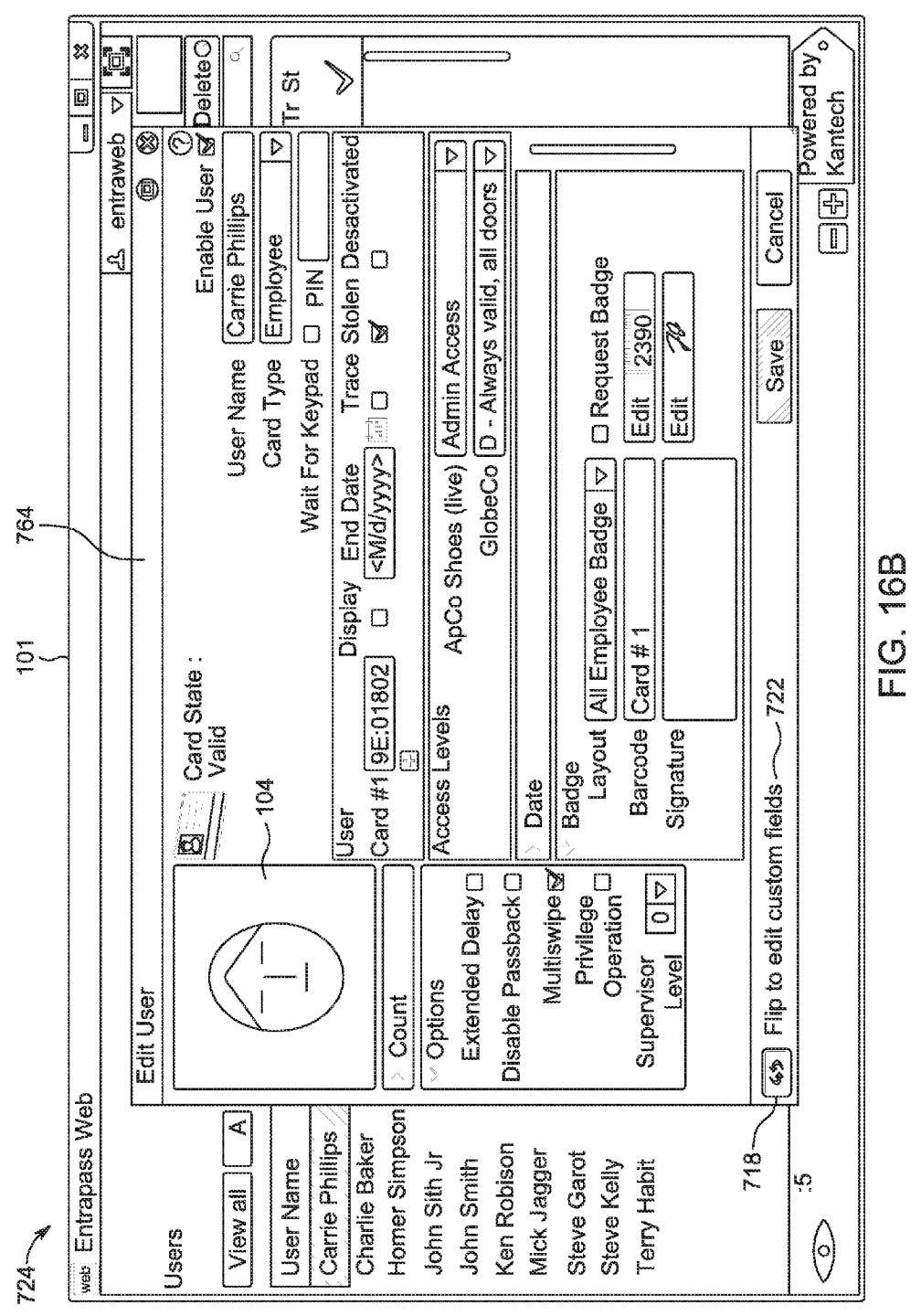

FIG. 16B displays the edit user dialog 724. The Application displays the edit user dialog 724 when the operator selects an object entry 704 such as object entry 704-1 for a specific user in the Users Window 700, displayed in FIG. 16A. The edit user dialog 724 displays further information for the current user, such as a user picture 104, and detail for access card information not displayed on the FIG. 16A object details pane 721.

The edit user dialog 724 also includes a flip button 718, with flip text 722 that provides help context for operation of the flip button 718. The edit user dialog 724 is presented within a flip window 764, and the flip window 764 is presented within the main window 101. The flip window 764 undergoes a graphical conversion that enables the operator to view additional object information for objects, such as additional user information in the edit user dialog 724.

Conventional graphical user interface window design practice calls for the use of a scrollbar element for accessing window content that spans beyond the current display screen. As an application adds more content to a window, the application developer often utilizes a scrollbar to access the new information. Alternatively, the application developer creates new windows for the additional content, negating the need for a scrollbar. The main disadvantage for scrolling within a window is that scrolling is a linear operation, which can disrupt user task flow when the window includes a large amount of content. Moreover, the creation of new windows often clutters a display device 156 with extra windows, and wastes system resources.

The flip button 718 provides the ability for the operator to initiate a graphical conversion of the window that enables the operator to enter the additional object information, in one example, "on the back" of the edit user dialog 724. The flip button 718 allows the operator to enter information within the current context of the edit user dialog 724 without the addition of scrollbar elements, and without creating new windows for the contents.

Figure 16C:
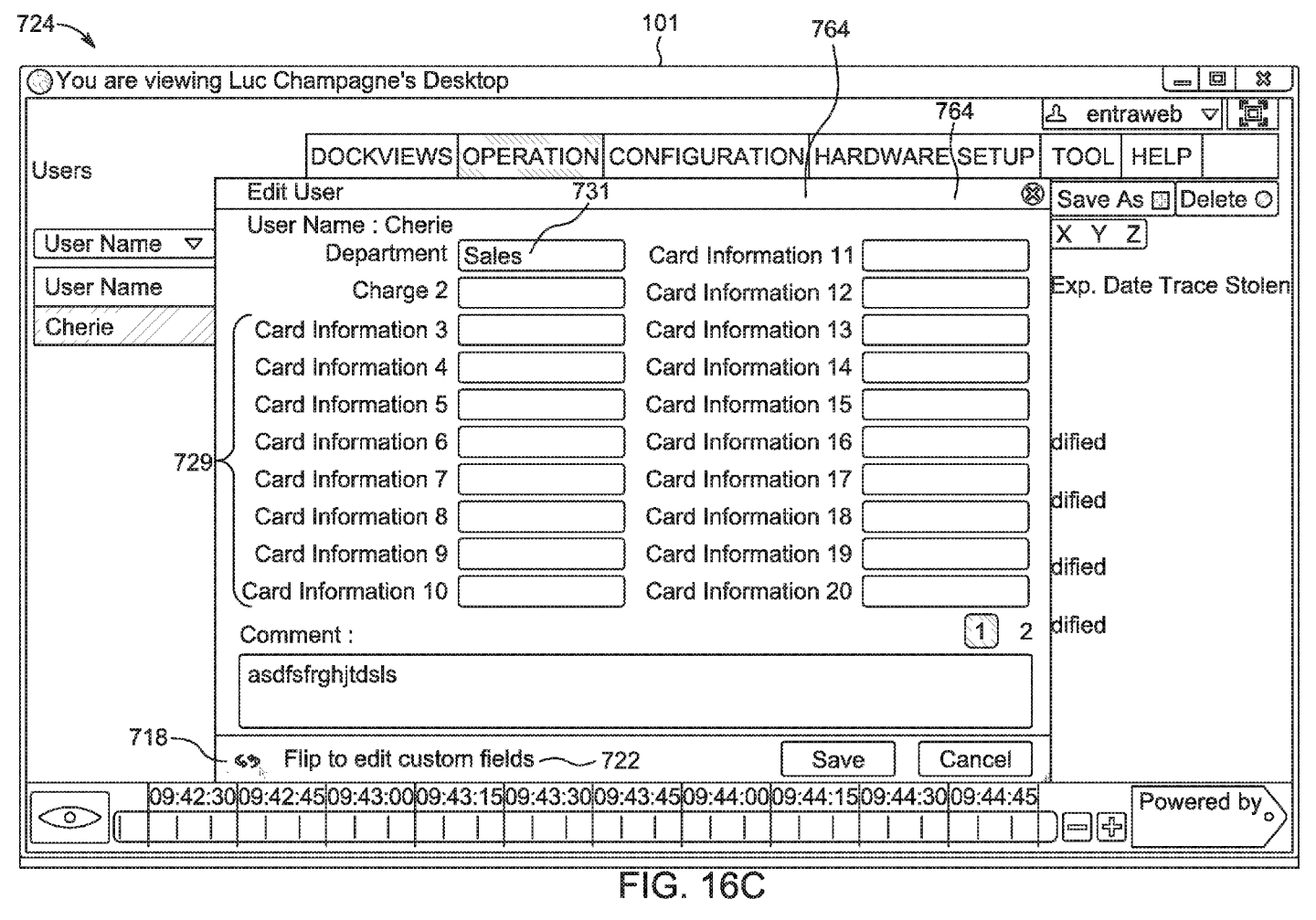

FIG. 16C displays the edit user dialog 724 in response to selection of the FIG. 16B flip button 718. Additional object information for access card objects, such as the access cards associated with the current user, listed in access card entries 729, and the user's department number 731 are displayed. Upon subsequent selection of the flip button 718 by the operator, the edit user dialog 724 "flips," or rotates back to the main or front display of the edit user dialog 724, as illustrated in FIG. 16B.

Figure 17:
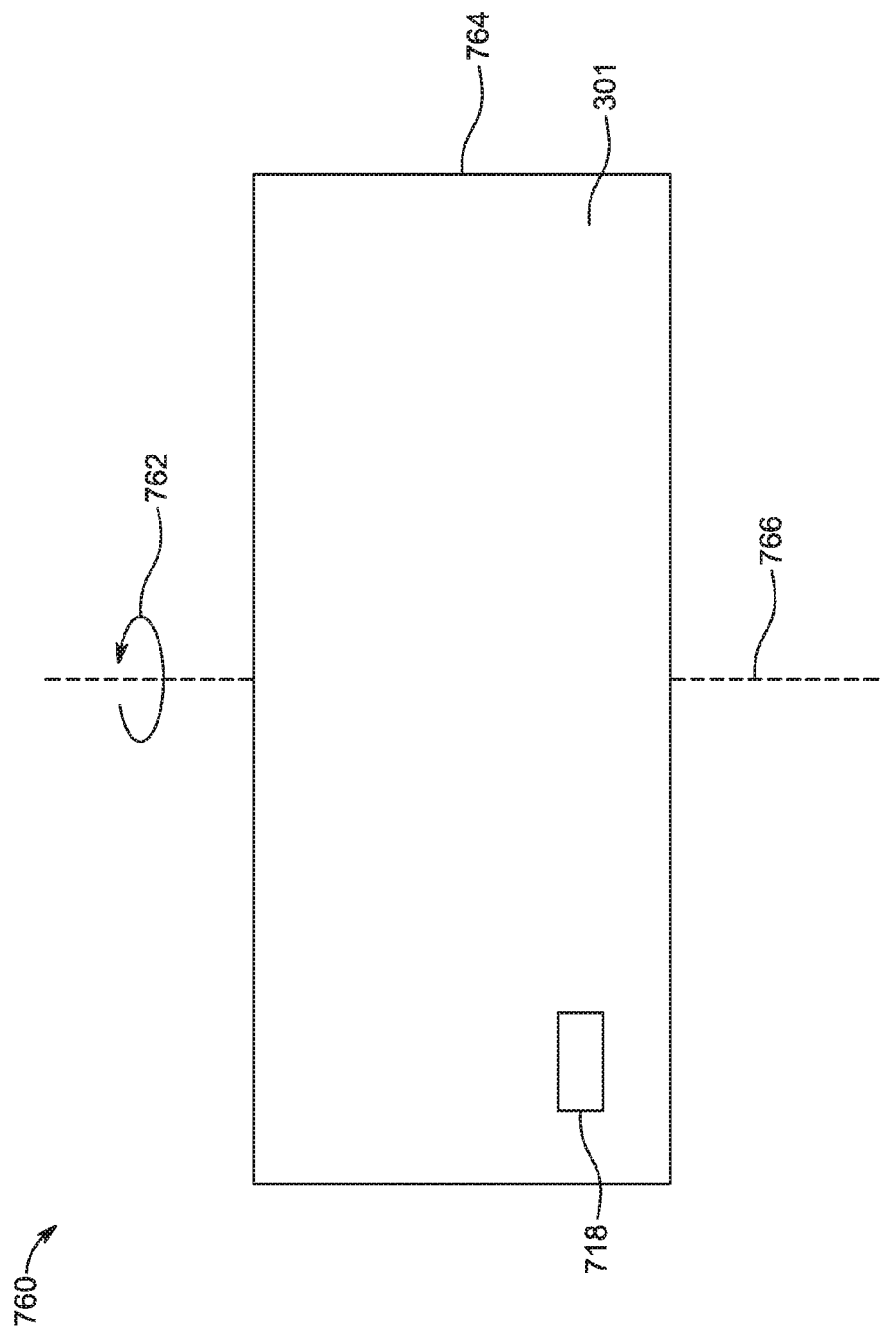
FIG. 17 displays a schematic diagram illustrating the operation of the flip window.

FIG. 17 displays a schematic diagram of the flip operation 760 for a flip window 764, such as the flip window 764 that includes the edit user dialog 724 of FIGS. 16B and 16C. The flip operation 760 presents additional object information that spans more than the contents of the current window. When the user selects the flip button 718, the flip window 764 rotates in the flip direction 762. In one implementation, the flip direction 762 rotates in a counter-clockwise fashion for 180 degrees about the flip axis 766. The Application displays the additional content on the "flipped" edit user dialog 724 in FIG. 16C.

Because the edit user dialog 724 cannot display all user parameters within the current edit user dialog 724, the Application enables the flip button 718 for display of additional object information, the additional user contents. The additional user contents are displayed within one or more working areas 301 of the flip window 764. When selected, the flip button 718 performs a flip operation 760 to display the additional contents on a "flipped" display of the edit user dialog 724 within the flip window 764 of FIG. 16C.

Operator selection of the flip button 718 of the edit user dialog 724 causes the edit user dialog 724 to iterate to the next "flip" display window of content. As illustrated in FIGS. 16B and 16C, flip text 722 is displayed that provides preview information about the content of the additional object information to be presented in the flip window 764.

While FIGS. 16B and 16C illustrate a "front and back" implementation of the flip operation 760, with a 180 degree flip direction 762 about the flip axis 766, the Application enables a potentially unlimited number of virtual windows with working areas 301 or "pages" for the operator to iterate or "flip" through, via the flip button 718. Moreover, in another implementation, the Application can display the additional object information in the flip windows by rendering the flip windows within a graphics plane that suggests a curved image surface, as with the presentation of information during screen updates, presented herein above in the description associated with FIGS. 14A and 14B.

Figure 18:
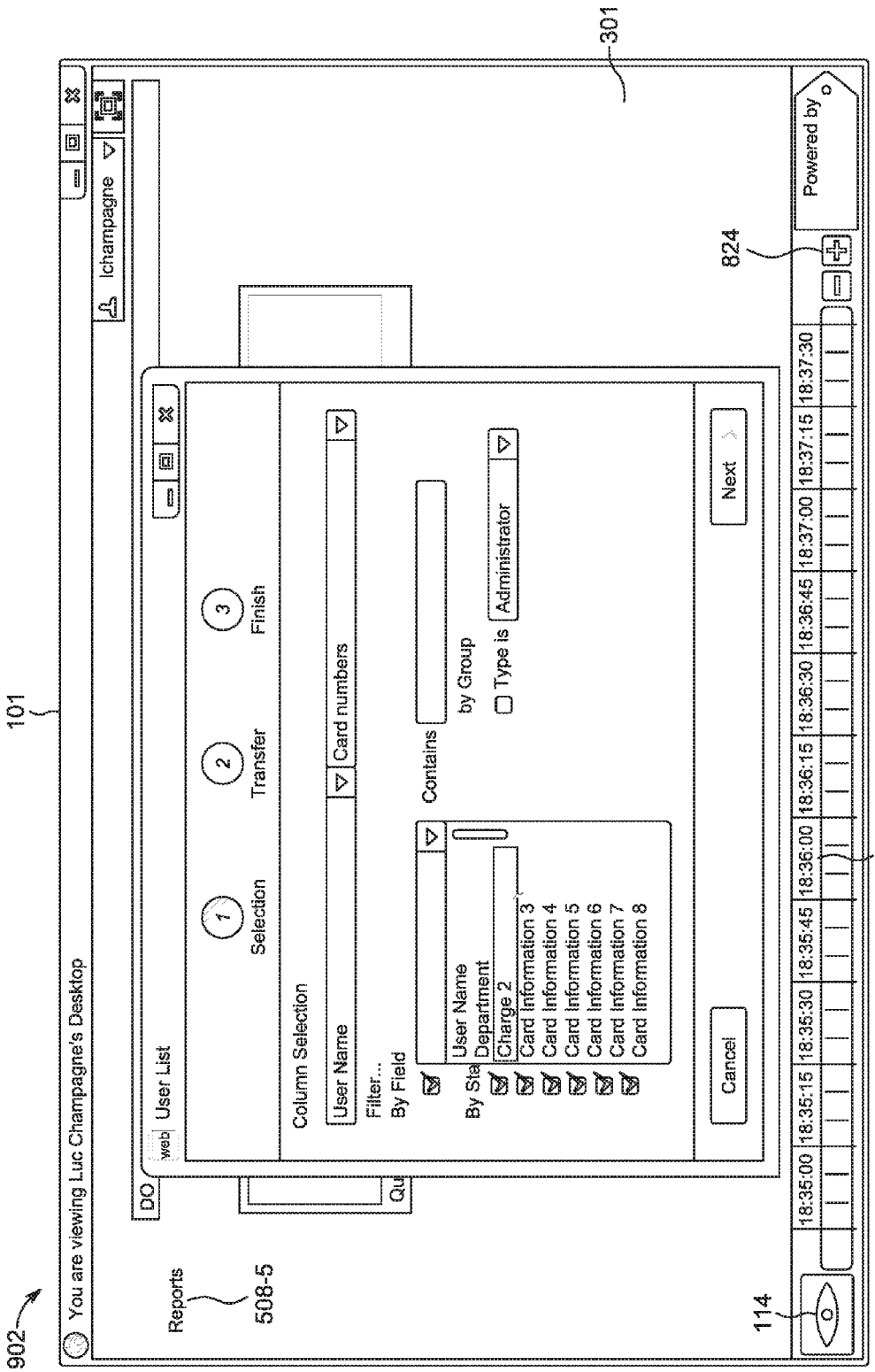
FIG. 18 shows the first dialog of the Reports selection wizard of the Reports window, for adding users to a report.

FIG. 18 displays the first window of the reports selection wizard 902. The Application displays the reports selection wizard 902 when the operator selects the Reports object type from the FIG. 15 Operation window 500. The Reports object type has object type name 508-5, "Reports." The reports selection wizard 902 displays within the main window 101. The Application walks the operator through the screens of the reports selection wizard 902 to assist the operator in creating a Report object type.

Figure 19:
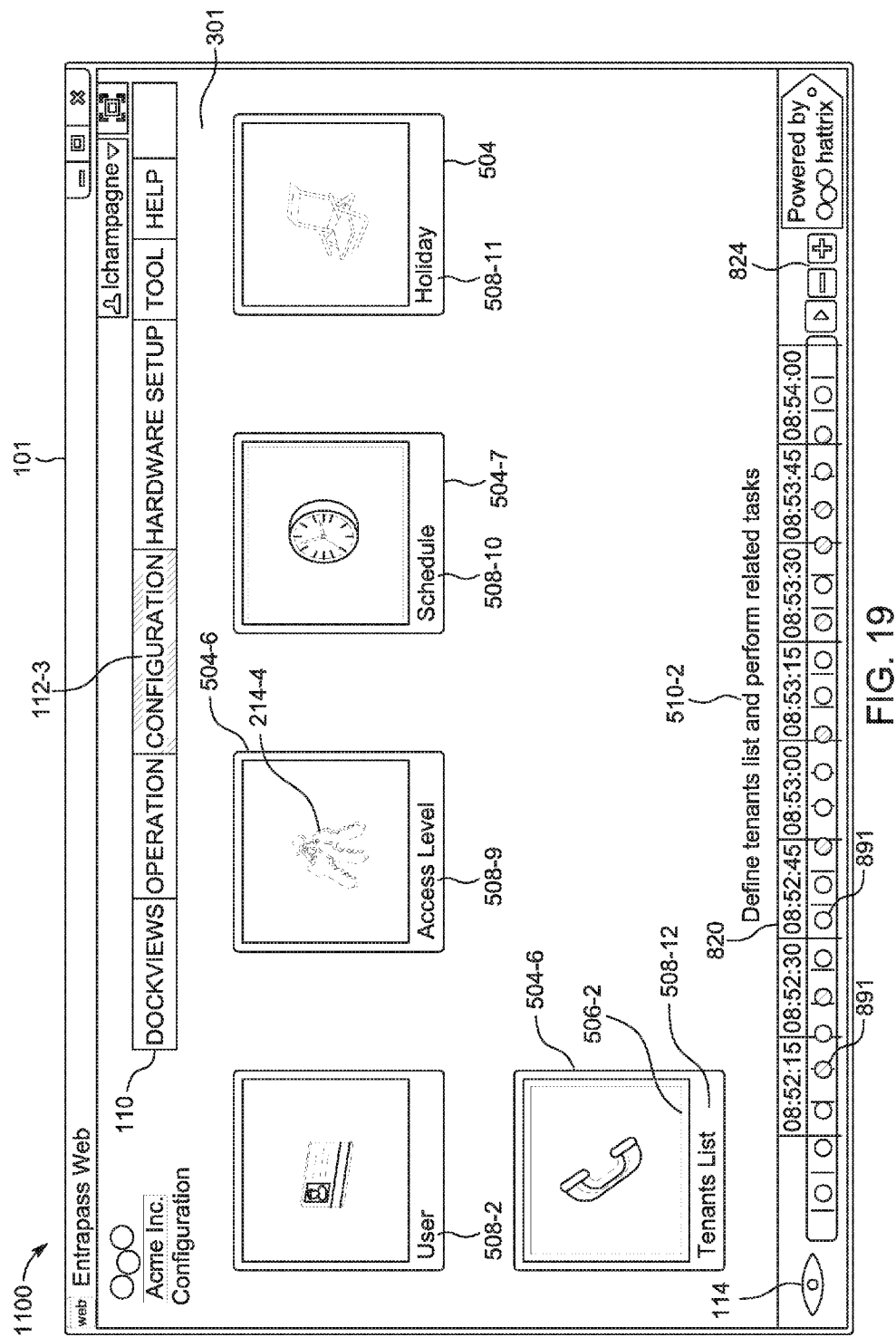
FIG. 19 shows the Configuration window and its associated Configuration object types.

FIG. 19 displays the Configuration window 1100 that displays when the operator selects the Configuration main menu tab 112-3 from the main menu toolbar 110. The Configuration window 1100 displays within the main window 101. The Configuration window 1100 includes object types User, Access level, Schedule, Holiday, and Tenants List. Each object type thumbnail 504 has an object type name 508, and an object type icon 214. For example, object type thumbnail 504-6 includes object type name 508-9, "Access level," and object type icon 214-4.

Operators indicate object type thumbnails 504 associated with Configuration objects. The Application displays a highlighted object type overlay 506 in response to an indication of an object type thumbnail 504. The highlighted object type summary text 510 displays context-specific summary and help information associated with the highlighted object type thumbnail 504. For example, in response to operator indication of object type thumbnail 504-6, with object type name 508-12, "Tenants List," the Application displays highlighted object type overlay 506-2, and displays context-sensitive highlighted object type summary text 510-2.

Figure 20:
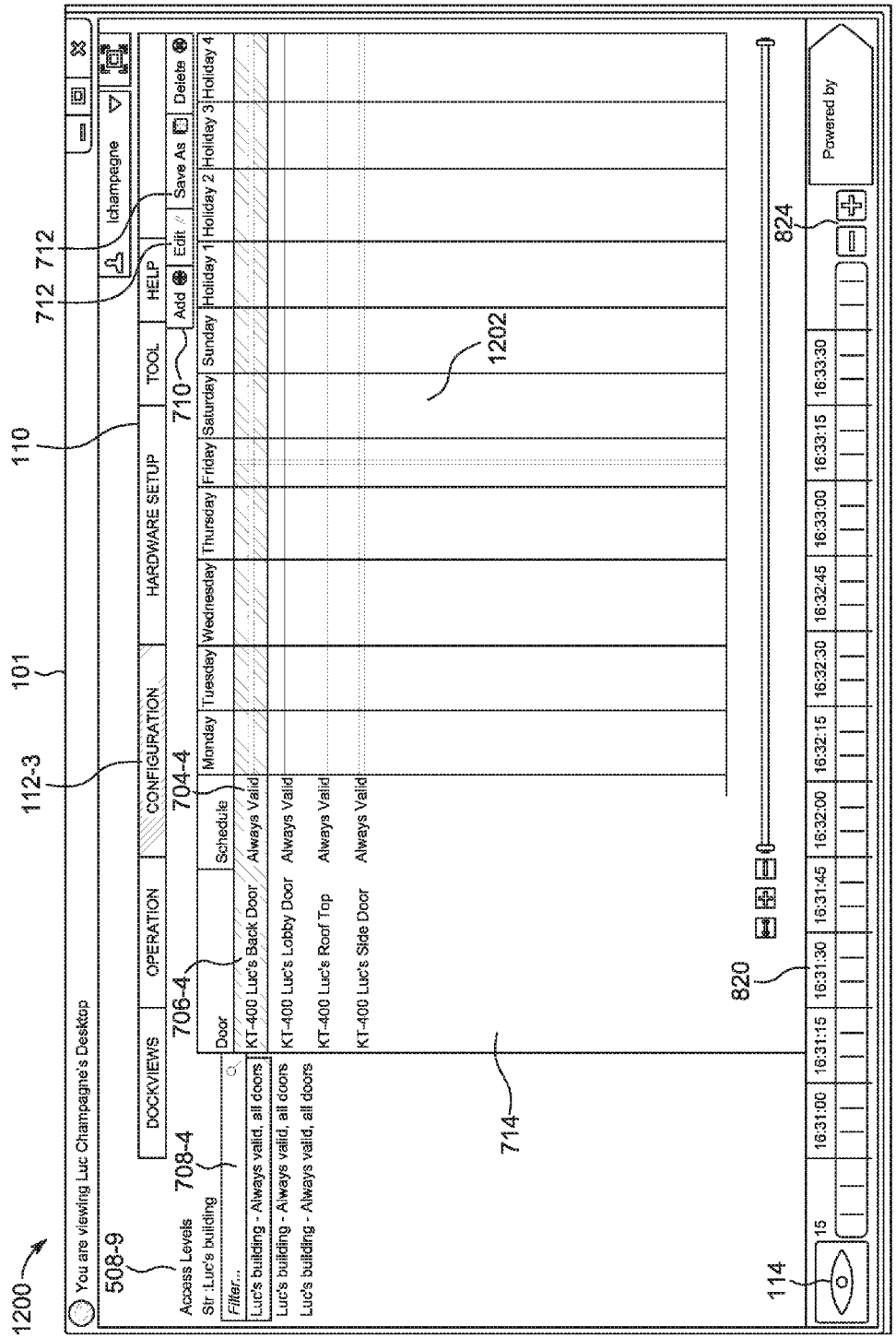
FIG. 20 shows the access levels window for the access object type.

FIG. 20 displays the access levels window 1200 that the Application displays in response to operator selection of the Access Level object type thumbnail 504-6 from the FIG. 19 Configuration window 1100. The access levels window 1200 displays within the main window 101. The access levels window 1200 displays individual access levels in object entries 704 associated with the Access Level object type name 508-9. Each user object entry 704-4 has an object entry name 706-4 that appears in an object entries pane 714.

The Access Level type supports an object entry search tool 708-4 to search for access levels by their object entry names 706-4, and an object entry toolbar 710 with object entry toolbar buttons 712 for managing the object entry names 706-4. Object entries 704-4 appear within the object entries pane 714. An access levels display schedule 1202 displays access levels for each day of the week, and includes extra fields for displaying holidays.

Figure 21:
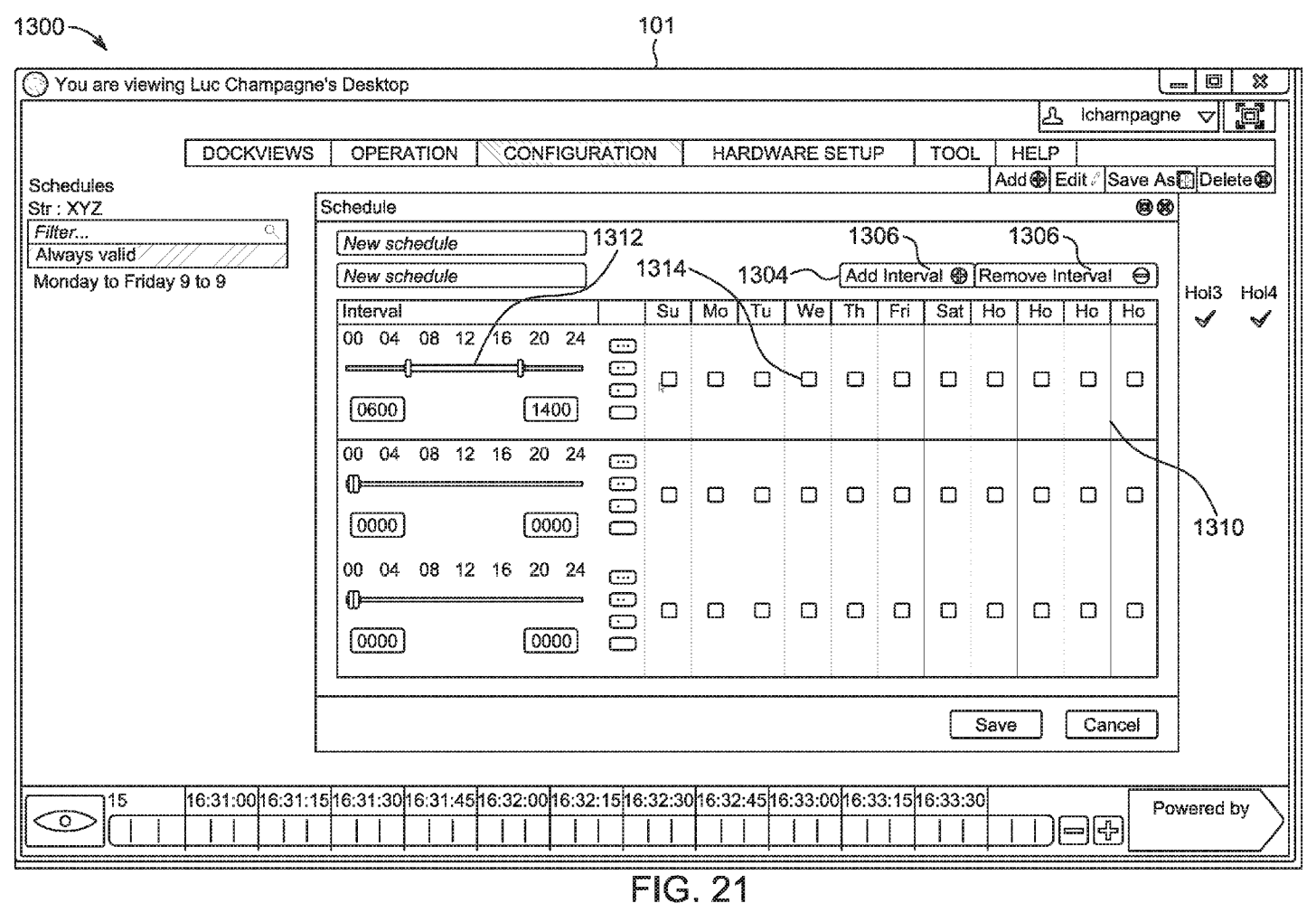

FIG. 21 illustrates the schedule dialog 1300 that displays when the operator selects the Schedule object type thumbnail 504-7 from the Configuration window 1100. The schedule window 1300 displays an edit schedule dialog 1302 associated with editing schedule access to a door 164. Interval slider bar 1312 allows the operator to configure the hours when a door 164 can be opened.

The operator selects an interval entry 1310, and one or more day selectors 1314. Day selectors 1314 also include extra fields for scheduling holiday access. The Schedule type supports a schedule toolbar 1304 with interval tool bar buttons 1306 to add or remove intervals from the schedule.

Figure 22:
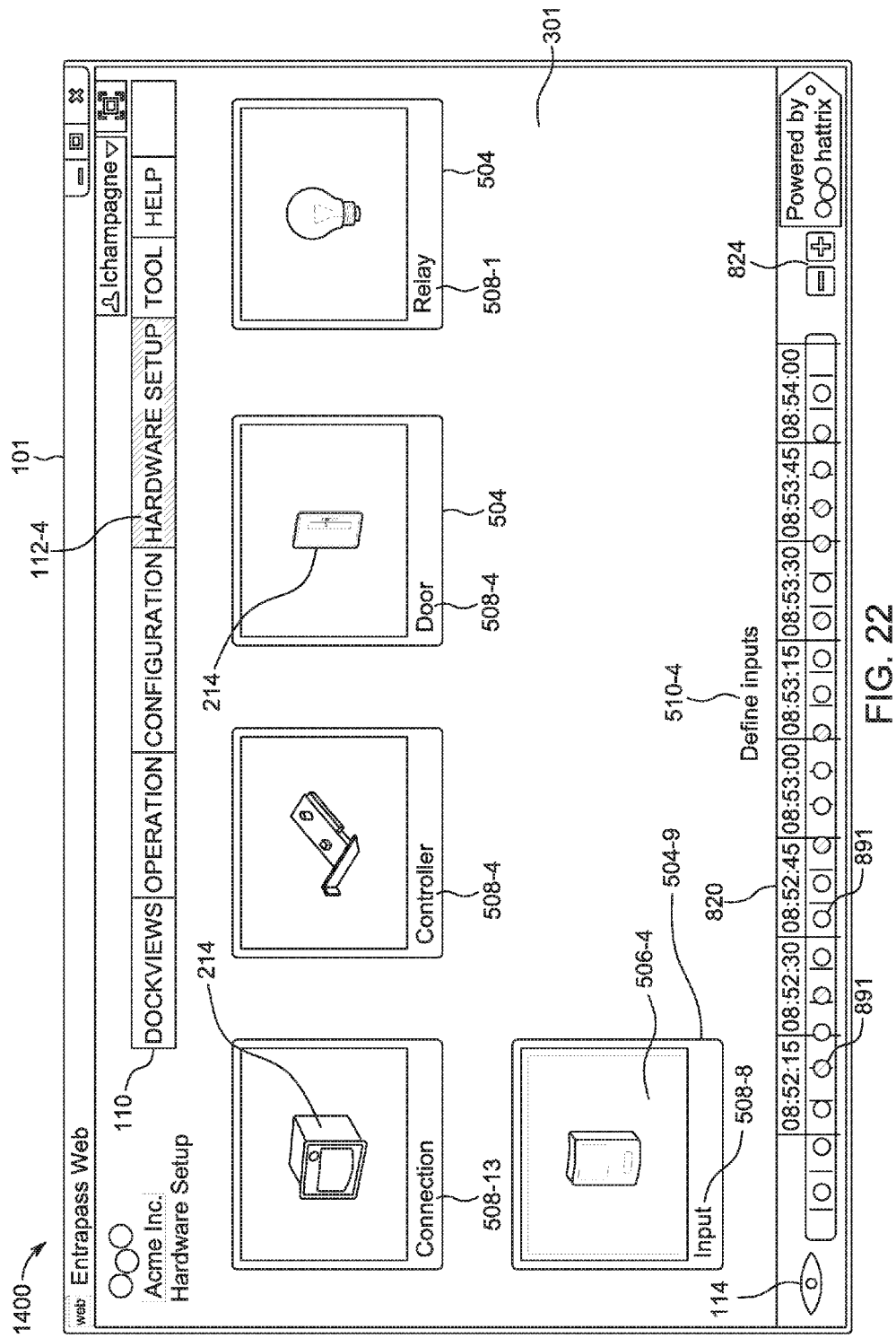
FIG. 22 shows the Hardware Setup window and its associated Hardware object types.

FIG. 22 displays the Hardware Setup window 1400 that displays when the operator selects the Hardware Setup main menu tab 112-4 from the main menu toolbar 110. The Hardware Setup window 1400 displays within the main window 101. The hardware setup window 1400 includes object types Connection, Controller, Door, Relay, and Input. Each object type thumbnail 504 has an object type name 508, and an object type icon 214.

Operators highlight object type thumbnails 504 associated with Hardware Setup objects. The Application displays a highlighted object type overlay 506 in response to an indication of an object type thumbnail 504. For example, in response to operator indication of object type thumbnail 504-9, the Application displays highlighted object type overlay 506-4. The highlighted object type summary text 510-4 displays context-specific summary and help information associated with the highlighted object type thumbnail 504-9.

Figure 23:
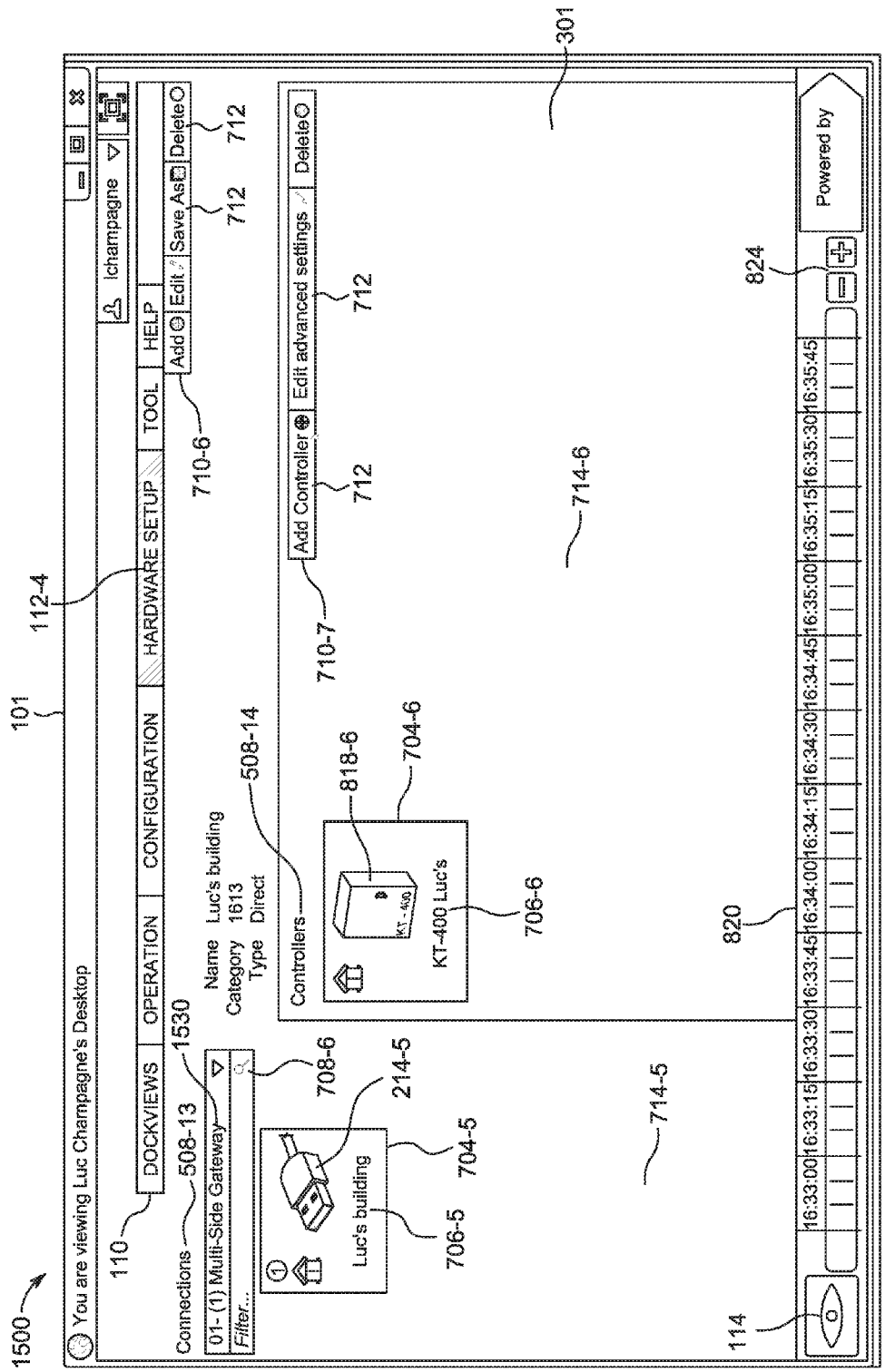
FIG. 23 shows the Connections Window for the connections object type, displaying associated door controllers for each connection.

FIG. 23 illustrates the Connections window 1500 that displays when the operator selects a Connection object type from the Hardware Setup window 1400. Typically, many connections (and Connection objects) exist in a security system 150. As a result, an operator configures connections using the connection selector 1530 associated with a monitored site, or for a device such as a gateway.

The Connections window 1500 displays object entries 704-5 for connection objects using an object type icon 214-5. The object entries for connections are displayed in object entries pane 714-5. Operators search for Connection object entries 704-5 by their object entry names 706-5 using the object entry search tool 708-6. The Connections object supports an object entry toolbar 710-6 with object entry toolbar buttons 712.

Each connection also has one or more Controllers associated with the connection. Controllers for a connection are displayed in the object entries pane 714-6. Each of the Controller objects has an object entry 704-6, an object entry icon 818-6, and an object entry name 706-6. Object entry toolbar 710-7 has object entry toolbar buttons 712—for adding controllers and editing their advanced settings.

FIGS. 24A-24D display the controller setup wizard 1603 displayed when the operator selects the Controller object type from the Hardware Setup window 1400 in FIG. 22. The controller setup wizard 1603 displays within the main window 101. The Application displays the controller setup wizard 1602-1 through 1602-4 for guiding the operator through Controller setup tasks.

Figure 24A:
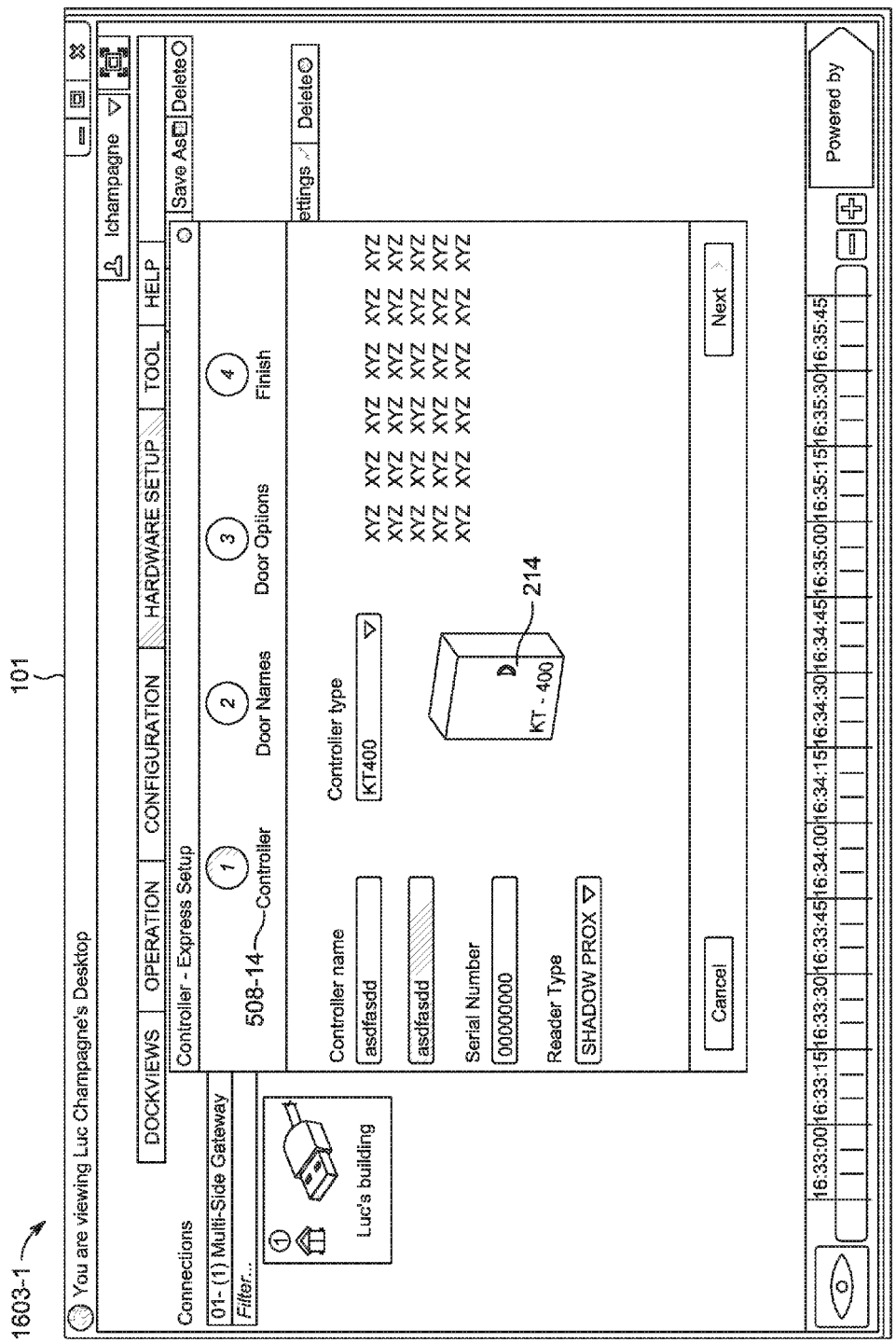
FIGS. 24A-24D show the Controller Setup wizard displayed in response to selection of a specific connection from the Connections Window of FIG. 23.
Figure 24B:
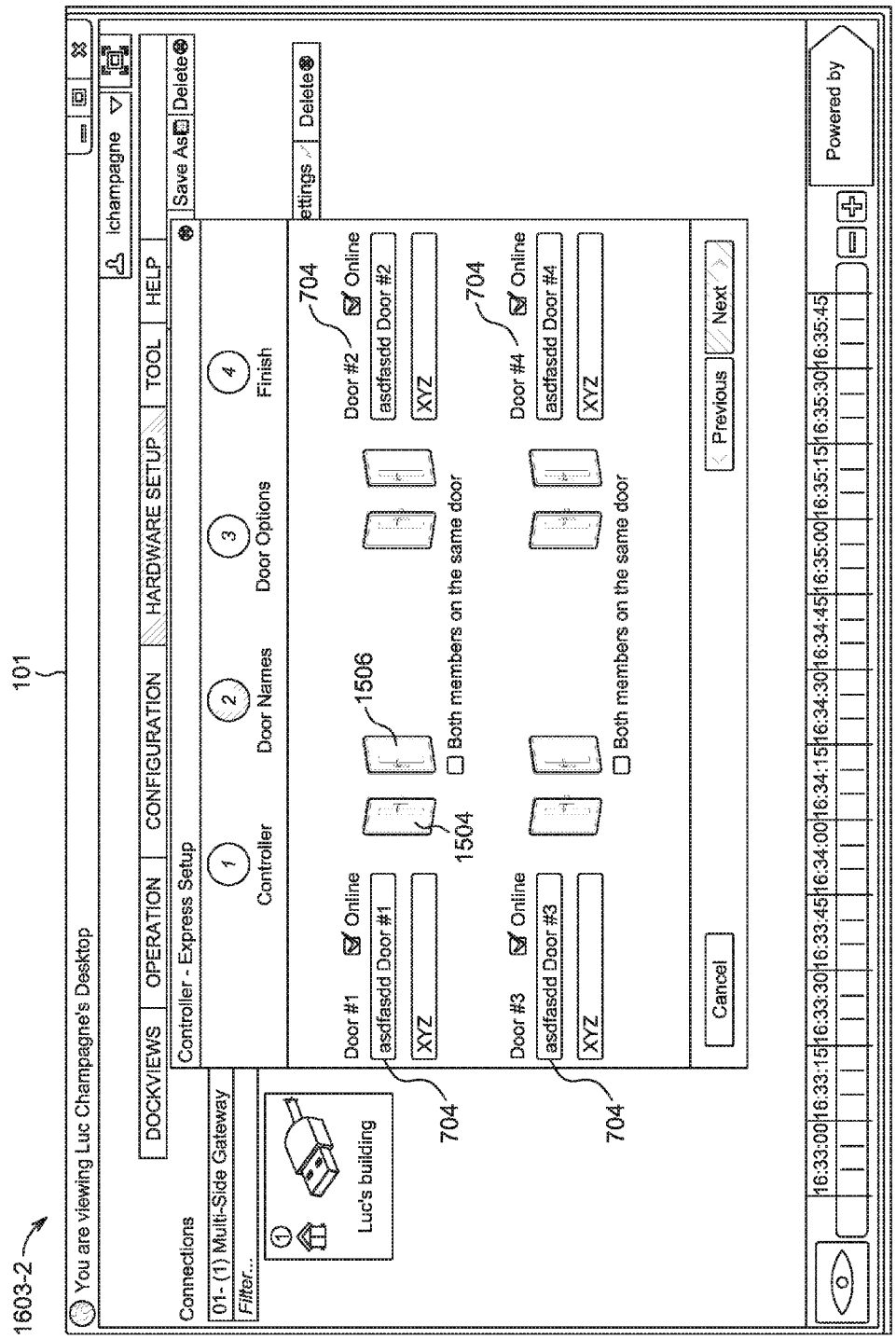

FIG. 24A displays an object type icon 214 for a door controller 162, and prompts the user to enter initial information for the door controller 162. FIG. 24B enables the operator to assign up to four door objects, or object entries 704, to the door controller 162, in one example. The door object entries 704 display separate entry door icons 1504 and exit door icons 1506 for each door object entry 704.

Figure 24C:
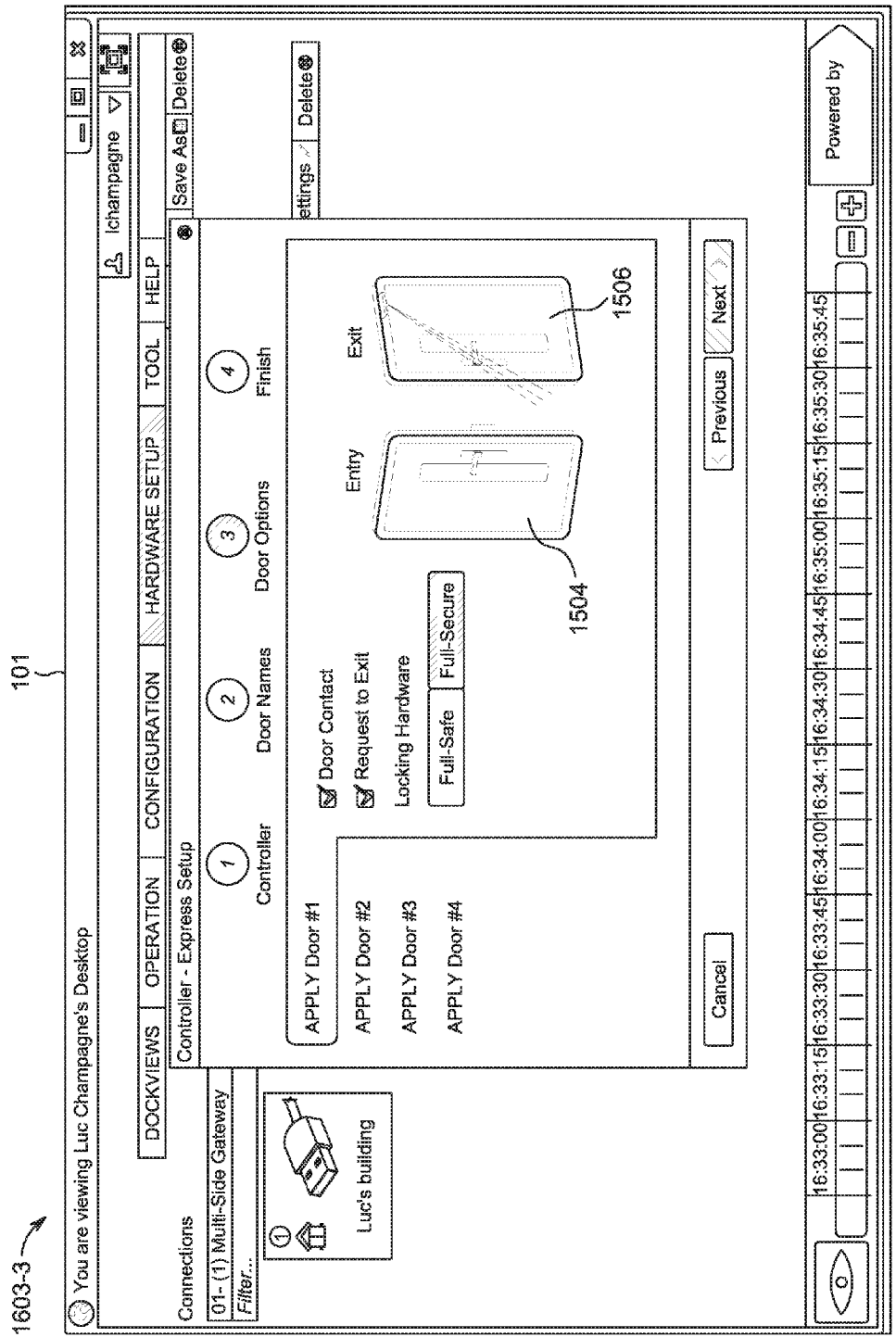
Figure 24D:
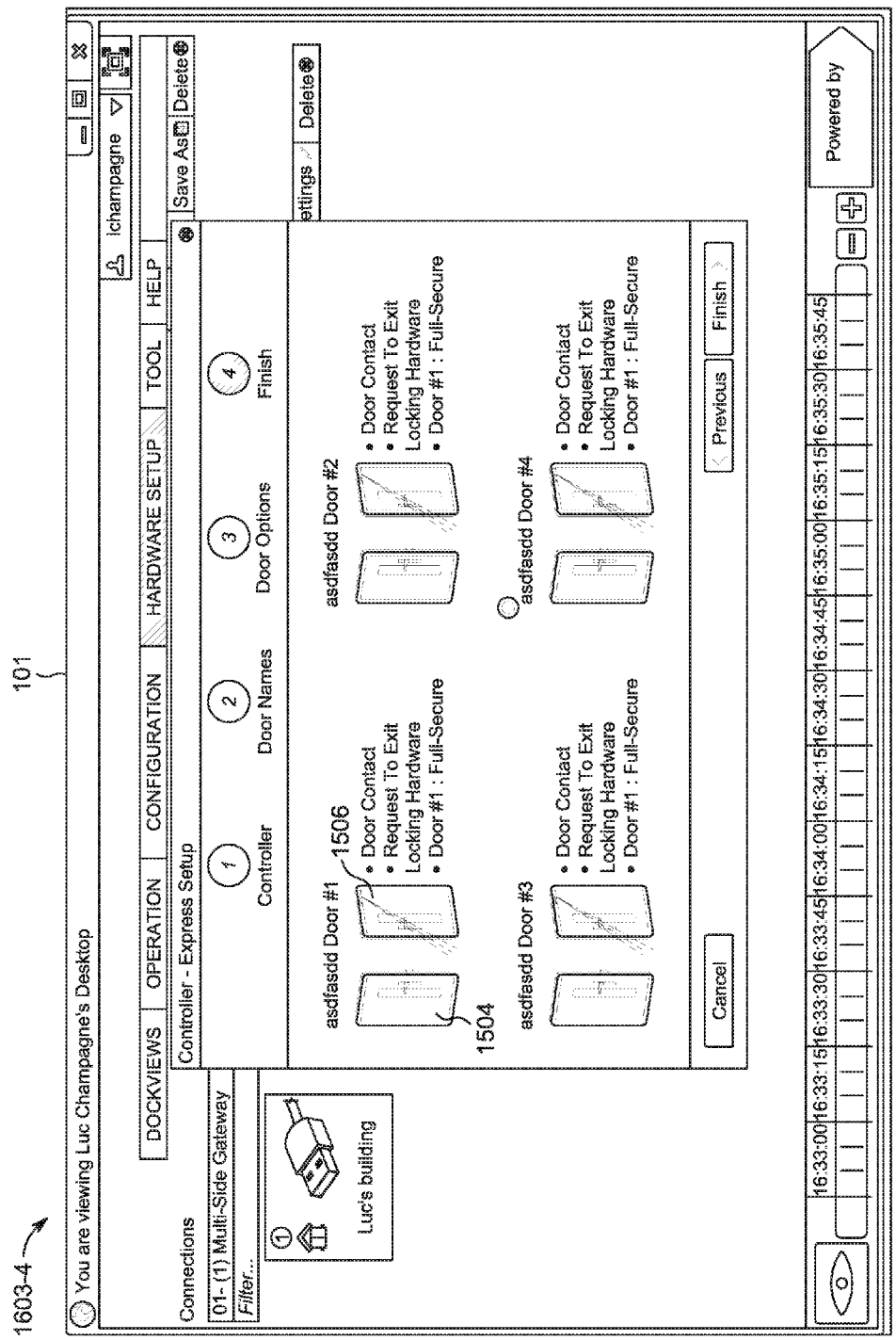

FIG. 24C enables the definition of additional door options for each door object entry 704 selected in FIG. 24C. Finally, FIG. 24D summarizes the configuration information from the prior wizard steps, and enables completion of the door controller 162 configuration.

Figure 25:
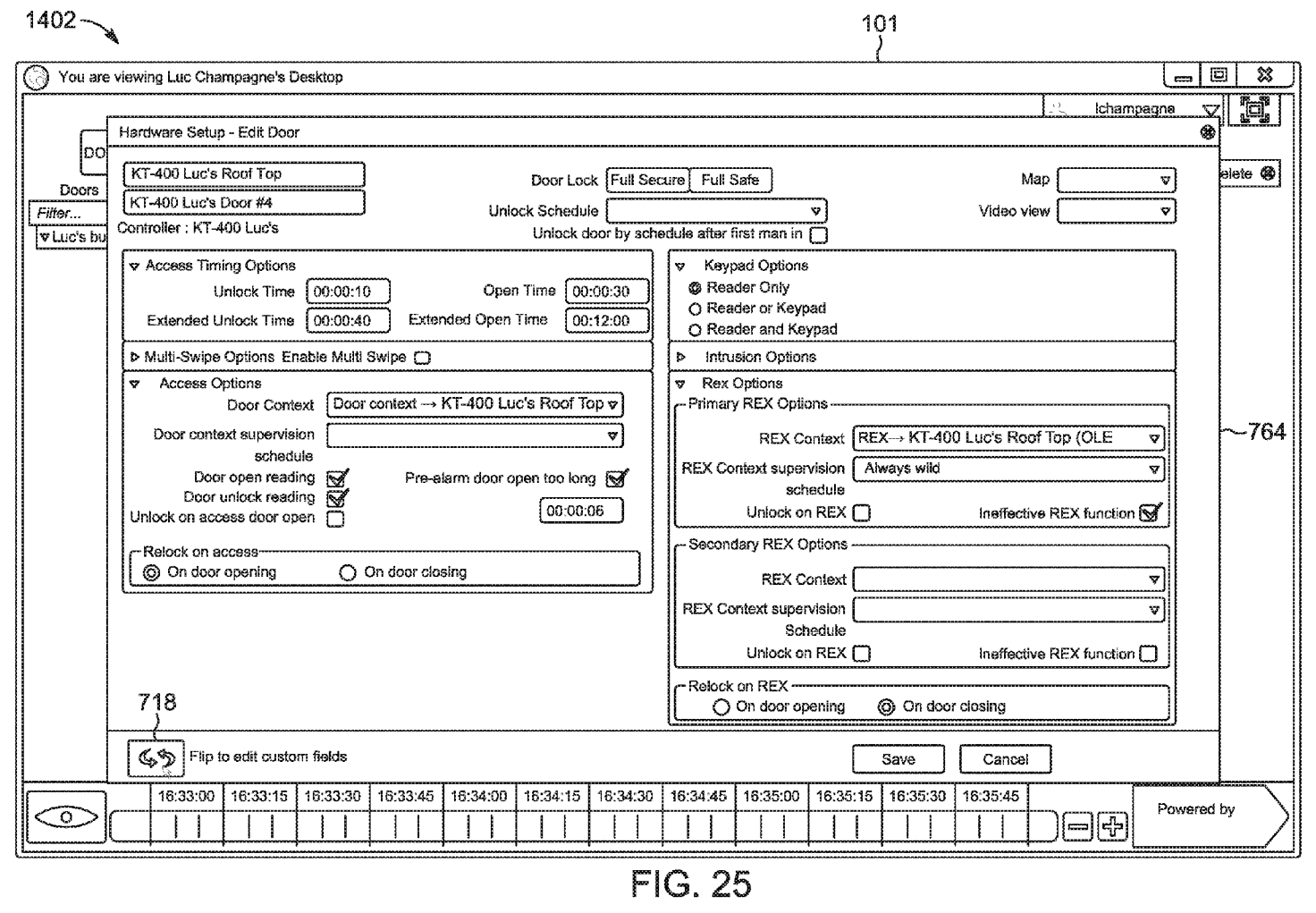

FIG. 25 displays the edit door dialog 1402 that displays when the operator selects a Door object type from the Hardware Setup window 1400, and then selects an individual door object entry 704. The edit door dialog 1402 displays within the main window 101. As with the FIG. 12 edit user dialog 724, the edit door dialog 1402 displays further information for the selected door, and is presented within a flip window 764 that includes a flip button 718 that allows the operator to access additional object information for the door objects.

Figure 26:
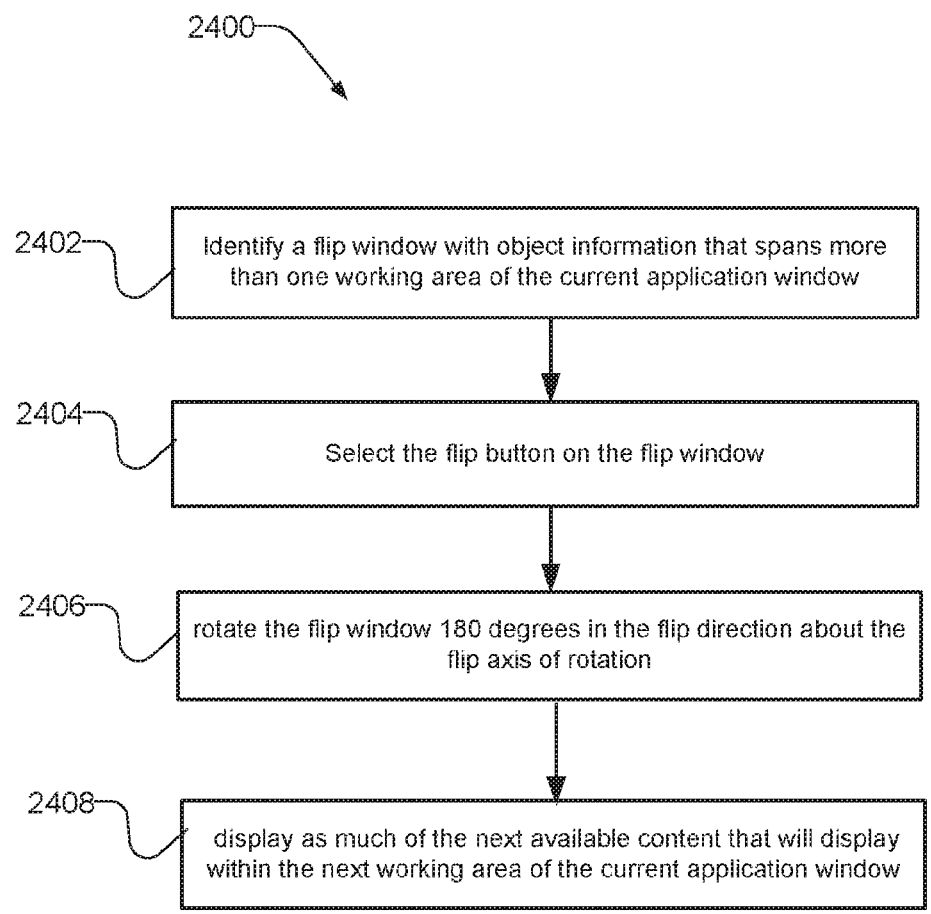
FIG. 26 is a flow chart displaying a method of operation of the flip window.

FIG. 26 shows method 2400 for displaying additional object information for the objects of the security system 150, in response to selection of a flip button 718 on a flip window 764. In step 2402, the operator identifies a flip window 764 that includes object information that spans more than one working area 301 of the current application window. In step 2404, the operator selects the flip button 718 on the flip window 764. In step 2406, the Application rotates the window 180 degrees in the flip direction 762 about the flip axis 766, in response to the selection of the flip button 718. In step 2408, the Application displays as much of the additional object information that will display within the next working area of the current application window.

Figure 27A:
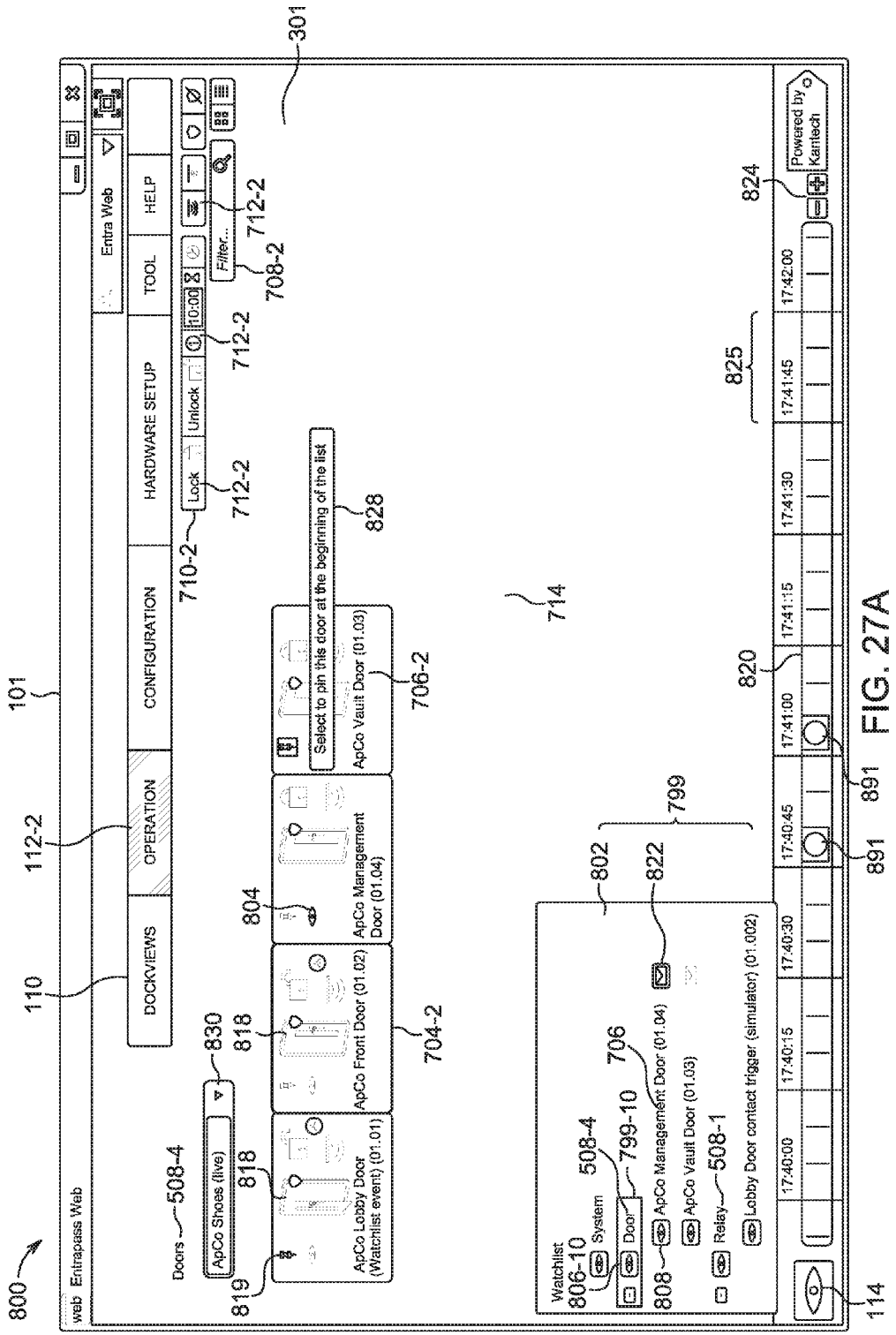
FIGS. 27A and 27B show the watchlist window and the scrolling feeds of event data displayed within the Doors window and the Dockview List window, respectively.

FIG. 27A displays the doors window 800 within the main window 101. The Application displays the doors window 800 when the operator selects the Door object type name 508-4 from the FIG. 15 operation window 500. Typically, many doors (and Door objects) exist in a security system 150, so the operator utilizes a site selector 830 to select between monitored security system sites.

The Door object type name 508-4 supports object entries 704 with object entry names 706. Unlike the User object type, which displays its users as row entries within a table of users, the Door type displays its door objects using an object entry icon 818 associated with each door object entry 704.

Similar to the way the Application provides pinning of "favorite" dockviews 203 via the featured dockviews window 316 in the Dockview list window 300, the Application provides pinning of Door objects in the Doors window 800. Unlike the featured dockviews window 316 for displaying pinned dockviews 203, however, the pinning of a Door object causes its associated object entry icon 818 to move to the top left of the doors window 800. In this way, the Doors window displays pinned object entries first within the working area 301 of the Doors window 800. The operator pins a door object entry icon 818 via its object entry pinning selector 819, which has the same behavior as the pinning selector 304 for dockview thumbnails 302. The Application displays a pinning selector tooltip 828 when the operator indicates the object entry pinning selector 819 with a pointing device 160.

As with the User object type, the Door object type supports an object entry search tool 708-2 to search for door objects, and an object entry toolbar 710-2 with object entry toolbar buttons 712-2 for managing object entry names 706. The doors window 800 displays within the main window 101.

The object entry icon 818 for each door object also has a watchlist add/delete selector 804 that toggles the entry's inclusion within the watchlist window 802. The watchlist window 802 display watchlist entries 799, that include the name and type of objects that the operator wishes to monitor for receiving and displaying event data 892 from the objects of the security system 150.

As with the Application-wide watchlist window selector 114, the watchlist add/delete selector 804 also uses an eye icon. The eye icon changes its color in response to selection of the watchlist add/delete selector 804 for a given object entry, such as the highlighted Door object entry 704-2. Selection of the watchlist add/delete selector 804 within the Door object entry 704-2 changes the color of its eye icon color in response to the selection, and creates an entry for the associated object entry 704-2 in the watchlist window 802. Deselection of the watchlist add/delete selector 804 changes the color of its eye icon color, and removes the associated object entry 704 from the watchlist window 802. Each object entry 704 in the watchlist window 802 is included within a list of watchlist entries 799.

Within the watchlist window 802, watchlist entries 799 are organized by their object type name 508, and object entry name 706. In FIG. 27A, the watchlist window 802 displays watchlist entries 799 for the Door and Relay object types. Each watchlist object entry name 706 has an associated email notification selector 822. When an object in the watchlist window 802 transmits an event, the scrolling feeds 820 display an event data indicator 891 within the time interval 825 of the event transmission.

Figure 27B:
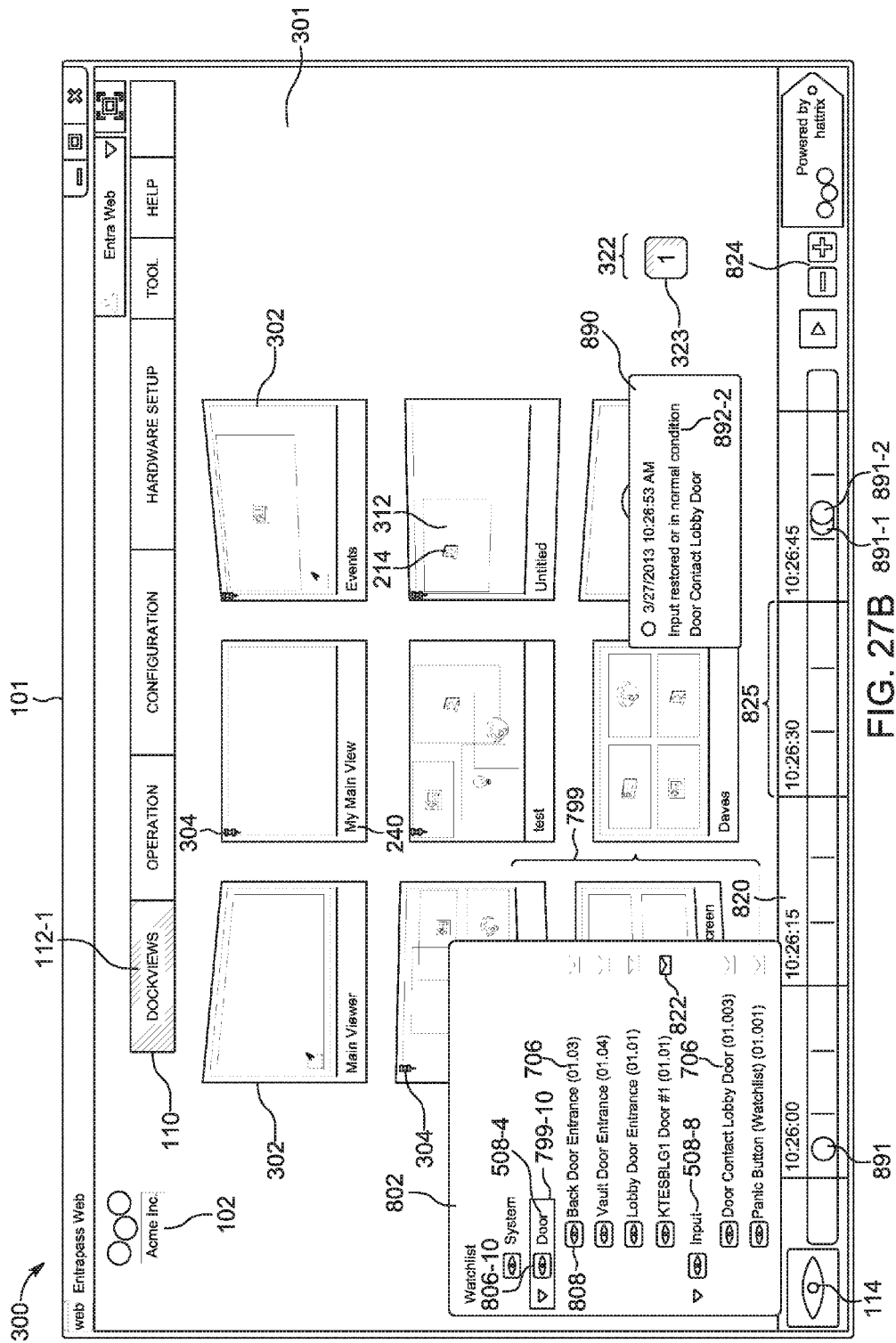

FIG. 27B displays the watchlist window 802 within the Dockview List window 300. When the operator indicates an event data indicator 891, the scrolling feeds 820 display a pop-up window, the event data window 890, overlaid upon the current application window. The event data window 890 includes the event data 892-2 of the event. In addition, if the email notification selector 822 is selected, the event data 892 of the event will be sent to the specified email address associated with the email notification selector 822.

The Application also allows the operator to toggle the inclusion of event data 892 in the scrolling feeds 820 from the watchlist entries 799 in the watchlist window 802, without having to remove the watchlist entries 799 from the watchlist window 802. The watchlist object type selectors 806 allow the operator to toggle the inclusion of event data 892 from all object entry names 706 associated with the selected type.

In a similar fashion, watchlist object entry selectors 808 allow the operator to toggle the inclusion of event data 892 from the selected object entry names 706. Both the watchlist object type selectors 806 and the watchlist object entry selectors 808 use an eye icon, similar to the other watchlist selectors in the Application, to provide a common look-and-feel for Application watchlist window 802 operations. The scrolling feeds 820 and the time interval scale selector 824 are tools associated with the navigation, selection, and display of events. Like the watchlist window selector 114, these tools display on nearly every Application window, with the exception of new application windows 1001 that include embedded dockviews 2900. The scrolling feeds 820, as the name implies, is constantly moving forward in time, and captures event data 892 from the objects of the security system 150 in real time.

Using a pointing device 160, such as a mouse, the operator can select and drag the scrolling feeds 820 to the right to access time intervals 825 that are increasingly older in time, and to the left to access time intervals 825 that are increasingly more recent in time, up to the present time. The server system 130 records and saves all events and the times that the events occur. The operator selects an object of the security system such as a security device for including its event data 892 in the scrolling feeds 820 by including the object entry name 706 for the device in the watchlist window 802. The operator displays the event data 892 for an event by selecting the time interval 825 within the scrolling feeds 820 that include an event data indicator 891 associated with the event. The operator expands or compresses the time intervals 825 within the scrolling feeds 820 by selecting and dragging the scrolling feeds 820 with a pointing device 160 such as a mouse.

The Application maintains the timeline of the scrolling feeds 820 in 15 second intervals, in one example. To aid in selection of an event, and to expand or compress the timeline for displaying events, the time interval scale selector 824 changes the scale of the displayed time intervals 825 by 15 seconds for each selection of the time interval scale selector 824.

Selection of the (−) portion of the time interval scale selector 824 incrementally compresses the time intervals 824, and selection of the (+) portion of the time interval scale selector 824 incrementally expands the time intervals 825.

Relative to FIG. 27A, the operator in FIG. 27B has expanded the time intervals 825 using the time interval scale selector 824 to provide a smaller scale of the scrolling feeds 820. This enables the operator to isolate event data 892 for a specific event, when one or more security devices transmit events in the same time interval 825.

For example, event data indicators 891-1 and 891-2 appear within the same time interval 825. The operator cannot indicate the event data indicators 891-1 and 891-2 unless the time intervals 825 are sufficiently expanded to enable the pointing device 160 to access the event data indicators 891-1 and 891-2. In response to indication of event data indicator 891-2, the Application displays the associated event data 892-2 within the event data window 890, overlaid upon the Dockview list window 300.

In both FIGS. 27A and 27B, watchlist entry 799-10 includes watchlist object type selector 806-10, the selection of which enables the display of event data 892 from all objects of the Door type, given by Door object type name 508-4. All watchlist entries 799 for specific objects of the "Doors" type are displayed in an indented fashion immediately underneath the Door type watchlist entry 799-10. When the operator selects the watchlist object type selector 806-10 of watchlist entry 799-10, all watchlist entries 799 for objects of the "Doors" type are selected in response. This enables the display of event data 892 from all Door objects within the scrolling feeds 892. In a similar fashion, when the operator deselects the watchlist object type selector 806-10 of watchlist entry 799-10, all watchlist entries 799 for objects of the "Doors" type are deselected in response. This disables the display of event data 892 from all Door objects within the scrolling feeds 892.

Figure 28:
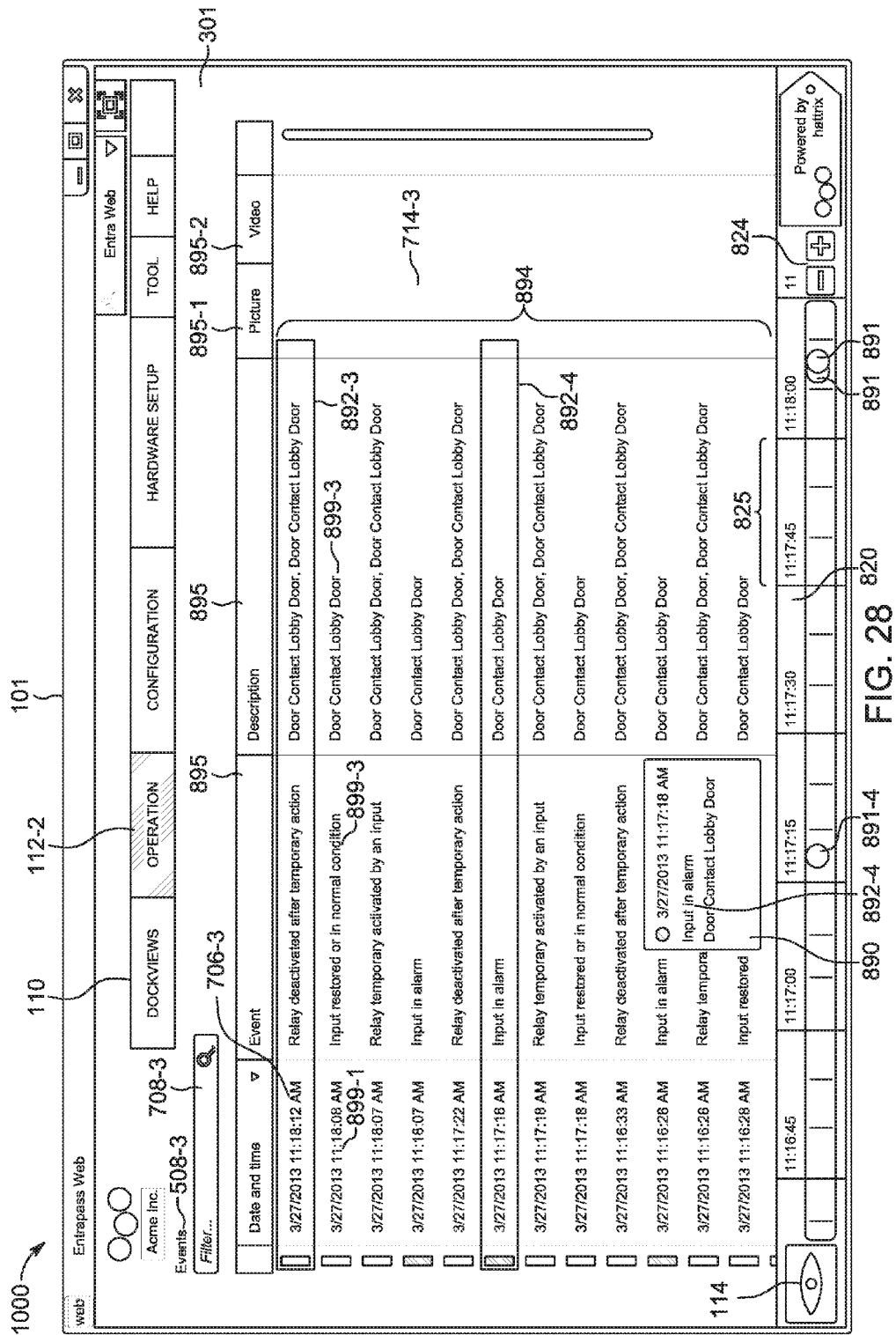
FIG. 28 shows the Events window for displaying details for the event data from the objects of the security system.

FIG. 28 displays the events window 1000 displayed when the operator selects the Events object type from the FIG. 15 operation window 500. The events window 1000 displays within the main window 101. As with the User object type, the Event object type supports an object entry search tool 708-3 to search for reports by their object entry name 706-3. Each report has an object entry 704-3 within the objects entries pane 714-3.

The Events window 1000 displays event data 892 in an event data table 894. The event data table 894 has event data columns 895 that correspond to fields within the event data 892. The event data table 894 displays within object entries pane 714-3.

The example also highlights event data 892-3 for a specific event in the event data table 894. The fields within the event data 892-3 include an object entry name 706-3 for the Events type, which is the Date and Time 899-1 of the event, a name 899-2, and a description 899-3. The event data 892 also supports picture and video streams 999. The event data table 894 displays information for the picture and video fields of the event data 892 via the "Picture" event data column 895-1 and "Video" event data column 895-2.

In response to indication of event data indicator 891-4, the Events window 1000 displays the associated event data 892-4 within the event data window 890, overlaid upon the Events window 1000.

In addition, the event data 892-4 displayed within the event data window 890, and the event data 892-4 within the event data table 894 are labeled the same. This is because they represent the event data 892 for the same event. The event data 892-4 within the event data window 890 is as a "snapshot" of the event data 892, displaying a subset of the fields of the event data 892, whereas the event data 892-4 within the event data table 894 displays all fields and detail associated with the event data 892-4.

Figure 29A:
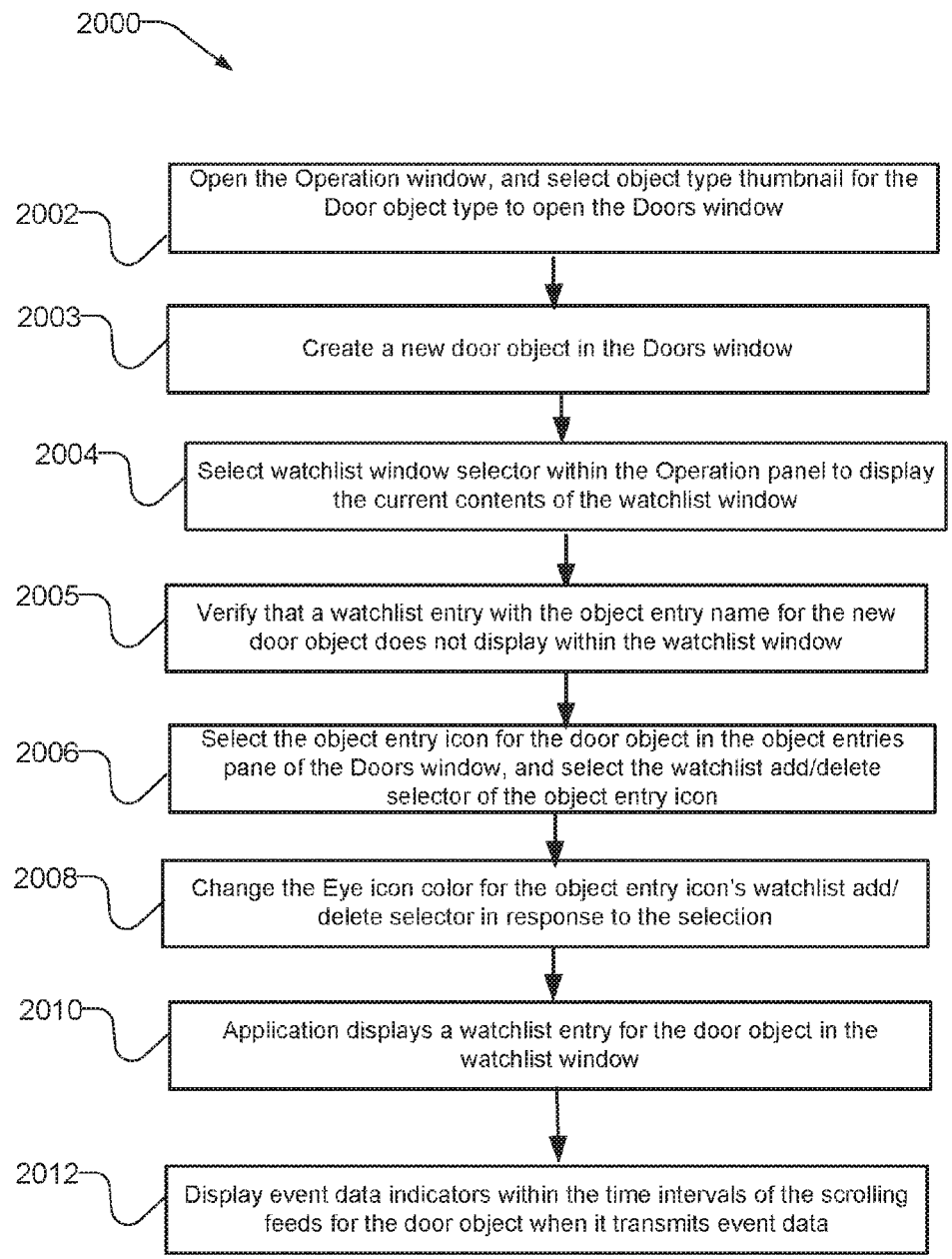
FIG. 29A is a flow chart displaying a method for adding a watchlist entry to the watchlist window for a newly created Door object, for displaying its event data in the scrolling feeds.

FIG. 29A displays method 2000 for adding a watchlist entry 799 for a newly created object of the security system 150 to the watchlist window 802. The watchlist entry 799 is for a Door object. In step 2002, the operator opens the Operation window, and selects the Door object type thumbnail 504 to open the Doors window 800. In step 2003, the operator creates a new door object in the Door window. All remaining method 2000 steps are executed within the Doors window 800. In step 2004, the operator selects the watchlist window selector 114 in the Operation panel to display the current contents of the watchlist window 802.

The operator verities that a watchlist entry 799 with the object entry name 706 of the newly created door object does not display within the watchlist window 802 in step 2005. In step 2006, the operator selects the object entry icon 818 for the door object in the object entries pane 714 of the Doors window 800, and selects its watchlist add/delete selector 804. In step 2008, the eye icon for the watchlist add/delete selector 804 of the object entry icon 818 changes color in response to the selection. In step 2010, the Application displays a watchlist entry 799 for the door object in the watchlist window 802. As a result, the Application displays event data indicators 891 within the time intervals 825 of the scrolling feeds 820 when the door object transmits event data 892, in step 2012.

Figure 29B:
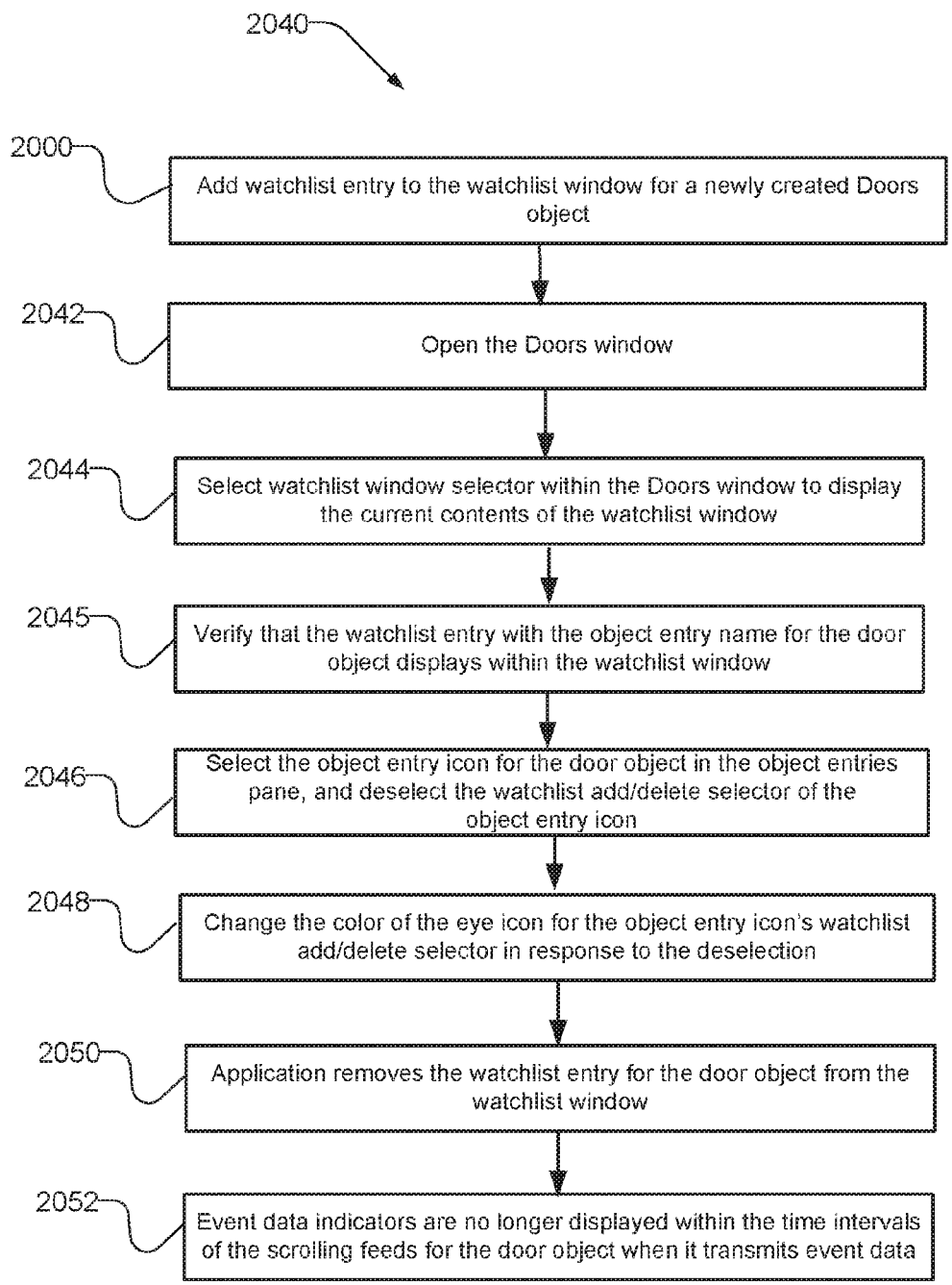
FIG. 29B is a flow chart displaying a method for deleting an object entry for a Door object from the watchlist window, for removing the display of its event data from the scrolling feeds.

FIG. 29B displays method 2040 for deleting watchlist entries 799 from the watchlist window 802. Though the Application enables display of the watchlist window 802 from nearly any application window, this method displays the watchlist window 802 from the Doors window 800. In step 2000, method being displayed in FIG. 29A, the operator adds an object entry to the watchlist window. The object entry is a Door object.

In step 2042, the operator opens the Doors window 800, and in step 2044 selects the watchlist window selector 114 in the Doors window 800 to display the current contents of the watchlist window 802. The operator verifies that the watchlist entry 799 with the object entry name 706 for the door object displays within the watchlist window 802 in step 2045. In step 2046, the operator selects the object entry icon 818 for the door object in the object entries pane 714 of the Doors window 800, and deselects its watchlist add/delete selector 818. In step 2048, the eye icon for the watchlist add/delete selector 804 of the object entry icon 818 changes color in response to the deselection.

In step 2050, the Application removes the watchlist entry 799 for the door object from the watchlist window 802. As a result, the Application no longer displays event data indicators 891 within the time intervals of the scrolling feeds 820 for the door object when it transmits event data 892, in step 2052.

Figure 29C:
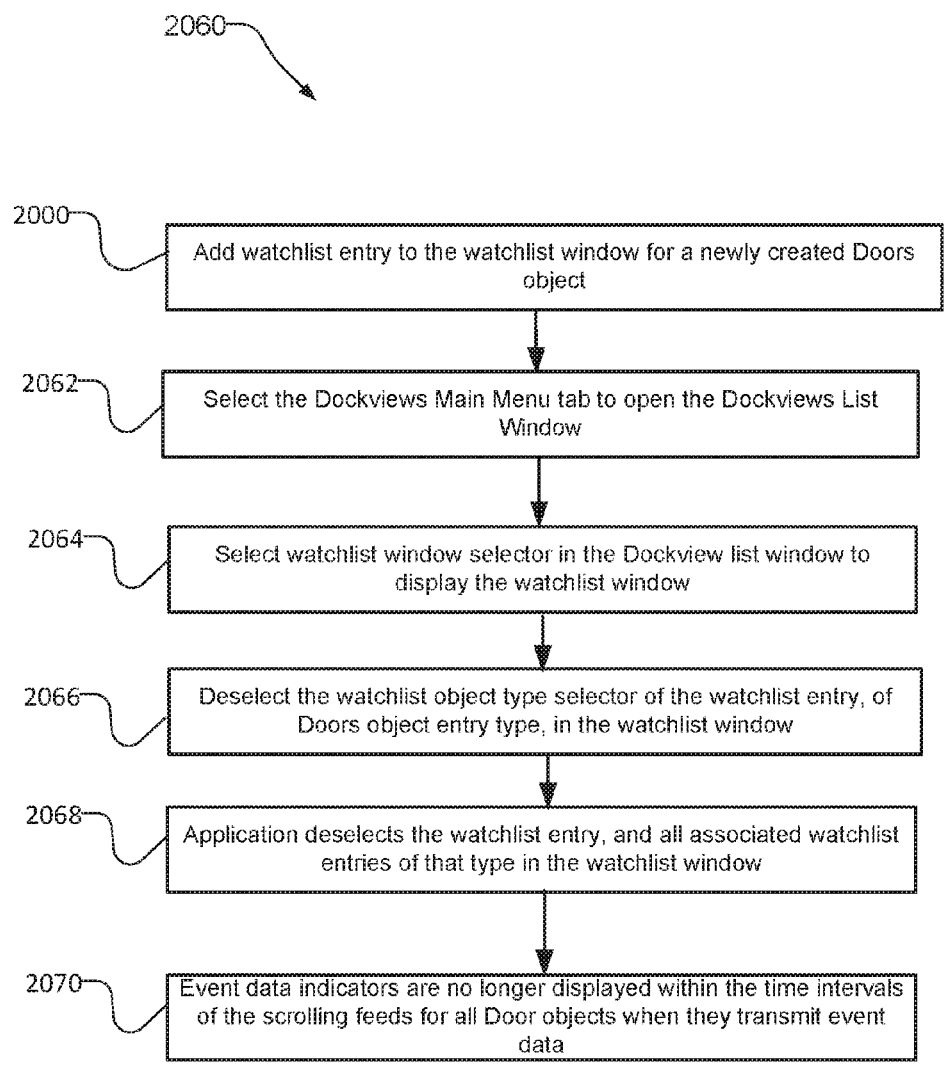
FIG. 29C is a flow chart displaying a method for deselecting all watchlist entries associated with the Door object type from the watchlist window, for removing the display of the event data from the scrolling feeds for all objects of the Door type.

FIG. 29C displays method 2060 for deselecting an object type from the watchlist window 802. Though the Application enables display of the watchlist window 802 from nearly any application window, this method displays the watchlist window 802 from the Dockviews List window 300.

In step 2000, whose method is displayed in FIG. 29A, the operator adds an object entry to the watchlist window 802 for a newly created Door object. In step 2062, the operator selects the Dockviews main menu tab 112-1 to open the Dockview List Window 300. In step 2064, the operator selects the watchlist window selector 114 in the Dockviews list window 300 to display the watchlist window 802.

In step 2066, the operator deselects the watchlist object type selector 806-10 of watchlist entry 799-10, of Doors object type name 508-10 (the Door type) in the watchlist window 802.

In step 2068, the Application deselects the watchlist entry 799 for the object type name 508-4, and deselects all associated watchlist entries 799 of that type in the watchlist window 802. As a result, event data indicators are no longer displayed within the time intervals of the scrolling feeds 820 for all Door objects when they transmit event data 892, in step 2070.

Figure 29D:
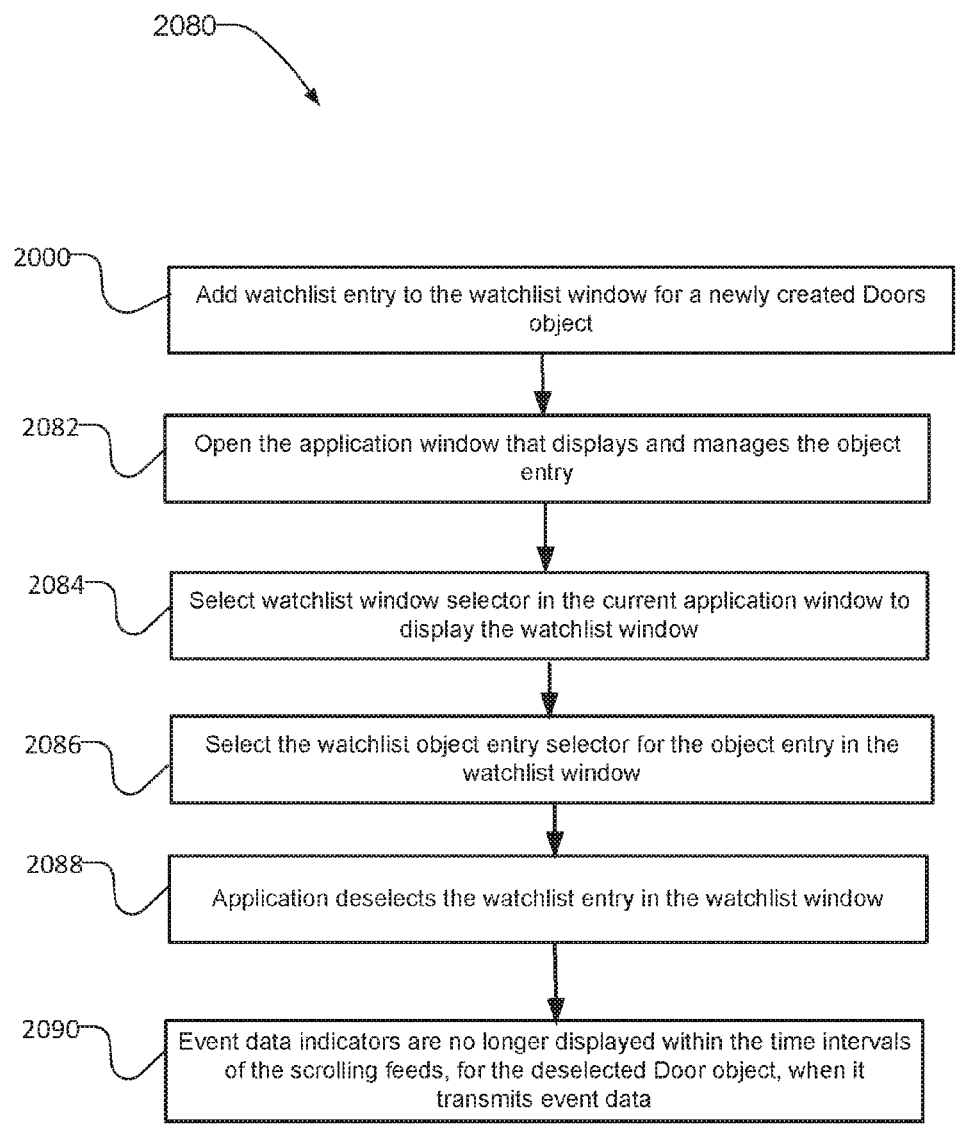
FIG. 29D is a flow chart displaying a method for deselecting an individual watchlist entry for a specific Door object from the watchlist window, for removing the display of the object's event data from the scrolling feed.

FIG. 29D displays method 2080, another way of deselecting a watchlist entry in the watchlist window 802. Though the Application enables display of the watchlist window 802 from nearly any application window, this method displays the watchlist window 802 from the Door window 800.

In step 2000, method being displayed in FIG. 29A, the operator adds a watchlist entry 799 to the watchlist window 802 for a newly created Door object. In step 2082, the operator opens the application window that displays and manages the object entry. In this example, the current application window is the Doors window 800 as displayed in FIG. 27A. In step 2084, the operator selects the watchlist window selector 114 in the current application window to display the watchlist window 802. In step 2086, the operator selects the watchlist object entry selector 808 for the watchlist entry 799 in the watchlist window.

In step 2088, the Application deselects the watchlist entry 799 in the watchlist window. As a result, event data indicators are no longer displayed within the time intervals 825 of the scrolling feeds 820 for the deselected Door object, when it transmits event data 892, in step 2090. The deselected object is a Door object associated with a Door controller device, in this example.

Figure 29E:
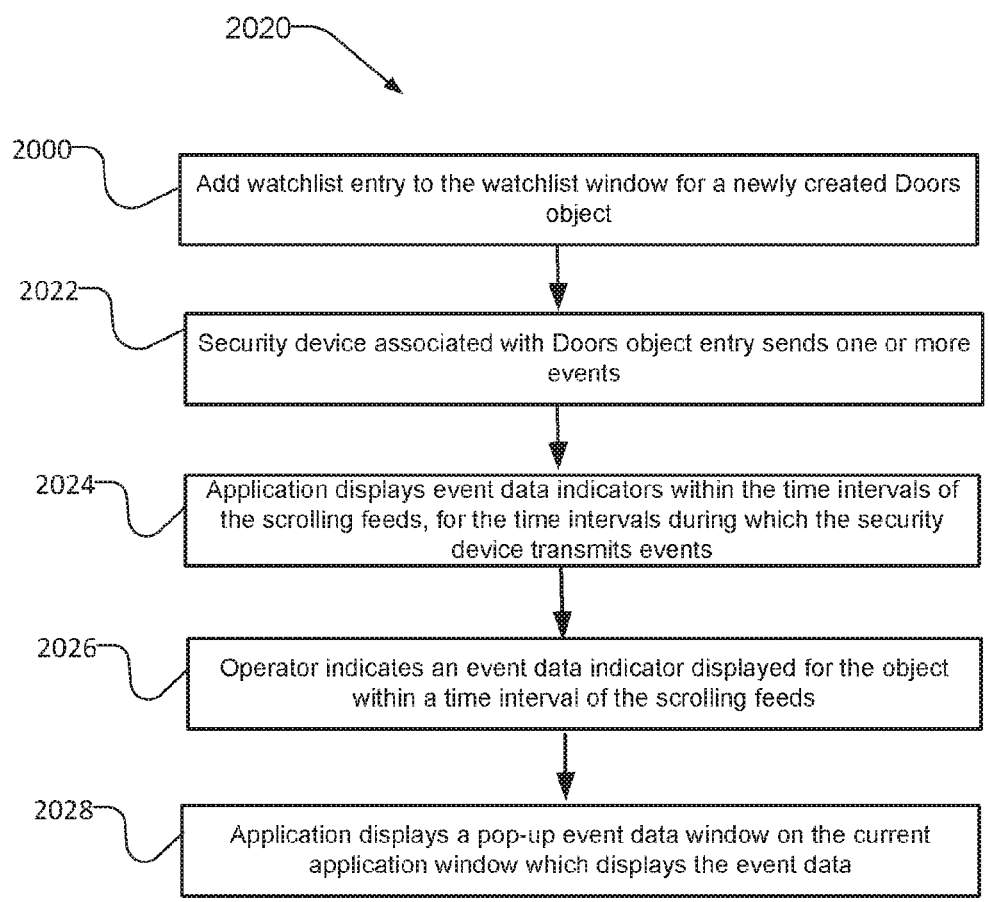
FIG. 29E is a flow chart displaying a method for displaying event data from an object of the security system within a pop-up event data window on the main window of the Application.

FIG. 29E displays method 2020 for displaying event data 892 for an object associated with a security device, within a pop-up event data window 890 on the current application panel. In step 2000, whose method is displayed in FIG. 2A, the operator adds an watchlist entry 799 to the watchlist window 802 for a newly created Door object. In step 2022, the security device (a door controller) associated with the object entry, a door object, sends one or more events.

In step 2024, the Application displays event data indicators 891 within the time intervals 825 of the scrolling feeds 820, for the time intervals during which the security device transmits events. The operator indicates an event data indicator 891 for the object within a time interval 825 of the scrolling feed, in step 2026. In response to the indication, in step 2028, the Application displays a pop-up event data window 890 on the current application window, which displays the event data 892.

Figure 30A:
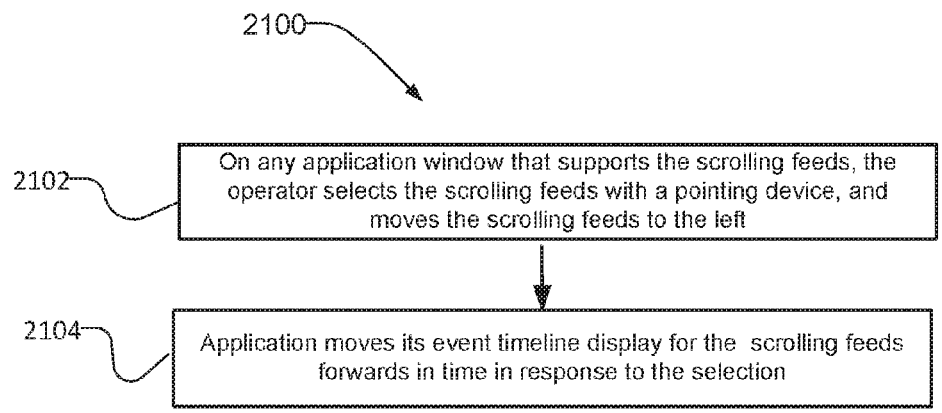
FIG. 30A and FIG. 30B are flow charts displaying methods for selecting event timelines within the scrolling feeds, using a pointing device.
Figure 30B:
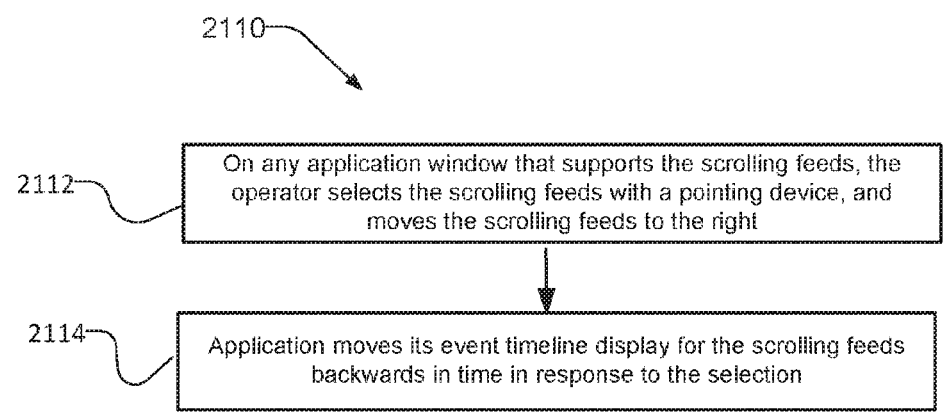

FIG. 30A displays method 2100 for moving the event timeline of the scrolling feeds 820 using a pointing device 160, such as a mouse. In step 2102, on any application window that includes the scrolling feeds 820, the operator selects the scrolling feeds 820 with a pointing device 160, and moves the scrolling feeds 820 to the left. In step 2104, the Application moves its event timeline display for the scrolling feeds 820 forwards in time in response to the selection FIG. 30B displays method 2110 for moving the event timeline of the scrolling feeds 820 using a pointing device 160, such as a mouse. In step 2112, on any application window that supports the scrolling feeds 820, the operator selects the scrolling feeds 820 scrollbar with a pointing device 160, and moves the scrolling feeds 820 to the right. In step 2114, the Application moves its event timeline display within the scrolling feeds 820 backwards in time in response to the selection.

Figure 31A:
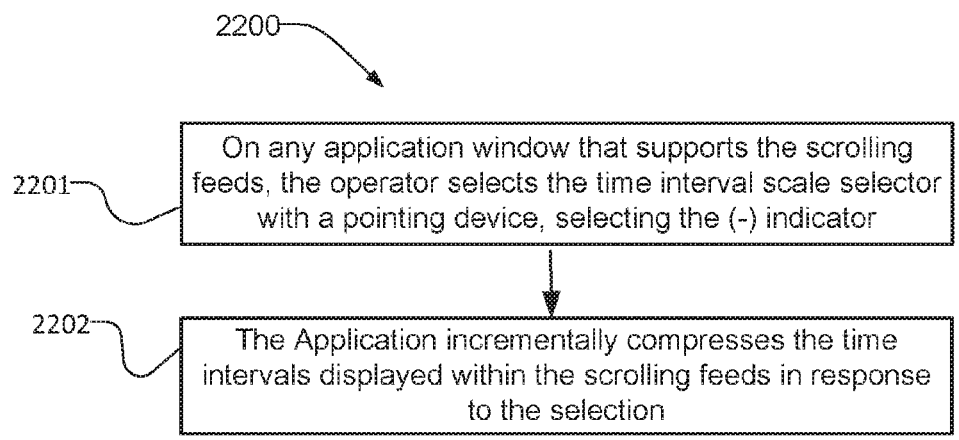
FIG. 31A and FIG. 31B are flow charts displaying methods for selecting the scale of time intervals within the scrolling feeds, using the time interval scale selector.

FIG. 31A displays method 2200 for changing the scale of the time intervals 825 within the scrolling feeds 820. In step 2201, on any application window that supports scrolling feeds 820, the operator selects the time interval scale selector 824 with a pointing device 160, selecting the (−) indicator. In step 2202, the Application incrementally compresses the time intervals 825 displayed within the scrolling feeds 820 in response to the selection. This enables the operator to display more time intervals 825 within the scrolling feeds 820 of the current Application window, and therefore, to display more event data indicators 891 for event data 892.

Figure 31B:
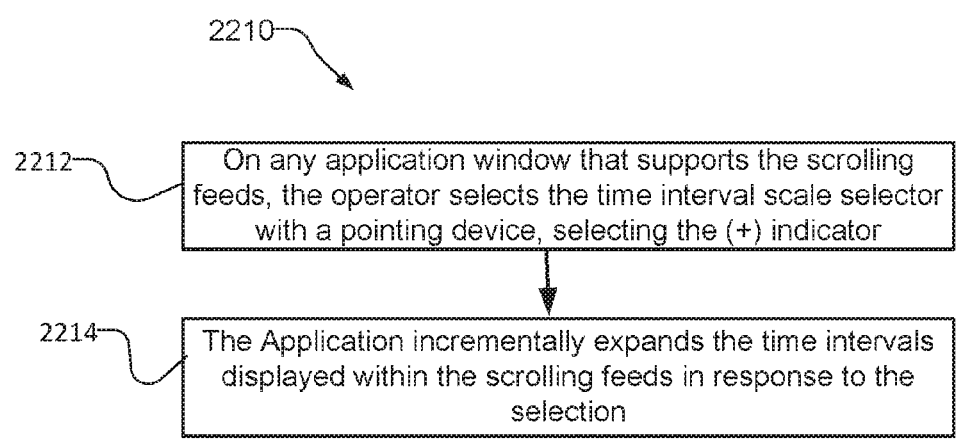

FIG. 31B displays method 2210 as another way for changing the scale of the time intervals within the scrolling feeds 820. In step 2212, on any application panel that supports the scrolling feeds 820, the operator selects the time interval scale selector 824 with a pointing device 160, selecting the (+) indicator. In step 2214, the Application incrementally expands the time intervals 825 displayed within the scrolling feeds 820 in response to the selection.

By expanding the time intervals 825, the operator can narrow their search for event data 892 within the time intervals 825. This is especially necessary when multiple objects of the security system 150 send event data 892 at virtually the same time.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A security system, comprising:
   a server system for a security network that aggregates event data captured from objects on the security network; and
   a graphical user interface displayed on a user device that presents the event data received from the server, wherein the graphical user interface includes a window with a scrolling feed that is constantly moving forward in real time to present the captured event data such that older event data is moved from right to left of the scrolling feed, in which a user can access older event data by dragging the scrolling feed to the right and can access more recent event data by dragging the scrolling feed to the left in the graphical user interface, wherein the scrolling feed includes event data indicators indexed by time intervals within the scrolling feed, the event data indicators displaying the event data in response to the user indicating the event data indicators;
   wherein the graphical user interface also includes a watchlist window that controls inclusion of the event data in the scrolling feed, the watchlist window being overlayed upon the window with the scrolling feed in response to selection of watchlist window selector, and the watchlist window being closed in response to deselection of the watchlist window selector.

2. The system of claim 1, wherein the event data are transmitted in response to changes in status of the objects, the event data comprising:
   a date and time;
   a name;
   a description;
   a picture; and/or
   a video.

3. The system of claim 1, wherein the watchlist window includes a list of the objects, the objects in the list presenting their event data within the scrolling feed.

4. The system of claim 3, further comprising graphical objects associated with the objects which include a watchlist add/delete selector for adding and deleting the objects from the list of objects in the watchlist window.

5. The system of claim 4, wherein the graphical objects associated with the objects further include:
   an object type for each type of the objects, the object type comprising:
      an icon;
      a name; and
   an object entry for each of the objects, wherein each object entry is associated with one of the object types, each object entry comprising:
      an icon; and
      a name.

6. The system of claim 5, wherein the watchlist window displays the object type names and the object entry names for the objects in separate rows.

7. The system of claim 1, wherein the window further includes:
   a time interval scale selector for selecting the scale of the time intervals within the scrolling feed.

8. The system of claim 7, wherein the scale of the time intervals of the scrolling feed changes in response to selection of the time interval scale selector.

9. The system of claim 1, further comprising displaying time intervals adjacent to the scrolling feed indicating corresponding times when the event data was received.

10. The system of claim 1, wherein the graphical user interface further comprises an event data window, and wherein the event data indicators display the event data in the event data window in response to the user indicating the event data indicators.

11. A method for displaying event data for objects in a security system, comprising a server system, a security network for connecting the server system to the objects, a user device for displaying a graphical user interface, the method comprising:
   the server system aggregating the event data from the objects on the security network; and
   the user device receiving the event data from the server system, and displaying the event data in a graphical user interface that presents the event data in a window with a scrolling feed that is constantly moving forward in real time to present the captured event data such that older event data is moved from right to left of the scrolling feed, in which a user can access older event data by dragging the scrolling feed to the right and can access more recent event data by dragging the scrolling feed to the left in the graphical user interface, wherein the scrolling feed includes event data indicators that display the event data in response to the user indicating the event data indicators;
   displaying a watchlist window by selecting a watchlist window selector in the window with the scrolling feed and overlaying the watchlist window upon the window with the scrolling feed;
   controlling inclusion of the event data in the scrolling feed by adding and deleting objects in the watchlist window; and
   closing the watchlist window in response to deselecting the watchlist window selector.

12. The method of claim 11, further comprising changing the scale of time intervals in the scrolling feed.

13. The method of claim 11, further comprising indexing the event data indicators by time intervals.

14. The method of claim 11, further comprising displaying the event data in an event data window in response to the user indicating the event data indicators.

15. The method of claim 11, wherein adding and deleting the objects in the watchlist window comprises selecting a watchlist add/delete selector in graphical objects associated with the objects.

16. The method of claim 11, further comprising displaying an object type name for each type of the objects and an object entry name for each of the objects in a list in the watchlist window.

17. The method of claim 16, wherein controlling inclusion of the event data in the scrolling feed further comprises toggling a watchlist object type selector for the object type names, and/or toggling a watchlist object entry selector for the object entry names, in the list in the watchlist window.

18. The method of claim 11, further comprising presenting the event data from the objects within the a scrolling feed in response to changes in status of the objects.

19. The method of claim 11, wherein the user indicating the event data indicators comprises the user moving a pointing device over the event data indicators.

* * * * *